US011957261B2

(12) United States Patent
Giri et al.

(10) Patent No.: US 11,957,261 B2
(45) Date of Patent: Apr. 16, 2024

(54) WINDOW TREATMENT MOUNTING BRACKET

(71) Applicant: Lutron Technology Company LLC, Coopersburg, PA (US)

(72) Inventors: Nirav Giri, Bethlehem, PA (US); David A. Kirby, Zionsville, PA (US); Douglas George Kistler, Coplay, PA (US); Rohan Krishnan, Bethlehem, PA (US); Glenn S. Laverty, IV, Coopersburg, PA (US); Vladislav Pejic, Allentown, PA (US)

(73) Assignee: Lutron Technology Company LLC, Coopersburg, PA (US)

( * ) Notice: Subject to any disclaimer, the term of this patent is extended or adjusted under 35 U.S.C. 154(b) by 91 days.

(21) Appl. No.: 15/965,200

(22) Filed: Apr. 27, 2018

(65) Prior Publication Data

US 2018/0310745 A1 Nov. 1, 2018

Related U.S. Application Data

(60) Provisional application No. 62/491,883, filed on Apr. 28, 2017, provisional application No. 62/553,557, (Continued)

(51) Int. Cl.
*E06B 9/42* (2006.01)
*A47H 1/13* (2006.01)
(Continued)

(52) U.S. Cl.
CPC ................. *A47H 1/13* (2013.01); *E06B 9/44* (2013.01); *E06B 9/50* (2013.01); *E06B 9/58* (2013.01);
(Continued)

(58) Field of Classification Search
CPC ..... E06B 9/72; E06B 9/50; E06B 9/56; E06B 9/40; E06B 9/42; E06B 9/44; E06B 9/58; E06B 2009/587; A47H 1/13
(Continued)

(56) References Cited

U.S. PATENT DOCUMENTS

| | | | |
|---|---|---|---|
| 5,868 | A | 10/1848 | Marden |
| 11,638 | A | 9/1854 | Bray |

(Continued)

FOREIGN PATENT DOCUMENTS

| | | | |
|---|---|---|---|
| AU | 2014201116 | A1 | 9/2015 |
| BE | 1018808 | A5 | 9/2011 |

(Continued)

OTHER PUBLICATIONS

Bandalux, "Roller Shades", Price List USA, 2014, p. 1-48.

(Continued)

*Primary Examiner* — Daniel P Cahn
*Assistant Examiner* — Jeremy C Ramsey
(74) *Attorney, Agent, or Firm* — Flaster Greenberg P.C.

(57) ABSTRACT

A motorized window treatment system may include a roller tube, a flexible material, a drive assembly, electrical wiring, and/or mounting brackets. A mounting bracket may include a channel configured to secure the roller tube in position along a longitudinal axis of the roller tube. A mounting bracket may include a base and an attachment member. The base may be configured to attach the mounting bracket to a structure. The attachment member may extend from the base and may be configured to receive an end of a roller tube. The mounting bracket may be configured to retain electrical wiring for powering a drive assembly within the roller tube. The mounting bracket may include a spring that is configured to retain the roller tube within the channel in the mounting bracket. The mounting bracket may include a
(Continued)

sliding cover that is configured to cover an access opening of the channel.

32 Claims, 37 Drawing Sheets

Related U.S. Application Data filed on Sep. 1, 2017, provisional application No. 62/607,144, filed on Dec. 18, 2017.

(51) Int. Cl.

| | |
|---|---|
| ***E06B 9/44*** | (2006.01) |
| ***E06B 9/50*** | (2006.01) |
| ***E06B 9/58*** | (2006.01) |
| ***E06B 9/72*** | (2006.01) |

(52) U.S. Cl.
CPC .................................... *E06B 9/72* (2013.01); *E06B 9/42* (2013.01); *E06B 2009/587* (2013.01)

(58) Field of Classification Search
USPC ......................................................... 248/266
See application file for complete search history.

(56) References Cited

U.S. PATENT DOCUMENTS

| | | | |
|---|---|---|---|
| 12,792 | A | 5/1855 | Hartshorn et al. |
| 14,123 | A | 1/1856 | White |
| 16,989 | A | 4/1857 | Miles |
| 28,363 | A | 5/1860 | Hall |
| 44,624 | A | 10/1864 | Hartshorn |
| 67,465 | A | 8/1867 | Tripp |
| 127,274 | A | 5/1872 | Scott |
| RE7,367 | E | 10/1876 | Campbell |
| 311,131 | A | 1/1885 | Klein |
| 654,892 | A | 7/1900 | Ham |
| 654,893 | A | 7/1900 | Hartshorn |
| 693,619 | A | 2/1902 | Pfeifer |
| 846,089 | A | 3/1907 | Cannon |
| 846,192 | A | 3/1907 | John |
| 849,892 | A | 4/1907 | Samuel |
| 864,067 | A | 8/1907 | Bierley |
| 874,311 | A | 12/1907 | Julia |
| 876,738 | A | 1/1908 | Franklin |
| 889,925 | A | 6/1908 | Hampton et al. |
| 895,544 | A | 8/1908 | Ernst |
| 897,305 | A | 9/1908 | Quaintance |
| 899,116 | A | 9/1908 | Loughner |
| 904,423 | A | 11/1908 | Frederick |
| 915,151 | A | 3/1909 | Baird |
| 915,598 | A | 3/1909 | Hess, Jr. |
| 923,000 | A | 5/1909 | Herman |
| 928,829 | A | 7/1909 | Henry |
| 931,968 | A | 8/1909 | Herbert |
| 938,088 | A | 10/1909 | Conrad et al. |
| 940,507 | A | 11/1909 | Gray et al. |
| 956,731 | A | 5/1910 | James |
| 958,463 | A | 5/1910 | Moses |
| 966,436 | A | 8/1910 | Everest |
| 970,855 | A | 9/1910 | Severin |
| 1,006,183 | A | 10/1911 | Davie |
| 1,016,429 | A | 2/1912 | Munday |
| 1,031,898 | A | 7/1912 | Woodworth |
| 1,036,717 | A | 8/1912 | Roberts |
| 1,039,938 | A | 10/1912 | Hartshorn |
| 1,039,939 | A | 10/1912 | Hartshorn |
| 1,042,421 | A | 10/1912 | Foertsch |
| 1,046,429 | A | 12/1912 | Battes |
| 1,051,476 | A | 1/1913 | Everett |
| 1,052,049 | A | 2/1913 | Gasse |
| 1,076,775 | A | 10/1913 | August |
| 1,094,070 | A | 4/1914 | Hiner |
| 1,095,551 | A | 5/1914 | Collier |
| 1,098,839 | A | 6/1914 | Reisner |
| 1,099,360 | A | 6/1914 | Harris |
| 1,101,918 | A | 6/1914 | Foley et al. |
| 1,112,510 | A | 10/1914 | Wilson et al. |
| 1,115,020 | A | 10/1914 | Emmet |
| 1,115,427 | A | 10/1914 | Gress et al. |
| 1,127,529 | A | 2/1915 | Serena |
| 1,130,848 | A | 3/1915 | Seward |
| 1,136,049 | A | 4/1915 | Emmet |
| 1,150,339 | A | 8/1915 | Simmons et al. |
| 1,151,050 | A | 8/1915 | Ruffner |
| 1,181,852 | A | 5/1916 | Dawson |
| 1,190,007 | A | 7/1916 | Rayder |
| 1,238,642 | A | 8/1917 | Crump |
| 1,332,794 | A | 3/1920 | Boland |
| 1,356,237 | A | 10/1920 | Szefczyk |
| 1,379,663 | A | 5/1921 | Epifanio |
| 1,379,664 | A | 5/1921 | Tomasulo |
| 1,388,346 | A | 8/1921 | Kirsch |
| 1,476,160 | A | 12/1923 | Kirsch |
| 1,557,419 | A | 10/1925 | Clarke |
| 1,622,450 | A | 3/1927 | Klappenberger |
| 1,683,568 | A | 9/1928 | Moody et al. |
| 1,686,208 | A | 10/1928 | Freestate |
| 1,790,662 | A | 2/1931 | Hansen |
| 1,799,137 | A | 3/1931 | Simpson |
| 1,810,099 | A | 6/1931 | Anderson |
| 1,881,605 | A | 10/1932 | Kuhn et al. |
| 1,906,413 | A | 5/1933 | Quill |
| 1,926,267 | A | 9/1933 | Davis |
| 1,946,852 | A | 2/1934 | Hamm |
| 1,951,115 | A | 3/1934 | Wonsowicz |
| 1,960,983 | A | 5/1934 | Stuber |
| 1,998,777 | A | 4/1935 | Dollinger |
| 2,021,106 | A | 11/1935 | Johnson |
| 2,024,734 | A | 12/1935 | Hoskins |
| 2,031,698 | A | 2/1936 | Fanzoi |
| 2,041,363 | A | 5/1936 | McNicoll |
| 2,105,469 | A | 1/1938 | Bosch, Jr. |
| 2,108,939 | A | 2/1938 | William |
| 2,149,481 | A | 3/1939 | Bosch |
| 2,227,859 | A | 1/1941 | Mollin |
| 2,231,778 | A | 2/1941 | Swanson |
| 2,350,085 | A | 5/1944 | Yashan |
| 2,375,496 | A | 5/1945 | Schueller |
| 2,448,481 | A | 8/1948 | Wise |
| D161,199 | S | 5/1949 | Perelman |
| 2,490,016 | A | 12/1949 | Cooper |
| 2,500,706 | A | 3/1950 | Oliver |
| 2,510,408 | A | 6/1950 | Mayne et al. |
| 2,548,850 | A | 4/1951 | Thexton |
| D182,161 | S | 2/1958 | Bulman et al. |
| 3,355,149 | A | 11/1967 | Hans et al. |
| 3,420,487 | A | 1/1969 | Larsen |
| 3,980,122 | A | 9/1976 | Takazawa |
| 4,270,720 | A | 6/1981 | Fukuchi |
| 4,368,771 | A | 1/1983 | Hopper |
| 4,417,185 | A | 11/1983 | Bullat |
| 4,538,785 | A | 9/1985 | Damsgaard |
| 4,662,596 | A | 5/1987 | Haarer |
| 4,712,104 | A | 12/1987 | Kobayashi |
| 4,751,953 | A | 6/1988 | Appel et al. |
| 4,771,966 | A | 9/1988 | Anderson |
| 5,009,259 | A | 4/1991 | Miloslaus |
| 5,044,417 | A | 9/1991 | Bresson |
| D322,211 | S | 12/1991 | Gary |
| D327,192 | S | 6/1992 | Geuvjehizian |
| D336,580 | S | 6/1993 | White et al. |
| D355,094 | S | 2/1995 | Josephson |
| 5,651,487 | A | 7/1997 | Hansen |
| 5,848,634 | A | 12/1998 | Will et al. |
| 5,975,185 | A | 11/1999 | Miller et al. |
| D422,886 | S | 4/2000 | Shea |
| 6,089,305 | A | 7/2000 | Gruben et al. |
| 6,100,659 | A | 8/2000 | Will et al. |
| 6,164,428 | A | 12/2000 | Berman et al. |
| 6,196,508 | B1 | 3/2001 | Nijs |

(56) References Cited

U.S. PATENT DOCUMENTS 6,201,364 B1 3/2001 Will et al.
6,230,784 B1 5/2001 Sanz et al.
6,283,427 B1 9/2001 Møller et al.
6,497,267 B1 12/2002 Azar et al.
6,527,237 B2 3/2003 Harary et al.
6,550,733 B1 4/2003 Lassen et al.
6,817,402 B1 11/2004 Fraczek et al.
6,843,301 B2 1/2005 Carrillo et al.
6,891,957 B2 5/2005 Manrique et al.
6,983,783 B2 1/2006 Carmen, Jr. et al.
7,051,782 B2 5/2006 Nichols, Jr. et al.
7,207,371 B2 4/2007 Hsu
7,240,716 B2 7/2007 Nichols, Jr. et al.
D547,985 S 8/2007 Kubota
7,267,311 B2 9/2007 Jung
7,267,314 B1 9/2007 Erickson
7,740,047 B2 6/2010 Koop et al.
D622,993 S 9/2010 Park et al.
7,836,937 B2 11/2010 Anderson et al.
7,839,109 B2 11/2010 Carmen, Jr. et al.
7,849,907 B2 12/2010 Jang
D632,118 S 2/2011 Clarke
7,931,069 B2 4/2011 Cannaverde et al.
8,009,433 B2 8/2011 Ares
8,051,891 B2 11/2011 Birkkjaer
8,136,569 B2 3/2012 Bohlen et al.
D669,771 S 10/2012 Geiger
8,307,879 B2 11/2012 Lin et al.
D694,039 S 11/2013 Licciardi Di Stefano
D695,042 S 12/2013 Licciardi Di Stefano
8,608,126 B2 * 12/2013 Ng ............................ E06B 9/50 160/323.1
D705,040 S 5/2014 Konrad et al.
D712,727 S 9/2014 Geiger
8,893,766 B2 11/2014 Bohlen et al.
8,950,461 B2 2/2015 Adams et al.
8,967,568 B2 3/2015 Wills et al.
D731,876 S 6/2015 Di Stefano
9,045,939 B2 6/2015 Blair et al.
D733,536 S 7/2015 Di Stefano
D733,537 S 7/2015 Di Stefano
D740,108 S 10/2015 Di Stefano
D741,697 S 10/2015 Mcgrath
9,237,821 B2 1/2016 Geiger
9,334,688 B2 5/2016 Colson et al.
D758,827 S 6/2016 Grasselli et al.
9,587,429 B2 3/2017 Cheng
9,598,901 B2 3/2017 Kirby et al.
D791,581 S 7/2017 Lin
D798,133 S 9/2017 Ng
9,765,566 B1 9/2017 Chen
9,840,870 B2 12/2017 Lu et al.
D817,660 S 5/2018 Raiti
9,988,839 B2 6/2018 Geiger
10,000,968 B2 6/2018 Bodet et al.
D822,473 S 7/2018 Ng
10,202,802 B2 2/2019 Colson et al.
10,294,717 B2 * 5/2019 Geiger ...................... E06B 9/50
10,309,461 B2 6/2019 Ng
10,415,307 B2 9/2019 Geiger
10,428,580 B2 * 10/2019 Vries ......................... E06B 9/42
10,822,872 B2 11/2020 Geiger
10,988,982 B2 4/2021 Geiger
11,377,903 B2 7/2022 Geiger
2002/0093297 A1 7/2002 Schnebly et al.
2002/0179554 A1 12/2002 Diedrichsen
2004/0129849 A1 * 7/2004 Walker ...................... E06B 9/72 248/266
2004/0169490 A1 9/2004 Heurtault
2006/0000560 A1 1/2006 Lewis
2006/0118248 A1 6/2006 Anderson et al.
2006/0137833 A1 6/2006 Nichols et al.
2006/0232233 A1 10/2006 Adams et al.
2007/0056699 A1 3/2007 Liu
2007/0131920 A1 * 6/2007 Platt .................... E04H 17/1421 256/65.02
2007/0175004 A1 8/2007 Chien
2007/0235622 A1 10/2007 Baran et al.
2008/0017777 A1 1/2008 Jones
2008/0053625 A1 3/2008 Anthony
2008/0121353 A1 * 5/2008 Detmer ..................... E06B 9/72 160/266
2008/0236763 A1 10/2008 Kates
2009/0014134 A1 1/2009 Hanley et al.
2009/0250177 A1 10/2009 Byeon
2009/0283225 A1 11/2009 Luger
2009/0283226 A1 11/2009 Cheng
2009/0308543 A1 12/2009 Kates
2010/0219306 A1 9/2010 Detmer et al.
2010/0236891 A1 9/2010 Lagarde et al.
2010/0269983 A1 10/2010 Kirby
2010/0288451 A1 11/2010 Bohlen
2011/0067820 A1 3/2011 Hsu et al.
2011/0139382 A1 6/2011 Daniels
2011/0186240 A1 8/2011 Lin
2011/0186246 A1 8/2011 Lin
2011/0259533 A1 10/2011 Lin
2012/0043027 A1 2/2012 Chen et al.
2012/0043029 A1 2/2012 Gaskill et al.
2012/0126077 A1 5/2012 Reo et al.
2012/0228464 A1 9/2012 Ng et al.
2012/0255686 A1 10/2012 Huang
2013/0037646 A1 2/2013 Ohl et al.
2013/0255894 A1 10/2013 Kim
2014/0069595 A1 3/2014 Chen et al.
2014/0182793 A1 7/2014 Byun et al.
2014/0224437 A1 8/2014 Douglas et al.
2014/0231032 A1 8/2014 Blair
2014/0251558 A1 9/2014 Chou
2014/0262068 A1 9/2014 Buccola, Jr. et al.
2014/0305602 A1 10/2014 Kirby et al.
2014/0352897 A1 * 12/2014 Mullet ...................... E06B 9/42 160/368.1
2014/0374036 A1 12/2014 Sheng
2015/0034259 A1 2/2015 Bohlen et al.
2015/0184454 A1 7/2015 Strand
2015/0300085 A1 * 10/2015 Klein Tuente ............ E06B 9/50 248/267
2016/0083999 A1 3/2016 Chen et al.
2016/0130863 A1 5/2016 Cheng
2016/0130869 A1 5/2016 Cheng
2016/0143470 A1 5/2016 Mullet et al.
2016/0326801 A1 11/2016 Blair et al.
2016/0348428 A1 12/2016 Cheng
2017/0000280 A1 * 1/2017 Mullet ...................... E06B 9/68
2017/0096855 A1 4/2017 Chen
2017/0159359 A1 6/2017 Vries et al.
2017/0167191 A1 6/2017 Bodet et al.
2017/0183908 A1 6/2017 Lu et al.
2017/0284153 A1 10/2017 Reiner et al.
2018/0023340 A1 * 1/2018 Goldberg .................. E06B 9/56 160/324
2018/0087319 A1 * 3/2018 McPherson ............... E06B 9/50
2018/0106105 A1 * 4/2018 Anthony ................ H01H 19/46
2018/0112462 A1 * 4/2018 Chen ......................... E06B 9/42
2018/0209214 A1 7/2018 Geiger
2019/0145166 A1 * 5/2019 Campagna ................ E06B 9/50 160/310
2019/0162021 A1 * 5/2019 De Vries ................... E06B 9/50
2022/0333439 A1 10/2022 Geiger

FOREIGN PATENT DOCUMENTS

BE 1020011 A3 3/2013
CN 2516066 Y 10/2002
CN 2531097 Y 1/2003
CN 1518785 A 8/2004
CN 2649757 Y 10/2004
CN 1918900 A 2/2007
CN 201214970 Y 4/2009
CN 101778990 A 7/2010
CN 201920458 U 8/2011

(56) References Cited

FOREIGN PATENT DOCUMENTS

| | | | | |
|---|---|---|---|---|
| CN | 103510834 | A | 1/2014 | |
| CN | 203867436 | U | 10/2014 | |
| CN | 204754717 | U | 11/2015 | |
| CN | 205895104 | U | 1/2017 | |
| CN | 205895107 | U | 1/2017 | |
| CN | 106471204 | A | 3/2017 | |
| CN | 206091850 | U | 4/2017 | |
| CN | 105534256 | B | 10/2017 | |
| CN | 107965261 | A | 4/2018 | |
| CN | 207283350 | U | 4/2018 | |
| DE | 2322738 | A1 | 11/1973 | |
| DE | 3338515 | A1 | 5/1985 | |
| DE | 8914725 | U1 | 6/1990 | |
| DE | 8914725 | U1 | 8/1990 | |
| DE | 9402570 | U1 | 7/1994 | |
| DE | 102004057903 | B3 | 3/2006 | |
| DE | 202012007904 | U1 | 1/2014 | |
| DE | 202016003476 | U1 | 7/2016 | |
| DE | 202016106903 | U1 * | 4/2018 | ............... E06B 9/44 |
| EP | 0032884 | A1 | 7/1981 | |
| EP | 0273719 | B1 | 7/1988 | |
| EP | 0468925 | A1 | 1/1992 | |
| EP | 0866207 | A1 | 9/1998 | |
| EP | 887508 | A1 | 12/1998 | |
| EP | 1006255 | A1 | 6/2000 | |
| EP | 1500776 | A2 | 1/2005 | |
| EP | 1528217 | A1 | 5/2005 | |
| EP | 1688579 | A2 | 8/2006 | |
| EP | 1764474 | A1 | 3/2007 | |
| EP | 1936103 | A2 | 6/2008 | |
| EP | 1990897 | B1 | 8/2010 | |
| EP | 2354430 | A2 | 8/2011 | |
| EP | 2357309 | A1 | 8/2011 | |
| EP | 2450523 | A2 | 5/2012 | |
| EP | 2746526 | A1 | 6/2014 | |
| EP | 2933890 | A1 | 10/2015 | |
| ES | 1067735 | U | 6/2008 | |
| ES | 2311328 | A1 | 2/2009 | |
| FR | 2480846 | A1 | 10/1981 | |
| FR | 2664938 | A1 | 1/1992 | |
| FR | 2740824 | A1 | 5/1997 | |
| FR | 2743390 | A1 | 7/1997 | |
| FR | 2975426 | A1 | 3/2018 | |
| GB | 449914 | A | 7/1936 | |
| GB | 1250864 | A | 10/1971 | |
| GB | 1480896 | A | 7/1977 | |
| GB | 2392945 | A | 3/2004 | |
| GB | 2420702 | A | 6/2006 | |
| GB | 2427430 | A | 12/2006 | |
| GB | 2463235 | A | 10/2008 | |
| GB | 2463235 | A | 3/2010 | |
| JP | S58126788 | U | 8/1983 | |
| JP | S58141093 | U | 9/1983 | |
| JP | 2581990 | B2 | 2/1997 | |
| JP | H10299211 | A | 11/1998 | |
| JP | H1181819 | A | 3/1999 | |
| JP | 2003193772 | A | 7/2003 | |
| JP | 4003178 | B2 | 11/2007 | |
| JP | 4005148 | B2 | 11/2007 | |
| JP | 4030989 | B2 | 1/2008 | |
| JP | 4520580 | B2 | 8/2010 | |
| JP | 4686074 | B2 | 5/2011 | |
| JP | 2013014931 | A | 1/2013 | |
| JP | 2014213910 | A | 11/2014 | |
| KR | 100722374 | B1 | 5/2007 | |
| KR | 20100002217 | U | 3/2010 | |
| KR | 101136862 | B1 | 4/2012 | |
| TW | M415668 | U | 11/2011 | |
| WO | 0241740 | A1 | 5/2002 | |
| WO | 2006031380 | A1 | 3/2006 | |
| WO | 2007110072 | A1 | 10/2007 | |
| WO | 2012156471 | A1 | 11/2012 | |
| WO | 2013052084 | A1 | 4/2013 | |
| WO | 2014008027 | A1 | 1/2014 | |
| WO | 2014169093 | A1 | 10/2014 | |
| WO | 2017210721 | A1 | 12/2017 | |

OTHER PUBLICATIONS

Jacobson, "SI's Launch of the Decade: Motorized Shades Like None Other", CEPro, Sep. 1, 2017, p. 1-15.
Crestron, "Crestron Shading Solutions", 2012, p. 1-18.
HunterDouglas, "The Alustra Collection of Woven Textures", Inspired By Design, 2012, p. 1-12.
HunterDouglas, "Product Features and Benefits", 2012, p. 1-28.
O'Boyle, "Qmotion Shades remote and app-controlled blinds, maintaining privacy from the comfort of a sofa", Pocket-lint Limited, Aug. 7, 2014, p. 1-8.
Mariak, "Roller Shade Section", Aug. 22, 2011, p. 1-48.
Rollease Acmeda, "S45 Rollershade Series", 2016, p. 1-8.
Screen Innovations, "Nano Shades", 2017, p. 1-32.
Borson, "The Shade Store - Installing roller shades", Life of an Architect, Nov. 29, 2010, p. 1-12.
Glick, "Go For The Gold, Silver Or Bronze Window Treatment Hardware", The Shade Store Blog, Aug. 1, 2012, p. 1-4.
SilentGliss, "Roller Blind and Dim-Out Systems", Dec. 2011, p. 1-11.
Cedia, "Somfy Introduces Sonesse Ultra Quiet Motors", 2014, https://www.youtube.com/watch?v=zM-xFDEpWdl.
COOLAROO—Cordless Sun Shade Installation Instructions, Jun. 2013, 16 pages.
COULISSE—Absolute Roller Blind 2.0 Brochure, Aug. 2015, 124 Pages.
COOLAROO—How to Remove Coolaroo Exterior Sun Shades, Aug. 30, 2013, https://www.youtube.com/watch?v=8GFJ2UY3fVI.
HunterDouglas, "RB 500 Roller Shades Specification Catalog", 2010, p. 1-78.
The Shade Store Blog, "How to Hang Roller Shades: Regular or Reverse Roll", Sep. 19, 2016, https://www.theshadestore.corn/blog/how-to-.hang-roller--shades/.
HunterDouglas, "The Art of Window Dressing", Window Fashions, 2015, p. 1-27.
HomeDepot.com, "Bali Cut-to-Size Outside Mount Roller Shade Bracket", Sep. 22, 2013, https://www.homedepot.com/p/Bali-Cut-to-Size-Outside-Mount-Roller-Shade-Bracket-38-0151-00/202194899.
Silent Gliss, "Metal Bracket, wall and ceiling, right and left", (2017), p. 1-2.
Silent Gliss, "Metal Bracket, ceiling, left", (2017), p. 1-2.
Silent Gliss, "Metal Bracket, ceiling, right", (2017), p. 1-2.
Silent Gliss, "Metal Bracket, wall, left", (2017), p. 1-2.
Silent Gliss, "Metal Bracket, wall, right", (2017), p. 1-2.
The Shade Store, "Installing your motorized roller & solar shades", Nov. 4, 2016, 6 pages.
Lutron Shading Solutions by VIMCO, "Installation Instructions", Sivoia QED, Roller 64, p. 1-24.
Lutron, "Sivoia QED", p. 1-5.
Lutron, "Sivoia QS Installation Instructions", Roller 100 In-Line Coupled/Roller 200CW Roller Shade Addendum, p. 1-24.
Lutron, "Sivoia QS Roller 100 Ceiling Mount", p. 1-24.
Somfy, "Radio Technology SOMFY The New Generation of a Proven Concept", p. 1-78.
Lutron, "Sivoia QED Technical Reference Guide", Rev. D, p. 1-81.
Somfy, "Somfy Product Catalogue 2010-2011, Guide to Motorised and Automated Solutions", Energy Saving Solutions, p. 1-210.
Coolaroo, "Exterior Roller Sun Shade Installation Instructions", Apr. 2012, p. 1-12.
Insynctive Roomside Roller Shade, "Pella Insynctive Product Guide", Pella® Insynctive™ Roomside Roller Shade Product Guide, p. 1-46.
Draper, "Couples FlexShades by Draper Installation Instructions", p. 1-4.
Lutron Electronics Co., European Design Registration No. 002017376-0001, Mar. 29, 2012, p. 1-6.

(56) References Cited

OTHER PUBLICATIONS

Complaint, *Geigtech East Bay LLC* v. *Lutron Electronics Co., Inc.*, Case 1:18-cv-05290-CM, Filed in the United States District Court for the Southern District of New York on Jun. 12, 2018.
Complaint, *Geigtech East Bay LLC* v. *Lutron Electronics Co., Inc.*, Case 1:19-cv-04693-CM, Filed in the United States District Court for the Southern District of New York on May 23, 2019.
Complaint, *Geigtech East Bay LLC* v. *Lutron Electronics Co., Inc.*, Case 1:20-cv-10195-CM, Filed in the United States District Court for the Southern District of New York on Dec. 3, 2020.
Coolaroo. Exterior Roller Sun Shade Installation Instructions. Apr. 2012.
European Design Registration No. 002017376-0001, Mar. 29, 2012, p. 1-6.
Silent Gliss. Roler Blind and Dim-Out Systems. Dec. 2011.
Somfy. Sonesse 30 RTS. Sep. 2009.
The Shade Store. Installing Your Motorized Roller & Solar Shades. Nov. 2016.

* cited by examiner

WINDOW TREATMENT MOUNTING BRACKET

CROSS-REFERENCE TO RELATED APPLICATIONS

This application claims priority from: U.S. Provisional Patent Application No. 62/491,883, filed Apr. 28, 2017, U.S. Provisional Patent Application No. 62/553,557, filed Sep. 1, 2017 and U.S. Provisional Patent Application No. 62/607,144, filed Dec. 18, 2017, the contents of which are incorporated by reference

BACKGROUND

A window treatment may be mounted in front of one or more windows, for example to prevent sunlight from entering a space and/or to provide privacy. Window treatments may include, for example, roller shades, roman shades, venetian blinds, or draperies. A roller shade typically includes a flexible shade fabric wound onto an elongated roller tube. Such a roller shade may include a weighted hembar located at a lower end of the shade fabric. The hembar may cause the shade fabric to hang in front of one or more windows over which the roller shade is mounted.

A typical window treatment can be mounted to structure surrounding a window, such as a window frame. Such a window treatment may include brackets at opposed ends thereof. The brackets may be configured to operably support the roller tube, such that the flexible material may be raised and lowered. For example, the brackets may be configured to support respective ends of the roller tube. The brackets may be attached to structure, such as a wall, ceiling, window frame, or other structure.

Such a window treatment may be motorized. A motorized window treatment may include a roller tube, a motor, brackets, and electrical wiring. The components of the motorized window treatment, such as the brackets, the roller tube, electrical wiring, etc. may be concealed by a fascia or installed in a pocket out of view. However, it may be desirable to install a window treatment without a fascia and/or outside of a pocket. In such a motorized window treatment, one or more components may be exposed such that they are visible. It may be desirable to configure the motorized window treatment such that the exposed components are otherwise hidden, for example, without the use of a fascia. It may also be desirable to configure the exposed components to be functional and aesthetically pleasing.

SUMMARY

As described herein, a motorized window treatment may include mounting brackets that provide a minimal light gap at the sides of a flexible material and hide electrical wiring for a drive assembly from view of a user. The motorized window treatment may include a roller tube, a flexible material, a drive assembly (e.g., a motor drive unit), electrical wiring, and/or mounting brackets. The roller tube may be supported at opposed ends thereof. For example, the mounting brackets may be configured to support respective ends of the roller tube. The mounting brackets may be configured to be attached to a structure, for example, surrounding a window. The flexible material may be attached (e.g., windingly attached) to the roller tube and may be operable between an open position and a closed position via rotation of the roller tube.

The drive assembly may include a cylindrical body received in the roller tube, and an end portion extending from the cylindrical body. Each mounting bracket may define a channel configured to secure the roller tube in position along the longitudinal axis. The channel may be T-shaped. The channel may be configured such that the end portion of the roller tube is slidingly received by the channel. The channel may include one or more flanges and/or one more slots configured to secure the roller tube along the longitudinal axis. The end portion of the drive assembly may include rails configured to be retained by the flanges defined by the channel. For example, the mounting brackets may prevent movement of the roller tube along the longitudinal axis. The mounting brackets may be configured to secure the roller tube in a first direction that is a horizontal direction when the mounting brackets are attached to a vertical structure (e.g., a wall). The mounting brackets may be configured to secure the roller tube in a second direction that is a vertical direction when the mounting brackets are attached to a vertical structure (e.g., a ceiling).

Each of the mounting brackets may be configured to minimize a light gap between an edge of a flexible material windingly received by the roller tube and the window frame. Each mounting bracket may include a base, an arm, and an attachment member. The base may be configured to attach the mounting bracket to a structure (e.g., a window frame, a wall, or a ceiling). The base may define a first attachment area adjacent a first side of the base and a second attachment area adjacent a second side of the base. The first and second attachment areas may have at least one respective hole for receiving a respective fastener for attaching the mounting bracket to the structure.

The arm may extend from the base to the attachment member, which may be configured to receive an end of a roller tube. The mounting bracket may define a channel on the attachment member that is configured to receive an end of the roller tube. The attachment member may extend a predetermined distance from the arm such that the flexible material is prevented from contacting the arm as the roller tube is rotated to adjust the flexible material between an open position and a closed position. The drive assembly may include a mandrel that may be connected to an end of the roller tube, and a ring portion surrounding the mandrel. The ring portion may have the same color and/or finish as the mounting bracket. The mounting bracket may include a spring that is configured to retain the roller tube within the channel in the mounting bracket. The attachment member may define an inside surface. The attachment member may include a drum. The drum may extend from the inside surface. The drum may define the channel configured to receive the end of the roller tube. The channel may define an opening in the drum at a distal end of the attachment member.

The mounting bracket may be configured to retain electrical wiring for powering a drive assembly within the roller tube. The arm may define a bore configured to retain the electrical wiring for powering the drive assembly. The base may be configured to be mounted over a wall box in the structure and may comprise a size and a shape to hide the wall box from view when the mounting bracket is attached to the structure. The base may define a pathway extending from the bore in the arm to a central portion of the base located between the attachment areas of the base. The pathway may be configured to allow the electrical wiring to extend from the bore to the wall box. The end portion of the drive assembly may include a socket configured to receive a plug that is connected to the electrical wiring. The end portion may have a front surface on which the user interface is located. The end portion may be offset towards the front surface, for example, to form a recessed portion towards the rear of the drive assembly. The recessed portion may provide room for the electrical wiring when the end portion is received in the channel of the mounting bracket. The socket may be located in the recessed portion towards the rear of the drive assembly.

The end portion may include a user interface including one or more buttons for receiving a user input and/or one or more light emitting diodes (LEDs) for providing feedback. The mounting bracket may include a sliding cover that is configured to cover an access opening of the channel. The sliding cover may be configured to cover the user interface of the drive assembly. The sliding cover may define a plurality of barbs configured to secure the sliding cover in a closed position or an open position. The attachment member may include a plurality of notches. Each notch may be configured to receive a respective barb of the sliding cover. The sliding cover may be configured to retain the end of the roller tube within the channel.

The mounting brackets may be installed adjacent to a window using a jig. The jig may comprise a body defining at least two mounting-screw holes for drilling pilot holes for mounting screws of the mounting bracket and a wall-box hole for drilling a pilot hole for an electrical wall box to be located behind the mounting bracket. In addition, the jig may comprise a spacing member configured to move with respect to the body and to be fixed in position, and a locating member configured to move with respect to the spacing member and to be fixed in position. When the spacing member and the locating member are fixed in position and the locating member is located in a corner of the window, the spacing member is configured to space the mounting-screw holes and the wall-box hole of the body from the corner of the window.

As described herein, an electrical wall box may be installed in a cavity of the structure to which the mounting bracket is mounted. The wall box may comprise a body having a rim defining a front opening of the wall box, and an ear having an elongated portion extending from the rim and a flange at an opposite end of the elongated portion as the rim. When the wall box is installed in the cavity in the structure, the flange of the ear is configured to abut a surface of the structure to prevent the rim of the structure from being inserted into the cavity farther than a length of the elongated portion. After the wall box is installed in the cavity in the structure, the ear may be removed from the wall box.

A motorized window treatment may include a roller tube, a flexible material, a motor drive unit, a first mounting bracket, and a second mounting bracket. The roller tube may have a first end and a second end. The flexible material may be attached to the roller tube. The motor drive unit may be configured to be located within (e.g., partially within) the roller tube adjacent to the first end of the roller tube. The motor drive unit may be configured to rotate the roller tube to adjust the flexible material between a raised position and a lowered position. The first mounting bracket and the second mounting bracket may be configured to mount the motorized window treatment to a structure. The first and second mounting brackets may be configured to rotatably support the roller tube at the respective first and second ends. The first and second mounting brackets may each include an arm configured to extend from the structure. The first and second mounting brackets may each include an attachment member extending from the arm. The attachment member of each of the first and second mounting brackets may define a channel that may be configured to slidably receive the respective end of the roller tube. The first mounting bracket may be configured to retain and conceal electrical wiring for powering the motor drive unit. The attachment member of each of the first and second mounting brackets may extend a predetermined distance from the respective arm, for example, such that the flexible material may be prevented from contacting the arm as the roller tube is rotated to adjust the flexible material between the raised position and the lowered position. The arm of each of the first and second mounting brackets may define an outer surface and an inner surface. The attachment member of each of the first and second mounting brackets may extend from the inner surface of the arm. Each of the first and second mounting brackets may include a base that may be configured to attach the respective mounting bracket to the structure. The base may extend from the inner surface of the arm, for example, at an opposite end of the arm than the attachment member. The motorized window treatment may include first and second bracket covers that may be configured to be mounted over the attachment members of the respective first and second mounting brackets. Each of the first and second bracket covers may include a body that may define a recess. The recess may be configured to receive the attachment member of the respective mounting bracket. The motorized window treatment may include first and second base covers that may be configured to be mounted over the bases of the respective first and second mounting brackets. Each of the first and second bracket covers may include feet for attaching the respective bracket cover to the structure. The feet of each of the first and second bracket covers may extend from the body of the respective bracket cover in the same direction as the base extends from the arm of the respective mounting bracket, for example, when the respective bracket cover is mounted over the arm (e.g., the attachment member) of the respective mounting bracket. Each of the first and second base covers may be configured to be mounted over the base of the respective mounting bracket and the feet of the respective bracket cover. The feet may be detachable from the body of the respective bracket cover, for example, to enable the feet to be attached to another bracket cover. The feet of the respective bracket cover may include respective openings for receiving fasteners to attach the respective bracket cover to the structure. Each of the first and second base covers may be configured to be connected to a respective bracket cover, for example, such that each of the first and second base covers captures the respective bracket cover against a respective mounting bracket. Each of the first and second base covers may include projections that may be received in notches of the respective bracket cover, for example, for holding the respective bracket cover against the arm of the respective mounting bracket. Each of the first and second bracket covers may include one or more magnets that may be positioned adjacent to one or more metal elements inside of the arm of the respective mounting bracket when the respective bracket cover is mounted over the arm for holding the respective bracket cover against the arm. When the arm of each of the first and second mounting brackets is received in the recess of a respective bracket cover, an outer surface of the arm may be adjacent to an inner surface of the recess. The outer surface of the arm may not define (e.g., any) features that enable attachment to the inner surface of the recess.

The attachment member of each of the first and second mounting brackets may define an inner surface that may be located towards the roller tube. A distance between the outer surface of the arm and the inner surface of the attachment member of each of the first and second mounting bracket may define a light gap of the motorized window treatment. The light gap may be one half inch or less. The attachment member of each of the first and second mounting brackets may be circular. A diameter of the attachment member of each of the first and second mounting brackets may be approximately equal to or less than a diameter of the roller tube. The attachment member of each of the first and second mounting brackets may include a cylindrical drum and a circular sliding cover that may surround the cylindrical drum. The circular sliding cover may have a diameter that is approximately equal to the diameter of the roller tube. The motor drive unit may include a cylindrical body that may be received within the roller tube. The motor drive unit may include a mandrel that may be connected to the first end of the roller tube. The motor drive unit may include a ring portion that may surround the mandrel. The ring portion may have same color and/or finish as the first mounting bracket. The outer surface of the ring portion may be flush with an outer surface of the roller tube. The channel of the attachment member of the first mounting bracket may be configured to retain the electrical wiring for the motor drive unit. The arm of the first mounting bracket may define a bore that may be configured to retain the electrical wiring for powering the motor drive unit. The base of the first mounting bracket may define a pathway extending from the bore in the arm to a central portion of the base located between two attachment areas of the base. The channel of the attachment member of each of the first and second mounting brackets may define a respective slot and a respective flange that may be configured to secure the roller tube in position along a longitudinal axis of the roller tube. The attachment member of each of the first and second mounting brackets may include a spring that may be configured to secure the respective end of the roller tube within the channel.

A motorized window treatment may include a roller tube, a flexible material, and mounting brackets. The roller tube may have a longitudinal axis. The flexible material may be attached to the roller tube. The flexible material may be operable between a raised position and a lowered position via rotation of the roller tube. The mounting brackets may be configured to support respective ends of the roller tube. The mounting brackets may be configured to be attached to a structure surrounding a window. Each of the mounting brackets may include a channel that may be configured such that an end of the roller tube is slidingly received by the channel. The channel may define a slot and a flange that may be configured to secure the roller tube in position along the longitudinal axis. Each of the mounting brackets may include a spring in the channel. The spring may be configured to secure the roller tube in a horizontal direction when the mounting brackets are attached to a vertical structure. The spring may be configured to secure the roller tube in a vertical direction when the mounting brackets are attached to a horizontal structure. The spring may be configured to retain the roller tube within the channel of a respective mounting bracket. Each of the mounting brackets may include a sliding cover that may be configured to cover an access opening of the channel. Each sliding cover may be configured to secure the roller tube within a respective mounting bracket in a horizontal direction when the mounting brackets are attached to a vertical structure. Each sliding cover may be configured to secure the roller tube in a vertical direction when the mounting brackets are attached to a horizontal structure. The channel may be T-shaped. The mounting brackets may be configured to secure (e.g., without requiring a tool) the roller tube in a first direction that is perpendicular to the structure and in a second direction that is parallel to the structure and perpendicular to the longitudinal axis. The slot and the flange of the channel may be configured to prevent movement of the roller tube in a direction parallel to the longitudinal axis.

A mounting bracket may be adapted to mount a motorized window treatment to a structure. The motorized window treatment may include a flexible material attached (e.g., windingly attached) to a roller tube. The mounting bracket may include an arm and an attachment member. The arm may extend from the structure. The attachment member may extend from the arm. The attachment member may define a channel that may be configured to receive (e.g., slidingly receive) an end of the roller tube. The channel may be configured to retain electrical wiring for powering a drive assembly within the roller tube. The structure may be a window frame, a wall, or a ceiling. When the structure is a window frame, the mounting bracket may be configured such that a light gap between an edge of the flexible material windingly attached to the roller tube and the window frame is one half inch or less. The mounting bracket may include a base that may be configured to attach the mounting bracket to the structure. The mounting bracket may define a bore extending through the arm and the base. The bore may be configured to receive the electrical wiring. The electrical wiring may be a first electrical wiring. The mounting bracket may include a socket located where the bore meets the channel. The socket may be configured to receive a plug that may be connected to the drive assembly via a second electrical wiring. The arm may define an inside surface. The attachment member may include a drum that may extend from the inside surface. The drum may define the channel that may be configured to receive the end of the roller tube. The channel may define an opening in the drum at a distal end of the attachment member. The mounting bracket may include a spring within the channel that may be configured to retain the end of the roller tube within the mounting bracket. The mounting bracket may include a sliding cover that may be configured to partially surround an outer surface of the drum. The sliding cover may be configured to be slidably operable about the outer surface of the drum. The sliding cover may be configured to cover the opening of the channel and the end of the roller tube. The sliding cover may define a plurality of barbs that may be configured to secure the sliding cover in a closed position and/or an open position. The drum may define a plurality of notches. Each of the plurality of notches may be configured to receive a respective barb of the plurality of barbs. The sliding cover may define two bars that may be positioned at distal ends of the sliding cover. The sliding cover may be configured to retain the end of the roller tube within the channel. The channel may be configured to retain a plug of the electrical wiring that may be configured to connect to the drive assembly.

A mounting bracket may be adapted to mount a motorized window treatment to a structure. The motorized window treatment may include a roller tube and a drive assembly positioned within the roller tube. The mounting bracket may include a base, an arm, and an attachment member. The base may be configured to attach the mounting bracket to the structure. The base may define a first attachment area adjacent to a first side of the base and a second attachment area adjacent to a second side of the base. The first and second attachment areas may have at least one respective hole that may be configured to receive a respective fastener for attaching the mounting bracket to the structure. The arm may extend from the base. The attachment member may extend from the arm at an opposite end of the arm as the base. The arm may define a bore that may be configured to retain electrical wiring for powering the drive assembly positioned within the roller tube. The base may define a pathway that may extend from the bore in the arm to a central portion of the base located between the first and second attachment areas of the base. The attachment member may define a channel that may be configured to receive an end of the roller tube. The bore may extend from the channel of the attachment member to the base. The base may be configured to be mounted over a wall box in the structure. The base may be a size and shape that may hide the wall box from view when the mounting bracket is attached to the structure. The pathway may be configured to allow the electrical wiring to extend from the bore to the wall box. The pathway may extend from the bore to an interior side of the base. Each of the first and second attachment areas of the base may include two holes that may be configured to receive respective fasteners for attaching the mounting bracket to the structure.

A mounting bracket may include a base, an arm, and a circular attachment member. The base may be configured to attach the mounting bracket to a structure. The arm may be configured to extend from the base. The arm may define an outer surface and an inner surface. The base may extend from the inner surface of the arm. The circular attachment member may extend from the inner surface of the arm at an opposite end of the arm as the base. The circular attachment member may define a channel that may be configured to slidingly receive an end of a roller tube. The circular attachment member may define an inner surface located towards the roller tube. A distance between the outer surface of the arm and the inner surface of the circular attachment member may define a light gap of a motorized window treatment. A diameter of the circular attachment member may be approximately equal to or less than a diameter of the roller tube. The circular attachment member may include a cylindrical drum and a circular sliding cover that may surround the cylindrical drum. The circular sliding cover may have a diameter that is approximately equal to the diameter of the roller tube. The light gap may be one half inch or less. The circular attachment member may extend a predetermined distance from the arm such that a flexible material windingly attached to the roller tube may be prevented from contacting the arm as the roller tube is rotated to adjust the flexible material between an open position and a closed position.

A motor drive unit for a motorized window treatment may include a flexible material windingly attached to a roller tube. The motor drive unit may be configured to be located within the roller tube. The motor drive unit may be configured to be located within the roller tube. The motor drive unit may include a cylindrical body and an end portion. The cylindrical body may be received within the roller tube. The end portion may extend from the cylindrical body. The end portion may have a user interface that may include at least one button configured to receive a user input. The end portion may be configured to be slidingly received within a channel of a mounting bracket for the motorized window treatment. The end portion may include rails that may be configured to be retained by flanges defined by the channel. The end portion may include a socket that may be configured to receive a plug. The plug may be connected to electrical wiring for electrically connecting the motor drive unit to a power source. The end portion may include a front surface on which the user interface is located. The end portion may be offset towards the front surface to form a recessed portion towards a rear of the motor drive unit, for example, to provide room for the electrical wiring when the end portion is received within the channel of the mounting bracket. The socket may be located in the recessed portion towards the rear of the motor drive unit. The roller tube may have a longitudinal axis. The socket may be oriented to receive the plug from the rear of the motor drive unit. The motor drive unit may include a mandrel that may be connected to the cylindrical body. The mandrel may be configured to be connected to an end of the roller tube. The motor drive unit may include a ring portion that may surround the mandrel. The ring portion may have the same color and/or finish as the mounting bracket. An outer surface of the ring portion may be flush with an outer surface of the roller tube. The channel of the mounting bracket may be configured to retain the end portion of the motor drive unit, for example, to secure the roller tube in position along the longitudinal axis. The user interface may include a visual indicator that may be configured to provide feedback.

A mounting bracket may include a base, an attachment member, and a sliding cover. The base may be configured to attach the mounting bracket to the structure. The attachment member may extend from the base. The attachment member may define a channel that may be configured to receive an end of a roller tube. The sliding cover may be received by the attachment member. The sliding cover may be configured to cover the channel when the roller tube is received within the channel. The sliding cover may have a circular shape. The attachment member may include a cylindrical drum around which the sliding cover is received. The cylindrical drum of the attachment member may define a slot extending around a circumference of the cylindrical drum. The sliding cover may define a rib that may extend from an inner surface of the sliding cover. The rib may be received in the slot defined by the cylindrical drum. The sliding cover may define a plurality of barbs that may extend from the rib. The plurality of barbs may be configured to secure the sliding cover in a closed position or an open position. The attachment member may define a plurality of notches located in the slot in the cylindrical drum. Each of the plurality of notches may be configured to receive a respective barb of the plurality of barbs. The channel of the attachment member may be configured to slidingly receive an end portion of a drive assembly located inside of the roller tube at the end of the roller tube. The sliding cover may be configured to be adjusted into an open position in which the end portion of the drive assembly is able to be installed in the channel. The sliding cover may be configured to be adjusted into a closed position in which the end portion of the drive assembly is hidden from view when the mounting bracket is attached to the structure. The sliding cover may be configured such that one or more buttons and/or one or more light emitting diodes (LEDs) on the end portion of the drive assembly is accessible when the sliding cover is in the open position. The sliding cover may be configured to retain the end of the roller tube in the channel. The attachment member may include a spring that may be configured to secure the end of the roller tube within the channel. The sliding cover may have a straight shape.

A mounting bracket may include a base configured to attach the mounting bracket to a structure. The mounting bracket may include an attachment member that may extend from the base. The attachment member may define a channel that may be configured to slidingly receive an end of a roller tube. The mounting bracket may include two or more components configured to secure the end of the roller tube within the channel. The structure may be a wall or a ceiling. The two or more components may include a spring within the channel and/or a sliding cover. The sliding cover may define a plurality of barbs that may be configured to secure the sliding cover in a closed position and/or an open position. The plurality of barbs may be configured to secure the end of the roller tube within the channel.

A mounting bracket system may include a mounting bracket and a bracket cover. The mounting bracket may include an arm, a base, and an attachment member. The base may extend from the arm at a first end and may be configured to attach the mounting bracket to a structure. The attachment member may extend from the arm at a second end opposite the first end. The attachment member may define a channel that may be configured to slidingly receive an end of a drive assembly in a roller tube. The bracket cover may be configured to be mounted over the attachment member. The mounting bracket may be configured to retain electrical wiring for powering a drive assembly within the roller tube. The base of the mounting bracket may be configured to conceal an electrical wall box when the mounting bracket is mounted to the structure. The bracket cover may include a body that defines a recess for receiving the attachment member of the mounting bracket. The mounting bracket system may include a base cover that may be configured to be mounted over the base. The bracket cover may include feet that may be configured to attach the bracket cover to the structure. The feet of the bracket cover may extend from the body of the bracket cover in the same direction as the base extends from the arm of the mounting bracket when the bracket cover is mounted over the arm of the mounting bracket. The base cover may be configured to be mounted over the base of the mounting bracket and the feet of the bracket cover. The feet may be detachable from the body of the bracket cover, for example, to enable the feet to be attached to another bracket cover. The feet may be attached to the body of the bracket cover via fasteners received through openings. The feet of the bracket cover may include respective openings for receiving fasteners to attach the bracket cover to the structure. The base cover may be configured to be connected to the bracket cover, for example, such that the base cover captures the bracket cover against the mounting bracket. The base cover may include projections that may be received in notches of the bracket cover for holding the bracket cover against the arm of the mounting bracket. The base cover may include tabs that may be received in respective recesses in the base of the mounting bracket and may be captured under respective extensions of the base for holding the base cover against the base. The bracket cover may include one or more magnets that may be positioned adjacent to one or more metal elements inside of the arm of the mounting bracket when the bracket cover is mounted over the arm for holding the bracket cover against the arm. When the arm of the mounting bracket is received in the recess of the bracket cover, an outer surface of the arm may be adjacent to an inner surface of the recess. The outer surface of the arm may define no features for allowing attachment to the inner surface of the recess. The mounting bracket system may include an electrical wall box for receiving electrical wiring for powering the drive assembly within the roller tube. The electrical wall box may define a body, a rim, and one or more ears. The ears may be configured to hold the electrical wall box at a pre-determined depth within the structure.

An electrical wall box may be adapted to be installed in a cavity in a structure. The electrical wall box may include a body and an ear. The body may have a rim that may define a front opening of the electrical wall box. The ear may have an elongated portion that may extend from the rim. The ear may have a flange at an opposite end of the elongated portion as the rim. The elongated portion having a length. When the electrical wall box is installed in the cavity in the structure, the flange of the ear may be configured to abut a surface of the structure, for example, to prevent the rim of the structure from being inserted into the cavity farther than the length of the elongated portion. After the electrical wall box is installed in the cavity in the structure, the ear may be configured to be removed from the electrical wall box. The body may be cylindrical and the opening may be circular. The electrical wall box may include two ears at opposite sides of the opening. The electrical wall box may include a cap that may be configured to be installed in the cavity between the rim of the body and the surface of the structure. The cap may include a gap that may be configured to receive electrical wiring when the cap is installed in the cavity. The body may include a mounting opening that may be configured to receive a mounting to secure the electrical wall box to the structure. The mounting screw may be received in the mounting opening while oriented substantially parallel to the body of the electrical wall box.

A jig may be used for installing a mounting bracket of a motorized window treatment adjacent to a window. The jig may include a body that defines at least two mounting screw holes for drilling pilot holes for mounting screws of the mounting bracket. The body may define a wall-box hole for drilling a pilot hole for an electrical wall box to be located behind the mounting bracket. The jig may include a spacing member that may be configured to move with respect to the body. The spacing member may be configured to be fixed in position. The jig may include a locating member that may be configured to move with respect to the spacing member. The locating member may be configured to be fixed in position. When the spacing member and the locating member are fixed in position and the locating member is located in a corner of a window, the spacing member may be configured to space the mounting-screw holes and the wall-box hole of the body from the corner of the window. The body may define four mounting-screw holes that may be located in a rectangular orientation with respect to each other. The wall-box hole may be located between the mounting-screw holes.

DETAILED DESCRIPTION

Figure 1:
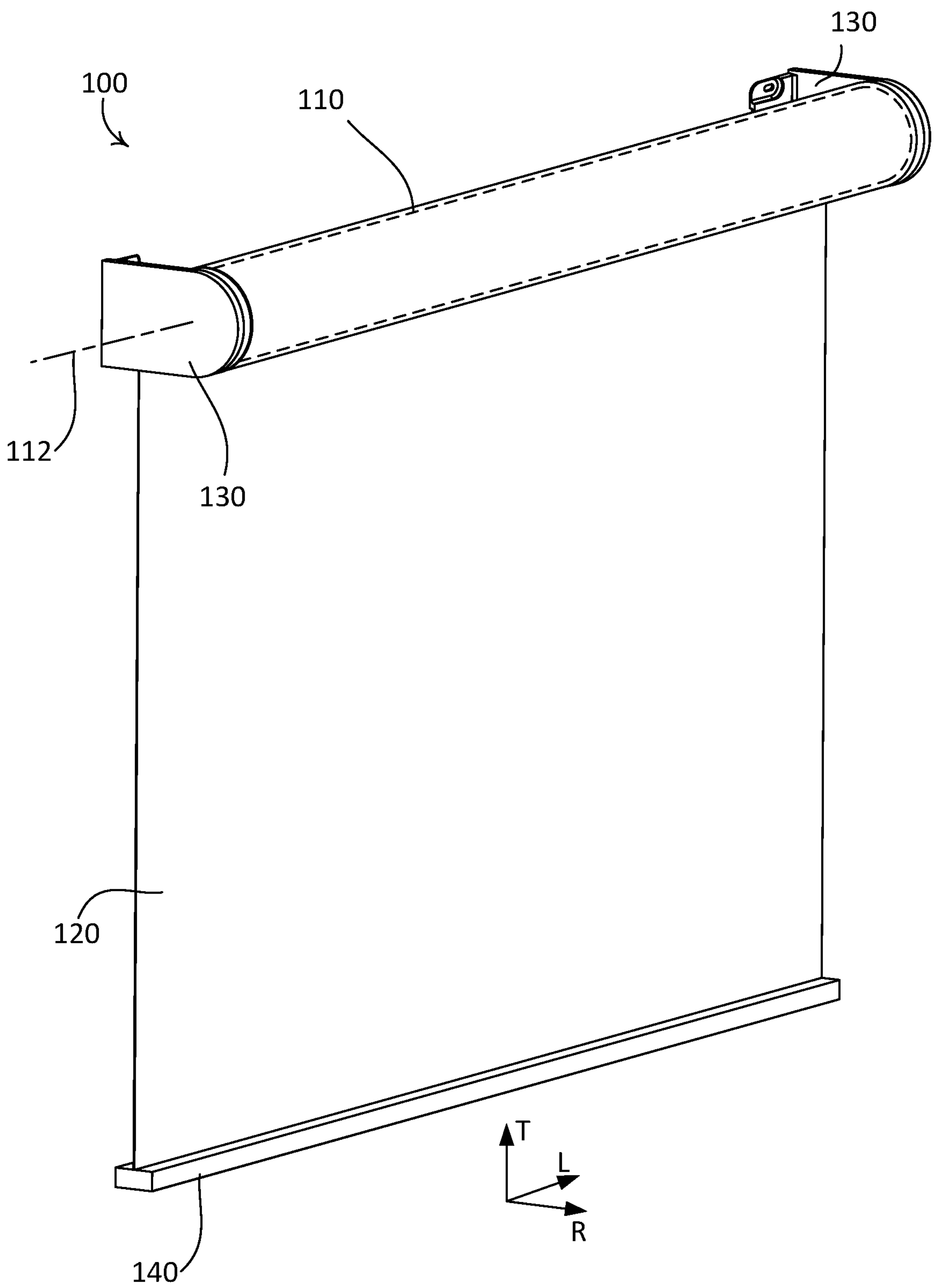
FIG. 1 is an example motorized window treatment.

FIG. 1 depicts an example motorized window treatment 100 (e.g., a motorized window treatment system) that includes a roller tube 110 and a flexible material 120 (e.g., a covering material) windingly attached to the roller tube 110. The motorized window treatment 100 may include one or more mounting brackets 130 configured to be coupled to or otherwise mounted to a structure. For example, each of the mounting brackets 130 may be configured to be mounted to (e.g., attached to) a window frame, a wall, or other structure, such that the motorized window treatment 100 is mounted proximate to an opening (e.g., over the opening or in the opening), such as a window for example. The mounting brackets 130 may be configured to be mounted to a vertical structure (e.g., wall-mounted to a wall as shown in FIG. 1) and/or mounted to a horizontal structure (e.g., ceiling-mounted to a ceiling).

Figure 2A:
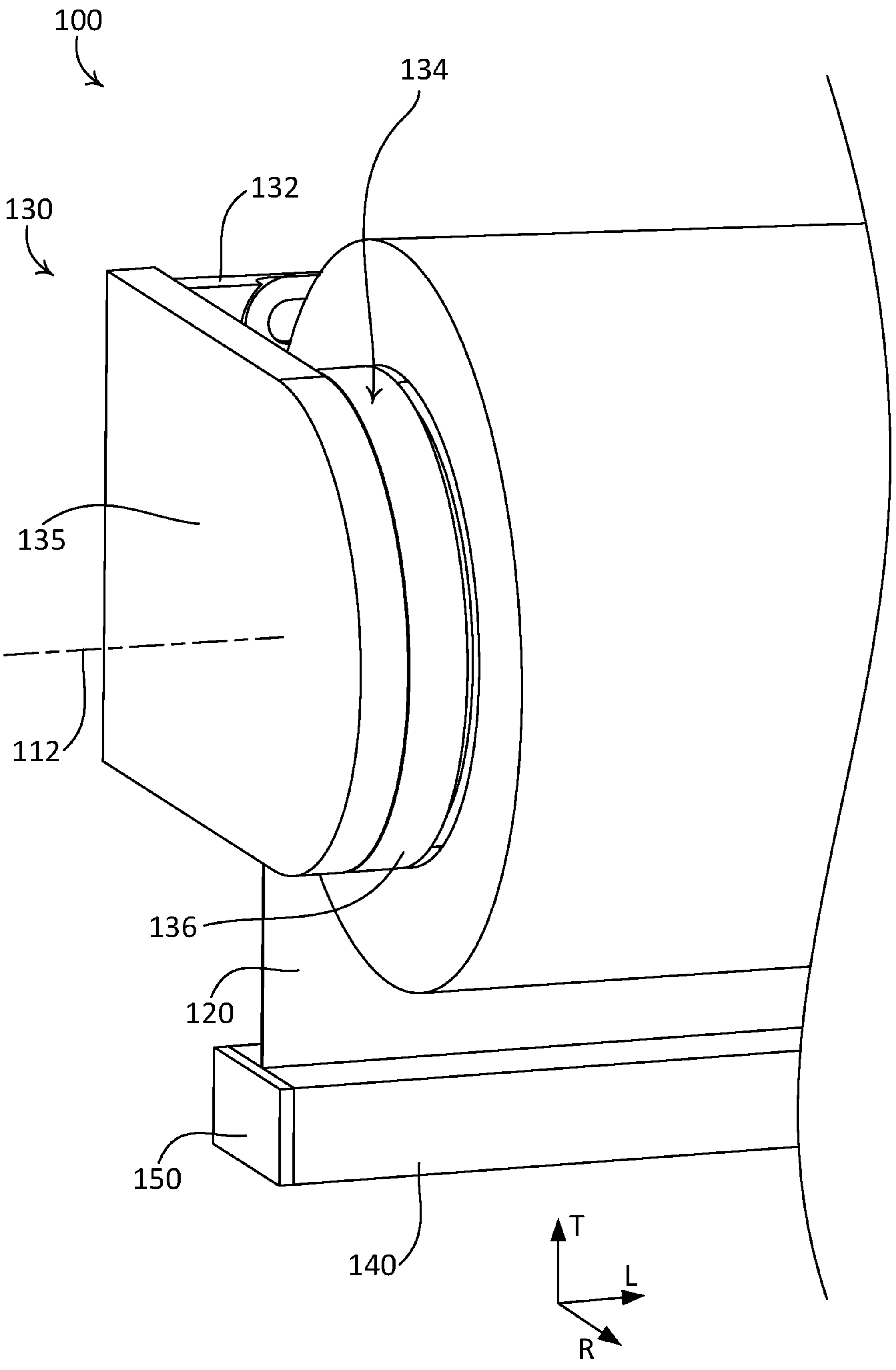
FIG. 2A is an enlarged perspective view of the example motorized window treatment shown in FIG. 1 with a sliding cover in a closed position.

The roller tube 110 may operate as a rotational element of the motorized window treatment 100. The roller tube 110 may be elongate along a longitudinal direction L and rotatably mounted (e.g., rotatably supported) by the mounting brackets 130. The roller tube 110 may define a longitudinal axis 112. The longitudinal axis 112 may extend along the longitudinal direction L. The mounting bracket 130 may extend from the structure in a radial direction R. The radial direction R may be defined as a direction perpendicular to the structure and the longitudinal axis 112. The flexible material 120 may be windingly attached to the roller tube 110, such that rotation of the roller tube 110 causes the flexible material 120 to wind around or unwind from the roller tube 110 along a transverse direction T that extends perpendicular to the longitudinal direction L. For example, rotation of the roller tube 110 may cause the flexible material 120 to move between a raised (e.g., open) position (e.g., as shown in FIG. 2A) and a lowered (e.g., closed) position (e.g., as shown in FIG. 1) along the transverse direction T.

The roller tube 110 may be a low-deflection roller tube and may be made of a material that has high strength and low density, such as carbon fiber. The roller tube 110 may have, for example, a diameter of approximately two inches. For example, the roller tube 110 may exhibit a deflection of less than ¼ of an inch when the flexible material 120 has a length of 12 feet and a width of 12 feet (e.g., and the roller tube 110 has a corresponding width of 12 feet and the diameter is two inches). Examples of low-deflection roller tubes are described in greater detail in U.S. Patent Application Publication No. 2016/0326801, published Nov. 10, 2016, entitled LOW-DEFLECTION ROLLER SHADE TUBE FOR LARGE OPENINGS, the entire disclosure of which is hereby incorporated by reference.

The flexible material 120 may include a first end (e.g., a top or upper end) that is coupled to the roller tube 110 and a second end (e.g., a bottom or lower end) that is coupled to a hembar 140. The hembar 140 may be configured, for example weighted, to cause the flexible material 120 to hang vertically. Rotation of the roller tube 110 may cause the hembar 140 to move toward or away from the roller tube 110 between the raised and lowered positions. An end cap 150 (FIG. 2A) may be installed on each end of the hembar 140. The end cap 150 may be configured to cover the opposed ends of the hembar 140. For example, the end cap 150 may provide a finished end to the hembar 140.

The flexible material 120 may be any suitable material, or form any combination of materials. For example, the flexible material 120 may be "scrim," woven cloth, non-woven material, light-control film, screen, and/or mesh. The motorized window treatment 100 may be any type of window treatment. For example, the motorized window treatment 100 may be a roller shade as illustrated, a soft sheer shade, a drapery, a cellular shade, a Roman shade, or a Venetian blind. As shown, the flexible material 120 may be a material suitable for use as a shade fabric, and may be alternatively referred to as a flexible material. The flexible material 120 is not limited to shade fabric. For example, in accordance with an alternative implementation of the motorized window treatment 100 as a retractable projection screen, the flexible material 120 may be a material suitable for displaying images projected onto the flexible material.

Figure 3:
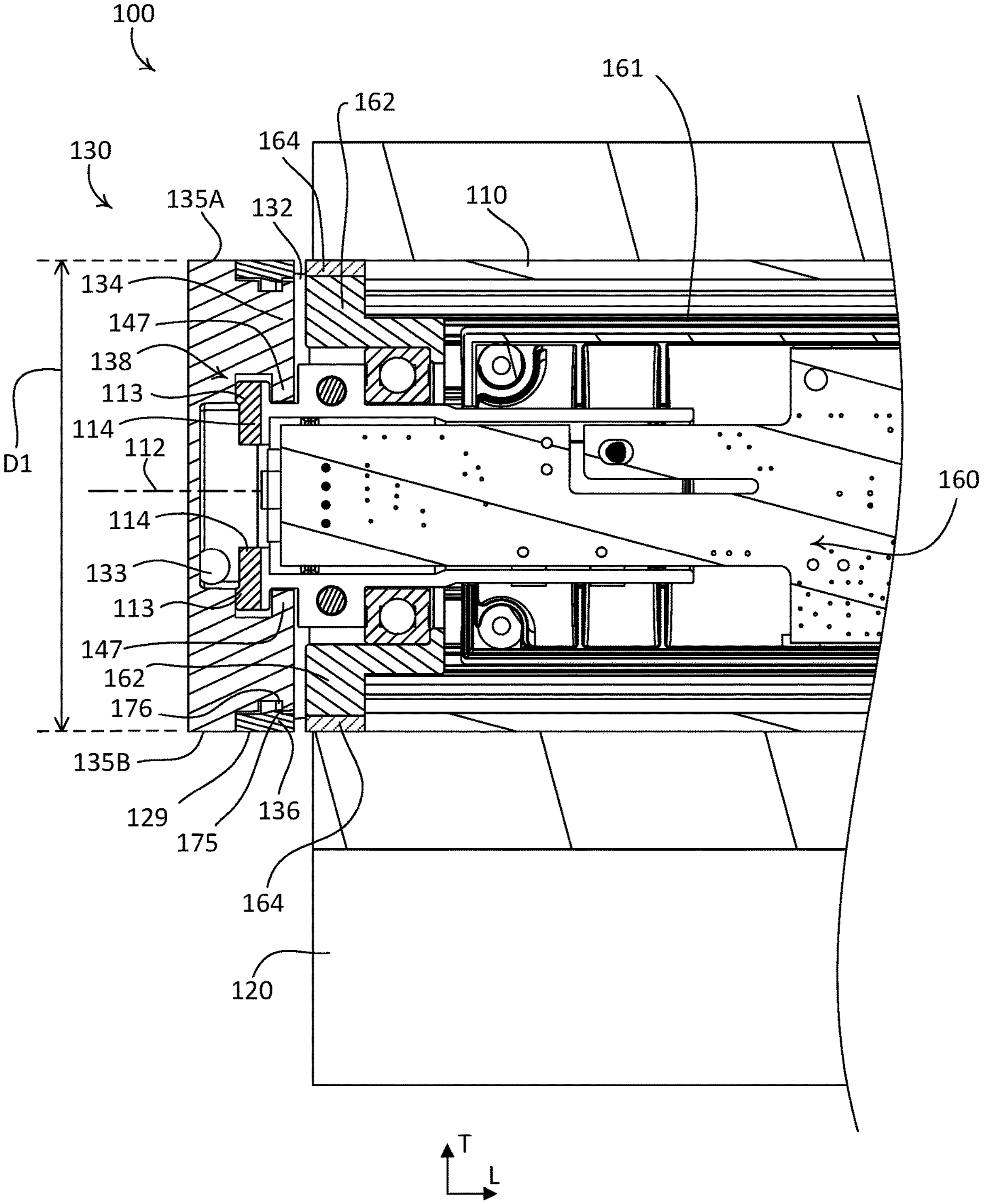
FIG. 3 is an enlarged front cross-section view of the example motorized window treatment shown in FIG. 1.
Figure 4:
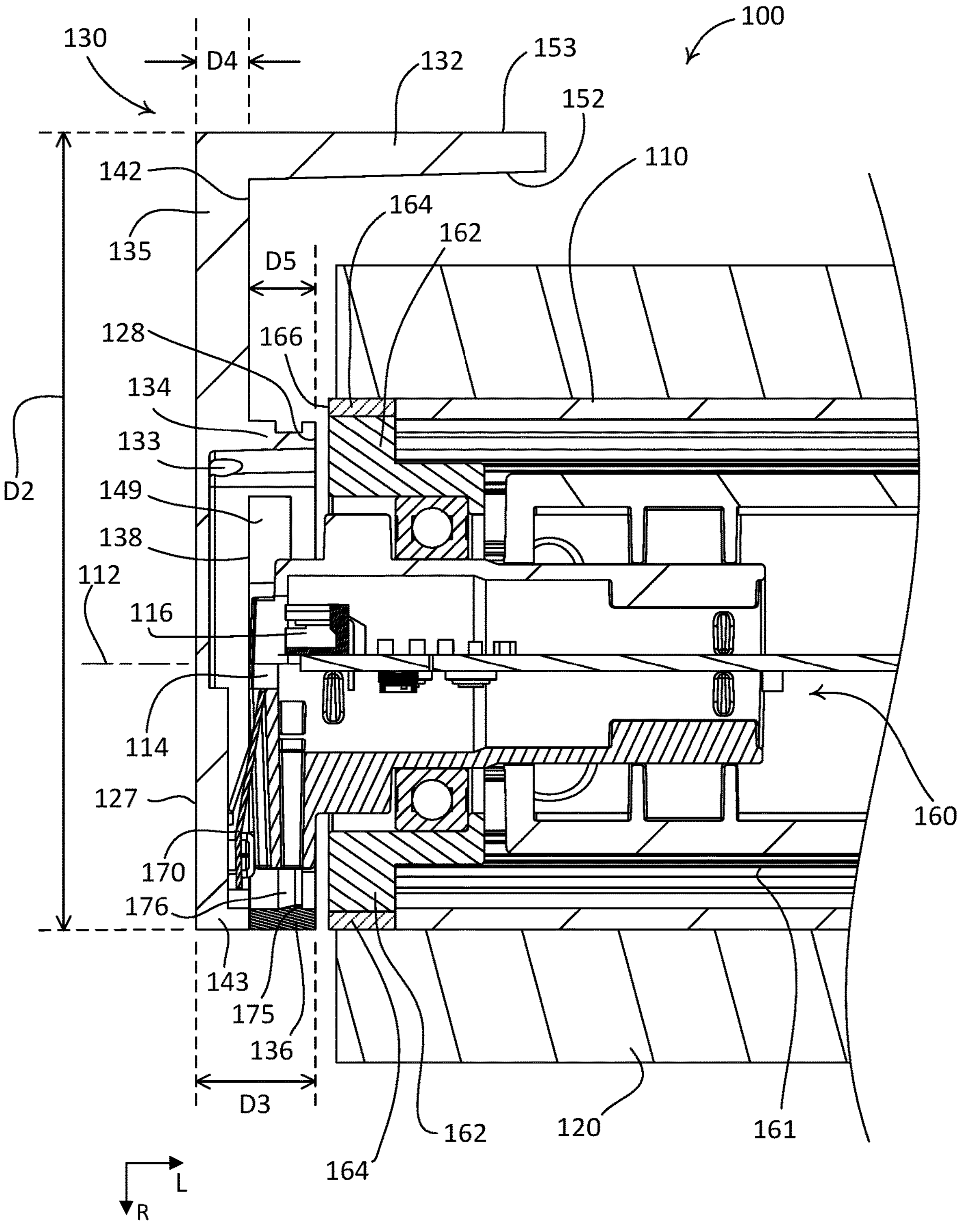
FIG. 4 is an enlarged top cross-section view of the example motorized window treatment shown in FIG. 1.
Figure 5:
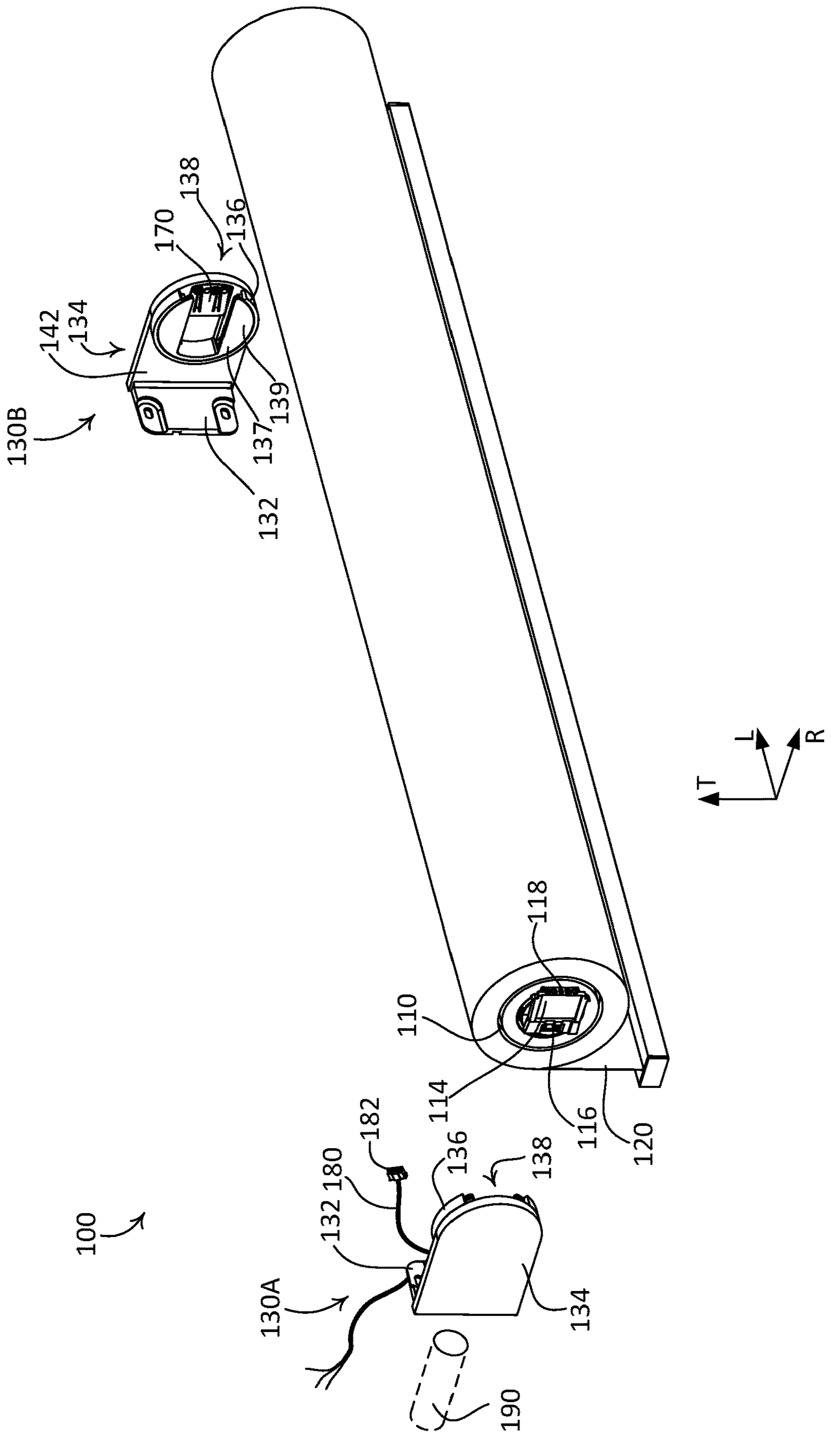
FIG. 5 is a partially exploded view of the example motorized window treatment shown in FIG. 1.
Figure 8A:
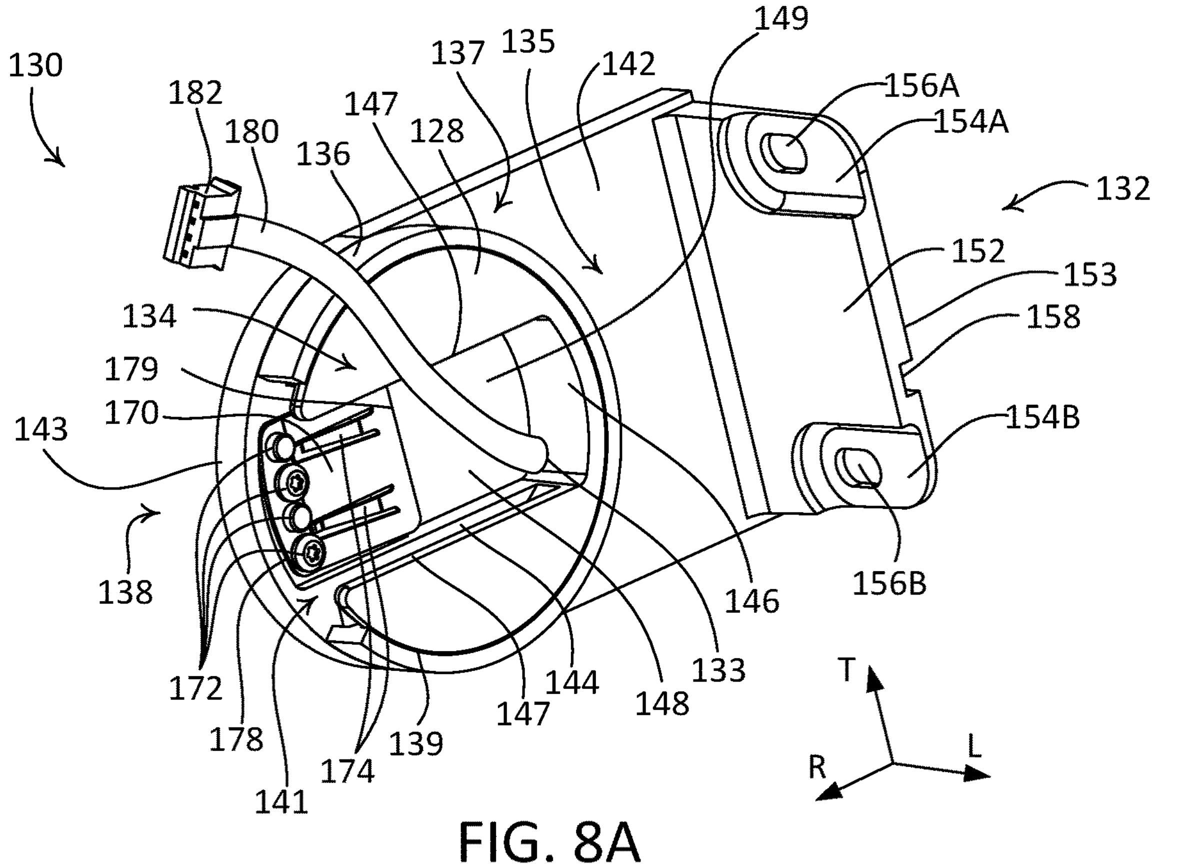
FIG. 8A depicts an example mounting bracket with electrical wiring and a sliding cover in an open position.

The motorized window treatment 100 may include a drive assembly 160 (e.g., a motor drive unit) as shown in FIGS. 3 and 4. The drive assembly 160 may at least partially be disposed within the roller tube 110. For example, the drive assembly 160 may include a control circuit that may include a microprocessor and may be mounted to a printed circuit board. The drive assembly 160 may be powered by a power source (e.g., an alternating-current or direct-current power source) provided by electrical wiring 180 (e.g., as shown in FIGS. 5 and 8A). The drive assembly 160 may be operably coupled to the roller tube 110 such that when the drive assembly is actuated, the roller tube 110 rotates. The drive assembly 160 may be configured to rotate the roller tube 110 of the example motorized window treatment 100 such that the flexible material 120 is operable between the raised position and the lowered position. The drive assembly 160 may be configured to rotate the roller tube 110 while reducing noise generated by the drive assembly (e.g., noise generated by one or more gear stages of the drive assembly). Examples of drive assemblies for motorized window treatments are described in greater detail in commonly-assigned U.S. Pat. No. 6,497,267, issued Dec. 24, 2002, entitled MOTORIZED WINDOW SHADE WITH ULTRAQUIET MOTOR DRIVE AND ESD PROTECTION, and U.S. Pat. No. 9,598,901, issued Mar. 21, 2017, entitled QUIET MOTORIZED WINDOW TREATMENT SYSTEM, the entire disclosures of which are hereby incorporated by reference.

Figure 2B:
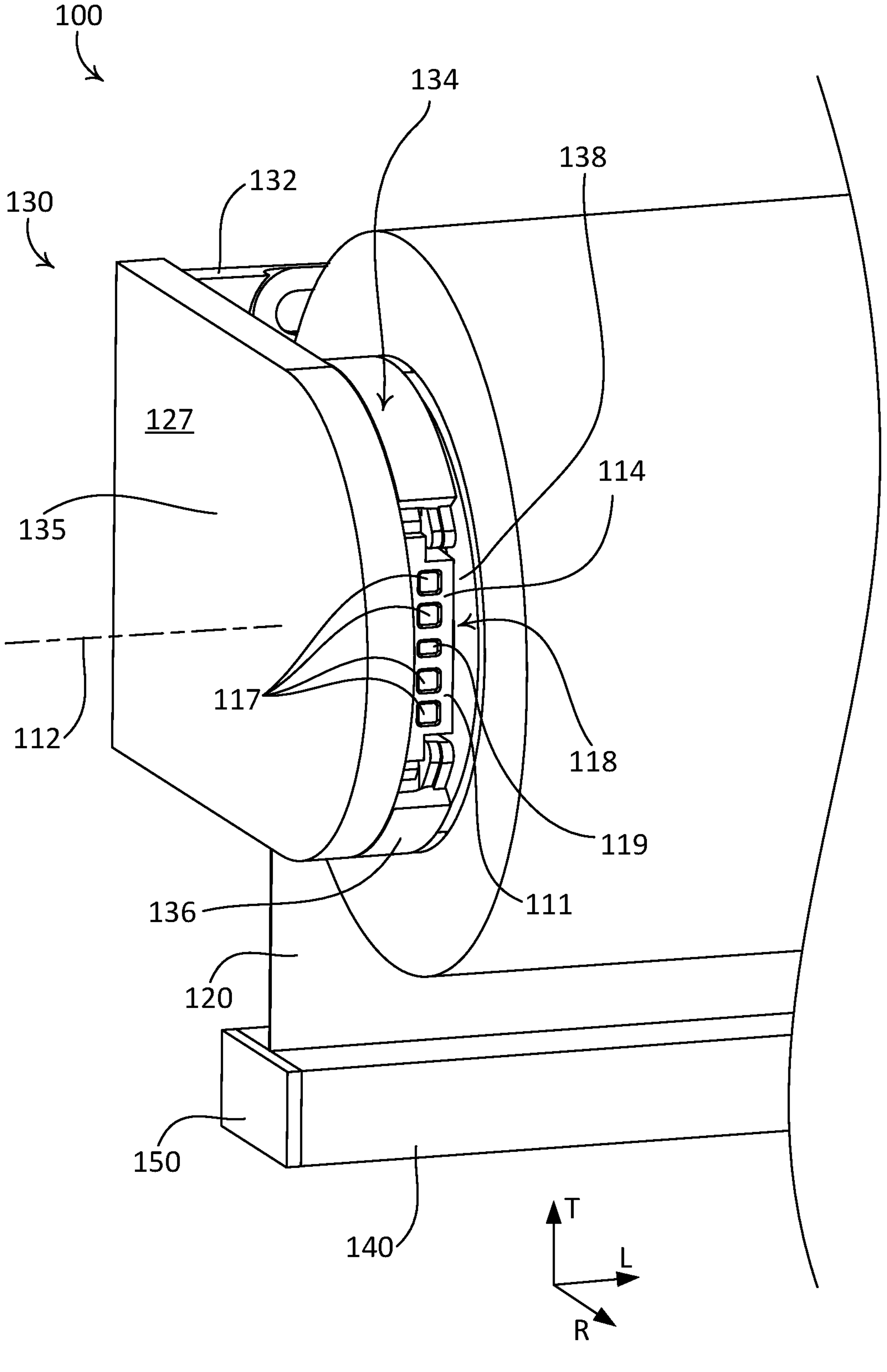
FIG. 2B is an enlarged perspective view of the example motorized window treatment shown in FIG. 1 with the sliding cover in an open position.

FIGS. 2A and 2B are enlarged views of an end portion of the example motorized window treatment 100 shown in FIG. 1. The mounting brackets 130 may be configured to secure, without requiring a tool, the roller tube 110 in a first direction parallel to the longitudinal axis 112 (e.g., the longitudinal direction L), in a second direction that is parallel to the structure and perpendicular to the longitudinal axis (e.g., the transverse direction T), and in a third direction perpendicular to the structure and the longitudinal axis (e.g., the radial direction R). As shown, each mounting bracket 130 may include a base 132 (e.g., a foot) and an attachment member 134 connected to the base 132 via an arm 135. The arm may define an outer surface 127. The base 132 may be configured to be attach the mounting bracket 130 to a structure. The structure may include a window frame, a wall, a ceiling, or other structure, such that the motorized window treatment 100 is mounted proximate to an opening (e.g., over the opening or in the opening), such as a window for example. When the mounting bracket 130 is attached to a vertical structure, such as a wall (e.g., as shown in FIGS. 2A and 2B), the arm 135 of the mounting bracket 130 may extend horizontally (e.g., in the radial direction R) from the base 132 to the attachment member 134. When the mounting bracket 130 is attached to a horizontal structure, such as to the bottom of a ceiling, the arm 135 may extend vertically (e.g., in the transverse direction T) from the base 132 to the attachment member 134.

Referring again to FIG. 2A, the mounting bracket 130 may include a sliding cover 136. The sliding cover 136 is in a closed position in FIG. 2A. The sliding cover 136 may be received by the attachment member 134. The sliding cover 136 may have a circular shape or a substantially rectangular shape. The sliding cover 136 may be rotatably received by the attachment member 134. As shown in FIG. 2B, the attachment member 134 may define a channel 138 that is configured to receive an end portion 114 of the drive assembly 160 that is received in the roller tube 110. The channel 138 may be configured for sliding receipt of the end portion 114 of the drive assembly 160. The sliding cover 136 may be configured to cover the channel 138 when the end portion 114 is fully received within the channel 138. For example, the sliding cover 136 may be operable between a closed position (e.g., a lowered position) as shown in FIG. 2A and an open position (e.g., a raised position) as shown in FIG. 2B. The sliding cover 136 may rotate around the longitudinal axis 112 between the closed position and the open position. When the sliding cover 136 is in the open position, the end portion 114 of the drive assembly 160 may be installed into the channel 138 of the attachment member 134. When the end portion 114 of the drive assembly 160 is fully installed in the channel 138, the sliding cover 136 may be rotated into the closed position in which the sliding cover 136 hides the end portion 114 and the channel 138 from view. The sliding cover 136 may have the same color and/or finish as the arm 135 of the mounting bracket 130 to provide a consistent appearance.

Figure 9B:
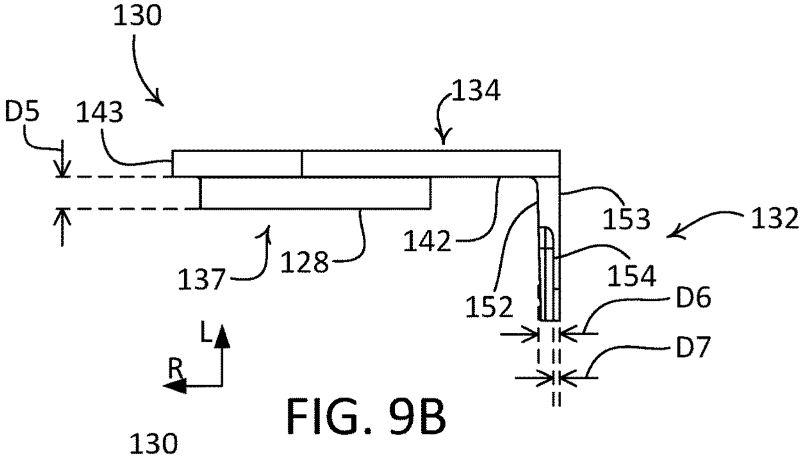
FIGS. 9A-9E depict projection views of the example mounting bracket shown in FIGS. 8A and 8B.
Figure 9D:
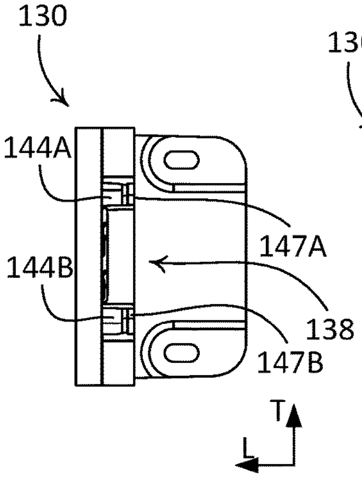
Figure 9A:
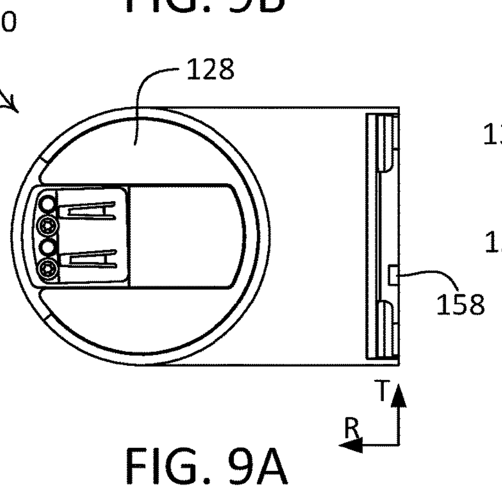
Figure 9E:
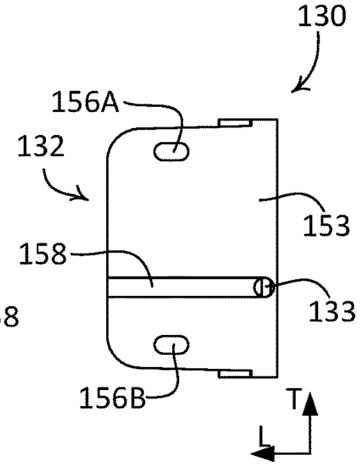
Figure 9C:
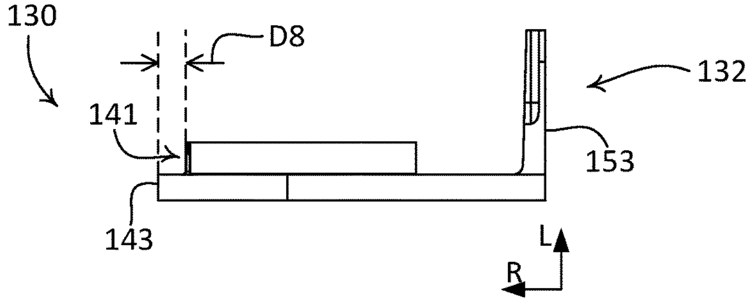

As shown in FIG. 2B, the end portion 114 of the drive assembly 160 may include a front surface 111 having a user interface 118 that may be accessible when the roller tube 110 is received within the channel 138 and the sliding cover 136 is in the open position. For example, the user interface 118 may include one or more buttons and/or visual indicators arranged on the front surface 111 of the end portion 114, e.g., four buttons 117 and one visual indicator 119 as shown in FIG. 2B. When in the closed position, the sliding cover 136 may cover an opening (e.g., such as the opening 141 shown in FIGS. 8A and 9C) of the channel 138 and/or the end portion 114 of the drive assembly 160. The sliding cover 136 may be configured to retain the end portion 114 of the drive assembly 160 within the channel 138.

FIG. 3 is an enlarged front cross-section view of the example motorized window treatment 100 shown in FIG. 1. The drive assembly 160 may include a body 161 that may be received in the roller tube 110 and a mandrel 162 that may be coupled to an end of the roller tube 110. The body 161 may be cylindrical. The drive assembly 160 may include a drive member that may be located at the end of the drive assembly 160 opposite the mandrel 162. The drive member may be coupled to the roller tube 110 for rotating the roller tube 110. The mandrel 162 may be surrounded by a ring portion 164. For example, the ring portion 164 may have a thickness that is sized such that an outer surface of the ring portion 164 is substantially flush with an outer surface of the roller tube. The flexible material 120 may be wrapped around both the roller tube 110 and the ring portion 164 as shown in FIG. 3.

As shown in FIG. 3, the end portion 114 of the drive assembly 160 may extend from the body 161 and may be received within the channel 138 defined by the attachment member 134 of the mounting bracket 130. The drive assembly 160 may be configured to rotate the roller tube 110 about the longitudinal axis 112 when the end portion 114 of the drive assembly 160 is received within the channel 138. The end portion 114 of the drive assembly 160 may include rails 113. The rails 113 may define an extension of the end portion 114 having a wider cross section. The channel 138 may be configured to secure the roller tube 110 in position in the longitudinal direction L (e.g., along the longitudinal axis 112). For example, the channel 138 may be configured to lock the roller tube 110 in position along the longitudinal axis 112 such that translational movement of the roller tube 110 in the longitudinal direction L is prevented. The channel 138 may have a T-shaped cross section. For example, the channel 138 may be configured to receive the rails 113 (e.g., the wider cross section portion) of the end portion 114 of the drive assembly 160. The channel 138 may define one or more flanges (e.g., such as flanges 147 shown in FIGS. 8A and 8B) to secure the end portion 114 within the channel 138. The flanges may secure the rails 113 within the channel 138. For example, the flanges may engage the rails 113 of the end portion 114 of the drive assembly 160 such that movement of the roller tube 110 in the longitudinal direction L is prevented. Each mounting bracket 130 of the motorized window treatment 100 may include the channel 138 having the T-shaped cross section so that the roller tube 110 may be locked in position in the longitudinal direction L at both ends of the roller tube 110.

The mounting bracket 130 may define a bore 133 that extends through the arm 135 and/or the base 132. The bore 133 may be configured to receive electrical wiring (e.g., the electrical wiring 180 shown in FIGS. 5 and 8A) for powering the motorized window treatment 100.

When the end portion 114 is fully received in the channel 138, the center of the attachment member 134 may be aligned with the center of the roller tube 110 along the longitudinal axis 112. As shown in FIG. 3, the arm 135 of the mounting bracket 130 may define an upper surface 135A and a lower surface 135B. The sliding cover 136 may be configured to provide a smooth surface between the attachment member 134 and the sliding cover 136. For example, a thickness of the sliding cover 136 may be configured such that an outer surface 129 of the sliding cover 136 is substantially flush with the upper surface 135A and/or the lower surface 135B of the arm 135. The arm 135 of the mounting bracket 130 may be characterized by a distance D1 between the upper surface 135A and the lower surface 135B that may be approximately equal to the diameter of the roller tube 110 (e.g., less than or equal to six inches, such as equal to approximately two inches). The sliding cover 136 may define a diameter that may be approximately equal to or less than the diameter of the roller tube 110. The sliding cover 136 may define a diameter of the attachment member 134. The diameter of the sliding cover 136 may be equal to the distance D1. The mounting bracket 130 may provide an aligned, consistent appearance next to the end of the roller tube 110 when the distance D1 of the arm 135, the diameter of the attachment member 134 (e.g., the diameter of the sliding cover 136), and the diameter of the roller tube 110 are approximately equal.

FIG. 4 is an enlarged top cross-section view of the example motorized window treatment 100 shown in FIG. 1. The arm 135 of the mounting bracket 130 may extend substantially perpendicular from the base 132 to the attachment member 134. The base 132 may define a front surface 152 and a rear surface 153. The bore 133 (as shown in FIG. 3) may begin within the channel 138 and extend through the arm 135 to the rear surface 153 of the base 132.

The arm 135 of the mounting bracket 130 may extend a distance D2 from the rear surface 153 of the base 132. The arm 135 may define a distal end 143. The distance D2 may be measured from the rear surface 153 to the distal end 143 and may be, for example, approximately three inches. The distance D2 may be based on a thickness of the flexible material 120 and/or the height of the window. When the mounting bracket 130 is wall-mounted, the spring 170 may be configured to lock the end portion 114 of the drive assembly 160 in the radial direction R. When the mounting bracket 130 is ceiling-mounted, the spring 170 may be configured to lock the end portion 114 of the drive assembly 160 in the transverse direction T.

The attachment member 134 and the arm 135 of the mounting bracket 130 may be sized to minimize (e.g., reduce) a light gap between an edge of the flexible material 120 and the structure. The outer surface 127 of the arm 135 may be distal from the end portion 114 of the drive assembly 160. The attachment member 134 may define an inner surface 128, which may face the end portion 114 of the drive assembly 160. The arm 135 and the attachment member 134 may be sized such that the outer surface 127 is a distance D3 from the inner surface. The arm 135 may be characterized by a distance D4 (e.g., a width) between the outer surface 127 and an inner surface 142, which may be, for example, approximately 0.20 inches. The distance D4 is large enough to allow the bore 133 to travel through the arm 135 from the base 132 to the channel 138 of the attachment member 134. The attachment member 134 may be characterized by a distance D5 (e.g., a width) between the inner surface 142 of the arm 135 and the inner surface 128 of the attachment member 134, which may be, for example, approximately 0.25 inches. The distance D3 may be, for example, approximately 0.45 inches. The distance D3 may define a minimum light gap that may exist between the edge of the flexible material 120 and the structure. For example, the distance D3 may be configured such that the minimum light gap is 0.5 inches or less.

The attachment member 134 along with the sliding cover 136 may provide a buffer space (e.g., at least the distance D5) between the edge of the flexible material 120 and the inner surface 142 of the arm 135. As the flexible material 120 is raised and lower on the roller tube 110, the position of the edge of flexible material 120 that is wrapped around the roller tube 110 may shift along the longitudinal direction L, which may be referred to as "telescoping" of the flexible material. As previously mentioned, the diameter of the sliding cover 136 may be equal to or less than the diameter of the roller tube 110. When the edge of the flexible material 120 moves towards the arm 135 of the mounting bracket 130, the edge of the flexible material 120 may overlap (e.g., hang over) the attachment member 134. The distance D5 may be sized to ensure that the flexible material 120 does not contact the inner surface 142 of the arm 135, which could potentially damage the flexible material. When the flexible material 120 has certain sizes (e.g., large dimensions) and thicknesses, a gap may be provided between the edge of the flexible material 120 and an end surface 166 of the ring portion 164 to provide additional space between the edge of the flexible material and the inner surface 142 of the arm 135 of the mounting bracket 130. The ring portion 164 may have the same color and/or finish as the arm 135 and the sliding cover 136 of the mounting bracket 130, such that the ring portion 164 blends in with the other parts of the motorized window treatment 100 and is not as noticeable when the ring portion 164 is exposed.

The mounting bracket 130 may include a spring 170. The spring 170 may be secured within the channel 138. The spring 170 may be configured to secure the end portion 114 of the drive assembly 160 within the channel 138. For example, the spring 170 may be configured to engage the end portion 114 of the drive assembly 160 such that the roller tube 110 is secured in a direction perpendicular to the structure. The spring 170 may be configured to flex as the end portion 114 of the drive assembly 160 is inserted into the channel 138.

FIG. 5 is a partially exploded view of the example motorized window treatment 100 shown in FIG. 1. The first mounting bracket 130A may receive the end portion 114 of the drive assembly 160 and the second mounting bracket 130B may receive an end portion (not shown) of an idler (not shown) at an opposite end of the roller tube 110. The first mounting bracket 130A (e.g., only one of the two mounting brackets) may be configured to retain the electrical wiring 180 for powering the drive assembly 160 within the roller tube 110. For example, the electrical wiring 180 may be received by the bore 133 as shown in FIG. 3. The electrical wiring 180 may be received into the bore 133 via an electrical wall box 190 mounted in the structure. The electrical wiring 180 may be electrically connected to an electric circuit within the electrical wall box 190. The electrical wall box 190 may be located at the location of one of the mounting brackets 130A, 130B (e.g., prior to installation of the mounting brackets). The base 132 of each of the mounting brackets 130A, 130B may be configured to conceal the electrical wall box 190. The electrical wiring 180 may terminate at a plug 182. The plug 182 may be configured to engage a corresponding socket 116 on the end portion 114 of the roller tube 110. The socket 116 may be electrically connected to the drive assembly 160 (e.g., shown in FIGS. 3 and 4) within the roller tube 110. The plug 182 may be inserted into the socket 116 prior to installing the end portion 114 of the drive assembly 160 into the channel 138. After the plug 182 is connected to the socket 116, the end portion 114 of the drive assembly 160 and the end portion of the idler may be slid into the channels of the respective mounting brackets 130A, 130B (e.g., in the radial direction R when the mounting brackets are wall-mounted or in the transverse direction T when the mounting brackets are ceiling-mounted). The electrical wiring 180 may be compressed in a rear portion 149 (FIG. 4) of the channel 138 that is not occupied by the end portion 114 of the drive assembly 160.

The mounting brackets 130A, 130B at each end of the roller tube 110 may similar geometries (e.g., may be identical). However, only one of the two mounting brackets 130A, 130B may have the electrical wiring 180 extending through the bore 133 and the channel 138. Although the electrical wiring 180 and the plug 182 are shown in FIG. 5 as received via the first mounting bracket 130A, it should be appreciated that the second mounting bracket 130B may also receive the electrical wiring and/or a plug if the drive assembly 160 is installed at the opposite end of the roller tube 110.

The attachment member 134 may include a drum 137 (e.g., a cylindrical drum). The drum 137 may extend from the inner surface 142 of the attachment member 134. The drum 137 may extend in the longitudinal direction L. The drum 137 may define an outer surface 139. The drum 137 may be configured to receive the end portion 114 of the drive assembly. For example, the drum 137 may define the channel 138. The sliding cover 136 may be received by the drum 137 and may surround the drum 137. The sliding cover 136 may operate around the drum 137 from the closed position to the open position. For example, the sliding cover 136 may be configured to partially surround the outer surface 139 of the drum 137. When the sliding cover 136 is in the closed position, the channel 138 and the end portion 114 of the drive assembly 160 are not accessible. When the sliding cover 136 is in the open position, the channel 138 and the end portion 114 of the drive assembly 160 may be exposed.

The sliding cover 136 may be configured to retain the end portion 114 of the drive assembly 160 or the end portion of the idler within the channel 138. For example, the sliding cover 136 may prevent the end portion 114 of the drive assembly 160 or the end portion of the idler from becoming disengaged from the channel 138 when the sliding cover is in the closed position. When the mounting bracket 130 is wall-mounted and the sliding cover 136 is in the closed position, the sliding cover 136 may be configured to lock the end portion 114 of the drive assembly 160 or the end portion of the idler in the radial direction R. When the mounting bracket 130 is ceiling-mounted and the sliding cover 136 is closed, the sliding cover 136 may be configured to lock the end portion 114 of the drive assembly 160 or the end portion of the idler in the transverse direction T.

The sliding cover 136 may include a rib 175 extending from an inner surface of the sliding cover (e.g., towards the attachment member 134). The central rib 175 may stretch between the ends of the sliding cover 136. The central rib 175 may be received in a slot 176 in the drum 137 of the attachment member 134. The slot 176 may stretch around the circumference of the drum 137.

The sliding cover 136 may provide a secondary means of locking the end portion 114 of the drive assembly 160 in the channel 138 (e.g., in addition to the spring 170). Alternatively, if the attachment member 134 has a flat front surface, the sliding cover 136 may be straight and may be configured to slide linearly (e.g., up or down) to move between the closed position and the open position (e.g., to slide out of the way of the channel 138).

The sliding cover 136 may define one or more barbs or other type of protrusion (not shown) that may extend from, for example, the rib 175. The barbs may be configured to secure the sliding cover 136 in a closed position or an open position. The drum 137 may define one or more notches or detents (not shown) that may be located in, for example, the slot 176. The notches may be configured to receive a respective barb of the barbs. For example, the sliding cover 136 may define two barbs positioned at distal ends of the sliding cover 136.

Figure 6:
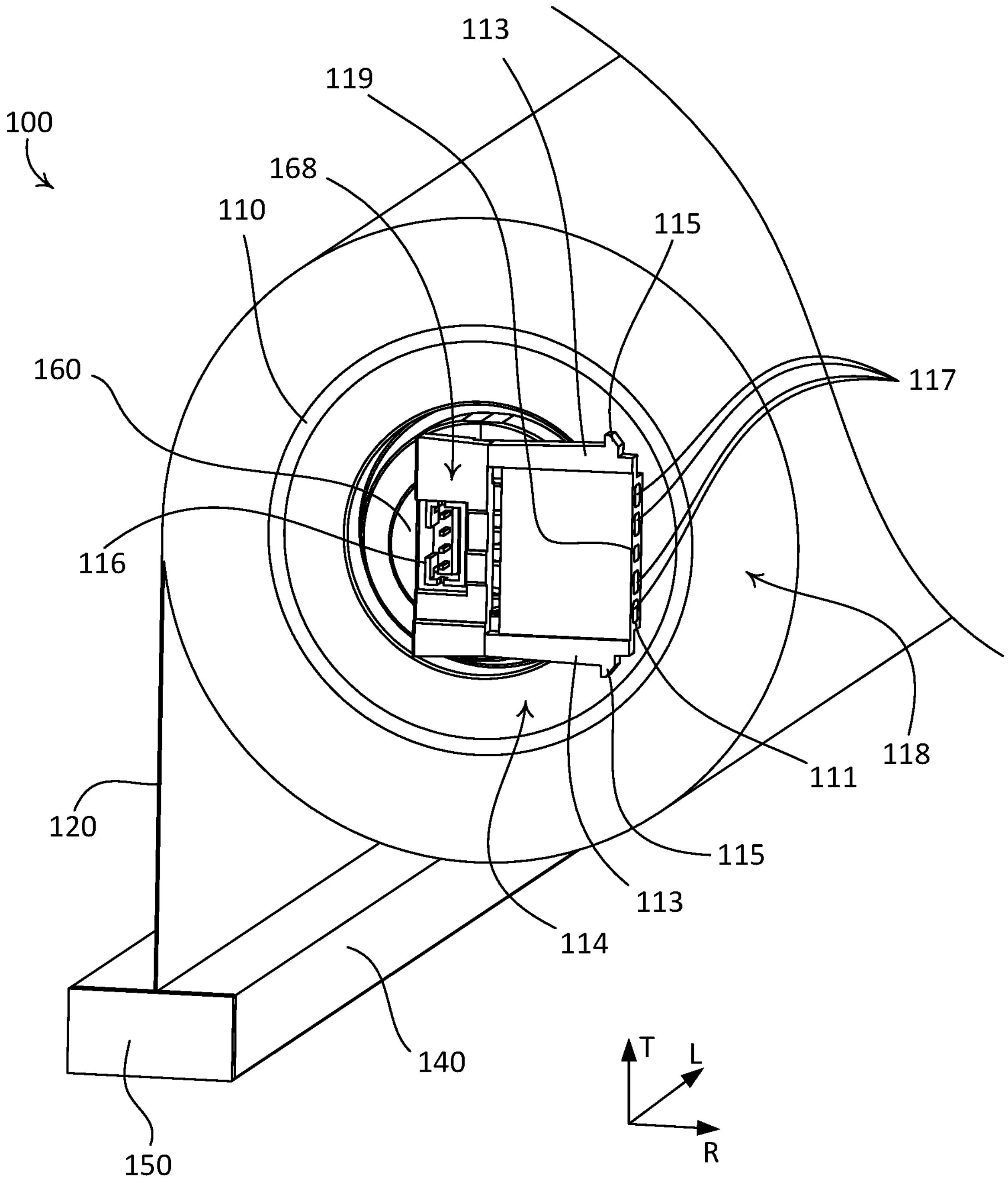
FIG. 6 depicts an example end portion of a roller tube of the example motorized window treatment shown in FIG. 1.

FIG. 6 depicts an enlarged end portion of the roller tube 110 of the example motorized window treatment 100 shown in FIG. 1. As previously mentioned, the end portion 114 of the drive assembly 160 may include the user interface 118, which may include the four buttons 117 and the single visual indicator 119 as shown in FIG. 6. For example, the visual indicator 119 may be illuminated by a light-emitting diode (LED) inside of the end portion 114 of the drive assembly 160. The buttons 117 and the visual indicators 119 may enable configuration and/or adjustment of the motorized window treatment 100. For example, the user interface 118 may be used to adjust the raised position and/or the lowered position of the flexible material 120. The user interface 118 may be configured to be received within the channel 138. The sliding cover 136 may cover the user interface 118 when in the closed position. The user interface 118 may define one or more tabs 115. The tabs 115 may be configured to engage the channel 138 (e.g., the slots 144A, 144B shown in FIGS. 8A-9E) for securing the roller tube 110 within the mounting bracket.

As shown in FIG. 6, the socket 116 may be oriented along the longitudinal direction L for receiving the plug 182 in the longitudinal direction L. When the plug 182 is inserted in the socket 116 and the end portion 114 is inserted in the channel 138, the electrical wiring 180 may be configured to bend in the channel 138 before entering the bore 133. The end portion 114 may be offset towards the front of the drive assembly 160 (e.g., the front surface 111 of the end portion 114 on which the user interface 118 is located) to form a recessed portion 168 towards the rear of the drive assembly 160 for providing additional room in the rear portion 149 of the channel 138 for the electrical wiring 180 when the end portion 114 is fully inserted in the channel 138. The socket 116 may be located in the recessed portion 168 towards the rear of the drive assembly 160. The socket 116 may also be oriented along the radial direction R, such that the socket 116 may receive the plug 182 from the rear of the end portion 114.

The end portion of the idler may a similar shape at the end portion 114 of the drive assembly 160 in order to be received in the channel 138 of the mount bracket 130 at the idler end of the roller tube 110. The end portion of the idler may not include the user interface 118 or the socket 116.

Figure 7A:
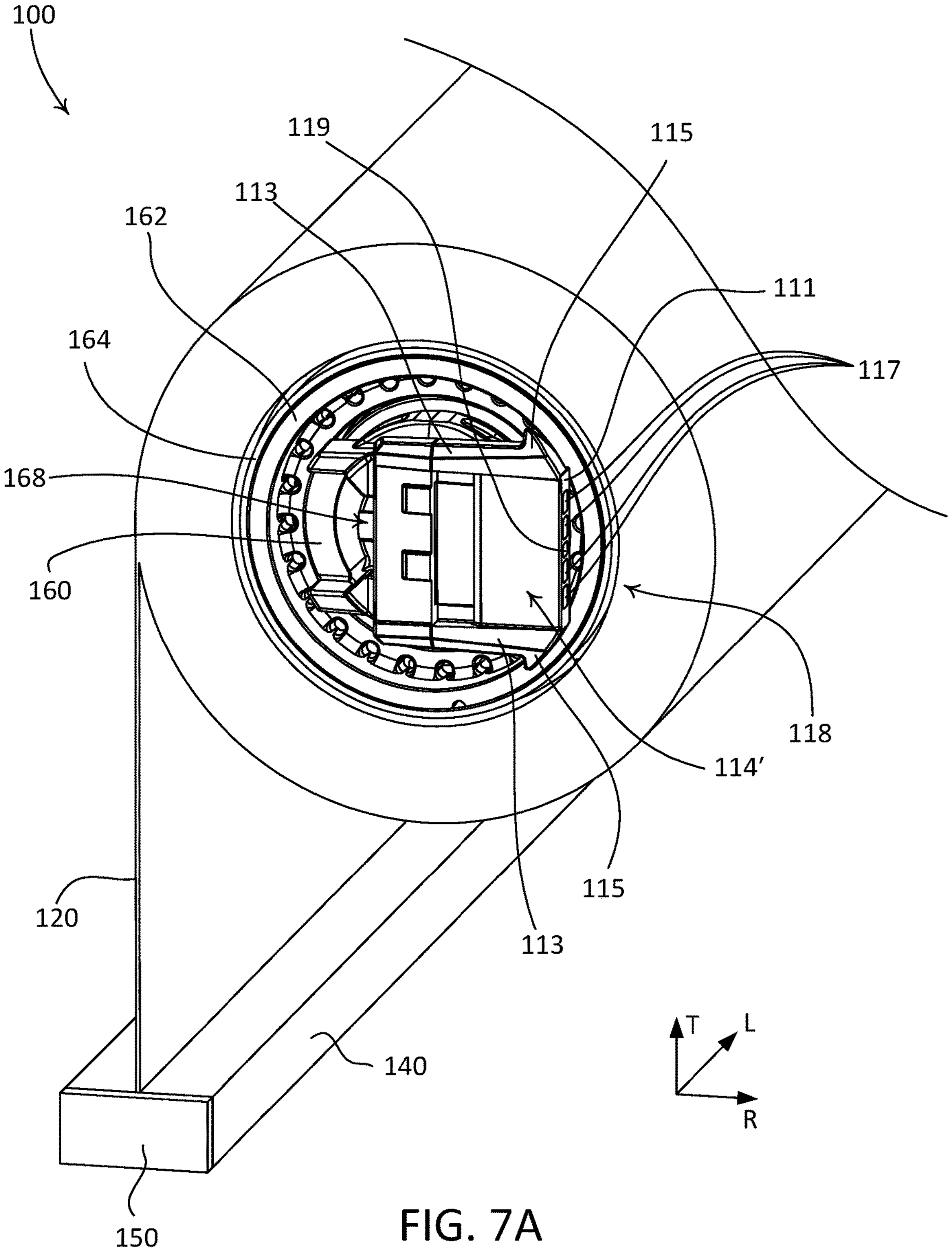
FIG. 7A depicts another example end portion of a roller tube of the example motorized window treatment shown in FIG. 1.
Figure 7B:
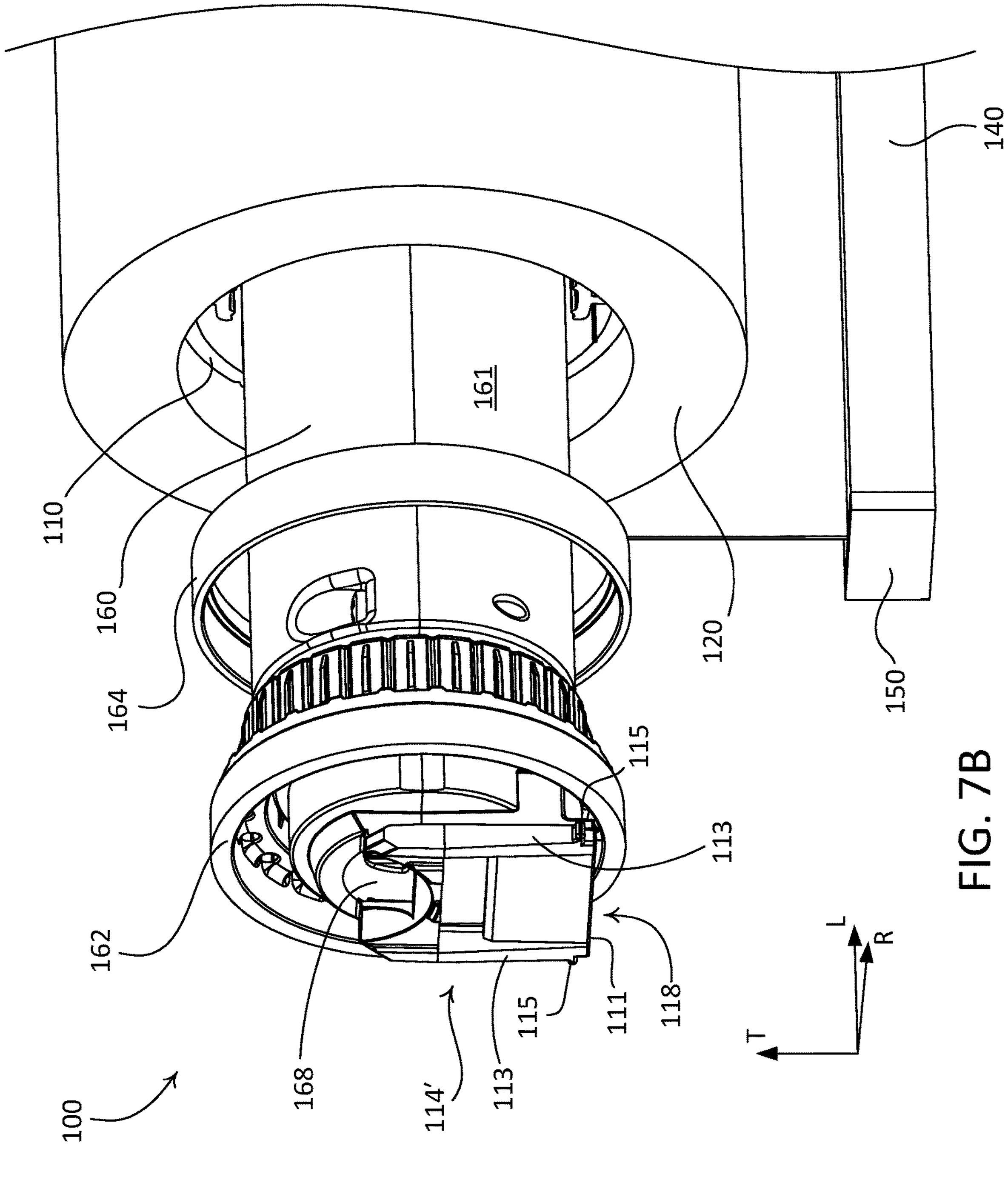
FIG. 7B depicts a partial exploded view of the motorized window treatment having the example end portion shown in FIG. 7A.

FIG. 7A depicts the motorized window treatment 100 having an alternate end portion 114' (e.g., another example end portion). The alternate end portion 114' may include a socket (not shown) that is oriented along the radial direction R for receiving the plug 182 along the radial direction, for example, from the rear through the recessed portion 168 in the alternate end portion 114'. FIG. 7B depicts a partial exploded view of the motorized window treatment 100 having the alternate end portion 114'. As shown in FIG. 7B, the ring portion 164 may be detached from the mandrel 162.

Figure 8B:
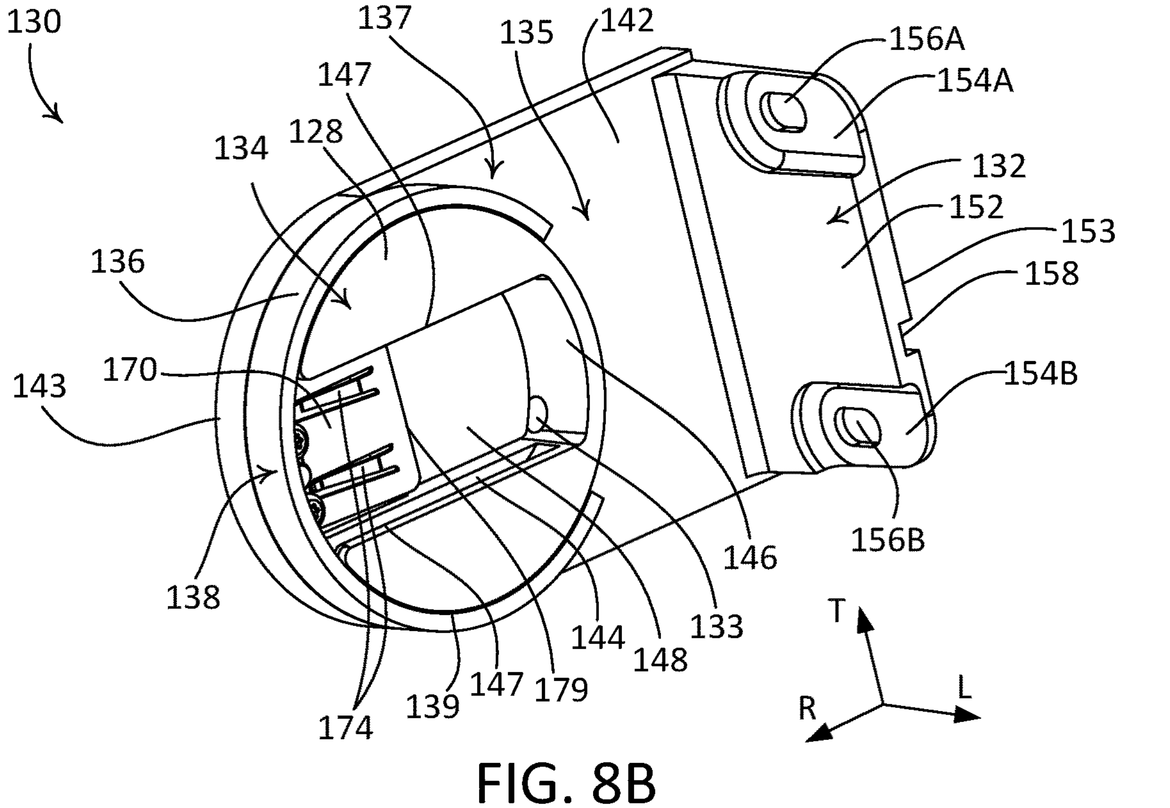
FIG. 8B depicts an example mounting bracket without electrical wiring and a sliding cover in a closed position.

FIG. 8A depicts the example mounting bracket 130 of the motorized window treatment 100 of FIG. 1 with the electrical wiring 180 shown and the sliding cover 136 in an open position. FIG. 8B depicts the example mounting bracket 130 without the electrical wiring 180 shown and the sliding cover 136 in a closed position. Although the electrical wiring 180 and the plug 182 are shown in FIG. 8A as received via the mounting bracket 130, it should be appreciated that the mounting bracket 130 shown in FIG. 8B may also receive electrical wiring and/or a plug. As previously discussed, the example mounting bracket 130 may include the base 132, the arm 135, and the attachment member 134. The base 132 may define depressions 154A, 154B on the front surface 152. The depressions 154A, 154B may have a reduced thickness when compared to a remainder of the base 132. The base 132 may include holes 156A, 156B therethrough. Each of the holes 156A, 156B may be configured to receive a fastener (not shown) for securing the mounting bracket 130 to a structure. The holes 156A, 156B may be located within the depressions 154A, 154B, respectively, such that the fasteners may be countersunk with respect to the front surface 152 of the base 132. Each of the holes 156A, 156B may be oblong shaped. For example, the holes 156A, 156B may be oblong shaped to allow for alignment of the mounting bracket 130 and/or alignment of the fasteners. The rear surface 153 of the base 132 may define a pathway 158 (e.g., a groove). The pathway 158 may be configured to receive the electrical wiring 180.

The channel 138 may define an opening 141 at a distal end 143 of the attachment member 134. The opening 141 may be a slot on the outer surface 139 of the drum 137. The channel 138 may extend from the opening 141 to a rear wall 146. The electrical wiring 180 may be received within the channel 138 via the bore 133. The channel 138 may be configured to retain the electrical wiring 180. The bore 133 may begin at the rear wall 146 of the channel 138 and may extend through the attachment member 134 and/or base 132. Additionally or alternatively, the mounting bracket 130 may include a socket (not shown). As an example, the socket may be located where the bore 133 meets the channel 138. The socket may be configured to receive a plug (not shown) that is attached to the drive assembly 160 via an electrical wiring (not shown).

The channel 138 may define slots 144 on either side of the channel 138. The slots 144 may be configured such that the channel 138 is T-shaped (e.g., has a T-shaped cross section). The slots 144 may be defined by flanges 147 defined by the drum 137. The flanges 147 may be configured to retain the end portion 114 of the drive assembly 160 within the channel 138. The flanges 147 may be configured to secure the roller tube in the transverse direction T. The channel 138 may define a side wall 148. The channel 138 may be configured such that the side wall 148 defines the intersection of the drum 137 and the inner surface 142 of the attachment member 134.

The spring 170 may be secured to the attachment member 134, for example, within the channel 138. For example, the spring 170 may be secured to the side wall 148 of the channel 138. As shown in FIG. 8A, the spring 170 may be secured in the channel 138 using one or more fasteners 172 and/or one or more bosses 171. The spring 170 may be positioned at the opening 141 of the channel 138, for example, using the bosses 271. For example, a forward edge 178 of the spring 170 may be aligned with the opening 141 and/or the distal end 143 of the attachment member 134. The forward edge 178 may engage the side wall 148 such that the forward edge 178 is substantially flush with the side wall 148. The spring 170 may include compliant fingers 174 that are configured to engage the side wall 148 and bias a rear edge 179 of the spring 170 away from the side wall 148. For example, the rear edge 179 may be spaced away from the side wall 148. The compliant fingers 174 may be configured to flex as the end portion 114 of the drive assembly 160 is inserted into the channel 138. For example, the end portion 114 of the drive assembly 160 may apply a force on the spring 170 that pushes the rear edge 179 closer to the side wall 148. When the end portion 114 is fully inserted into the channel 138, the compliant fingers 174 may enable the rear edge 179 to exert a force on the end portion 114 of the drive assembly 160 such that the end portion 114 is retained within the channel 138. The rear edge 179 may exert the force on the end portion 114 of the drive assembly 160 in the radial direction R when the mounting bracket 130 is wall-mounted. Additionally or alternatively, the spring 170 may be configured to provide the electrical connections to the drive assembly 160 (e.g., rather than the socket 116).

In addition, a spring (e.g., the spring 170) could be secured to the end portion 114 of the drive assembly 160. The channel 138 of the mounting bracket 130 could include a protuberance (not shown) around which the spring may flex as the end portion 114 is inserted into the channel. When the end portion 114 is fully inserted into the channel 138, the protuberance may exert a force on the spring for retaining the end portion.

FIGS. 9A-9E depict projection views of the example mounting bracket 130 shown in FIGS. 8A and 8B. The base 132 may define a front surface 152 and a rear surface 153. The front surface 152 may be a distance D6 from the rear surface 153. The base 132 may define a depression 154 configured such that a fastener can be countersunk with respect to the base 132 (e.g., the front surface 152 of the base 132). The depression 154 may be a distance D7 from the rear surface 153. The distance D6 may be substantially greater than the distance D7. The pathway 158 may extend to (e.g., overlap) the bore 133 such that electrical wiring can be routed through the mounting bracket 130 from the electrical wall box 190 via the pathway 158 and the bore 133 to the drive assembly 160.

The attachment member 134 may define flanges 147A, 147B along the channel 138. The flanges 147A, 147B may correspond to slots 144A, 144B. The slots 144A, 144B may be configured such that the channel 138 is T-shaped. The slots 144A, 144B may be configured to receive the end portion 114 of the drive assembly 160. The flanges 147A, 147B may be configured to secure the roller tube along the longitudinal direction L (e.g., along the longitudinal axis 112 shown in FIGS. 1-4). In addition, the flanges 147A, 147B may be configured to secure the roller tube in the transverse direction T when the mounting bracket 130 is wall-mounted and in the radial direction R when the mounting bracket 130 is ceiling-mounted. The opening 141 may be a distance D8 from the distal end 143 of the attachment member 134.

Figure 10A:
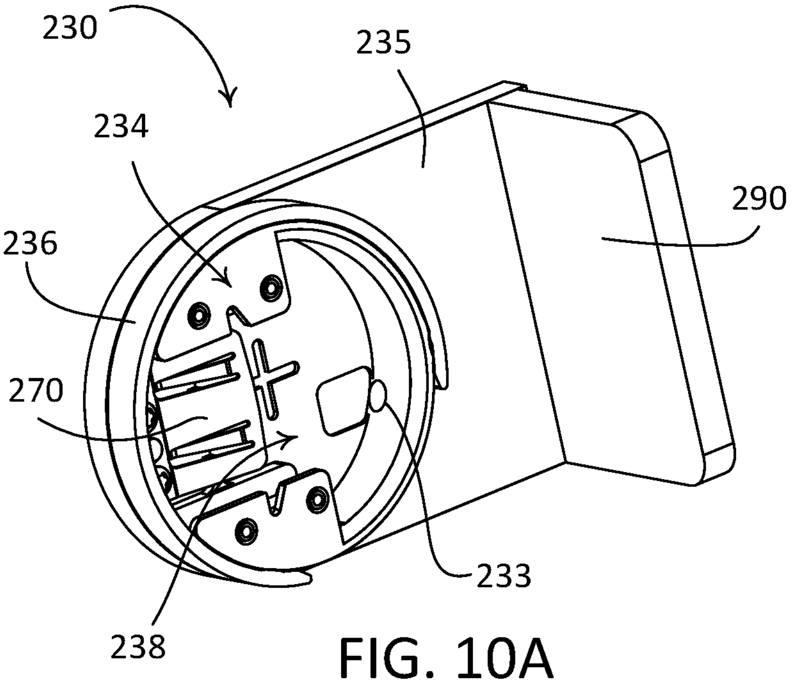
FIG. 10A depicts another example mounting bracket with a sliding cover closed and a base cover installed.
Figure 10B:
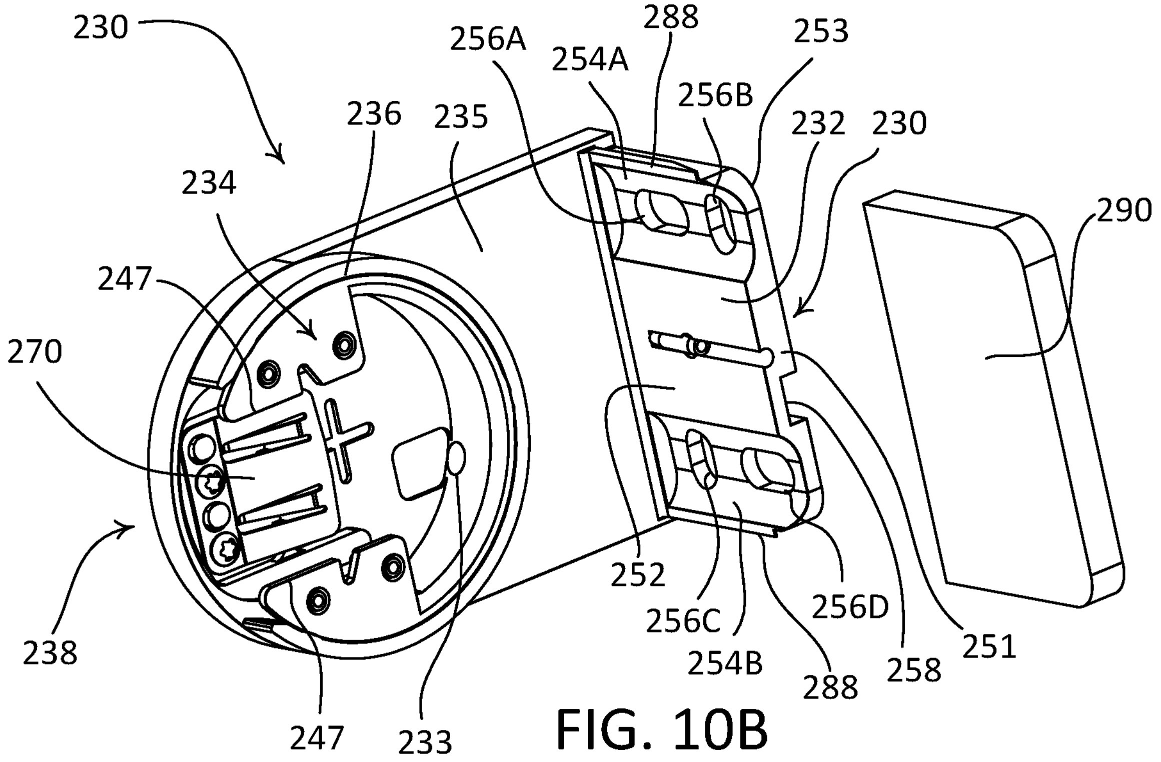
FIG. 10B depicts the example mounting bracket shown in FIG. 10A with the sliding cover open and the base cover removed.

FIGS. 10A and 10B are perspective views of another example mounting bracket 230 that may be used to mount the roller tube 110 of the motorized window treatment 100 of FIG. 1. The mounting bracket 230 may be similar to the mounting bracket 130 shown in FIGS. 8A-9E. The mounting bracket 230 may include a base 232 and an attachment member 234 connected to the base 232 via an arm 235. The base 232 may be configured to attach the mounting bracket 230 to a structure (e.g., a window frame, a wall, a ceiling, or other structure). The mounting bracket 230 may include a base cover 290. The base cover 290 may be configured to cover the base 232 as shown in FIG. 10A. The base cover 290 may be removed from the base 232 as shown in FIG. 10B.

The mounting bracket 230 may include a sliding cover 236, which may be rotatably received by the attachment member 234. The sliding cover 236 may be rotated between a closed position as shown in FIG. 10A and an open position as shown in FIG. 10B. The sliding cover 236 may have a circular shape, a substantially rectangular shape, or some other shape. The sliding cover 236 may be rotatably received by the attachment member 234.

The attachment member 234 may define a channel 238 that may be configured to receive the end portion 114 of the drive assembly 160 (e.g., configured for sliding receipt of the end portion). For example, the channel 238 may be configured to receive the end portion 114 of the drive assembly 160 when the sliding cover 236 is in the open position. The sliding cover 236 may be configured to cover the channel 238 and the end portion 114 of the drive assembly 160 when the end portion 114 is fully received within the channel 238. The sliding cover 236 may be configured to retain the end portion 114 of the drive assembly 160 within the channel 238. For example, the sliding cover 236 may cover the channel 238 and may retain the end portion of the drive assembly 160 within the channel 238 when the sliding cover 236 is in the closed position. The channel 238 may be configured to lock the roller tube 110 in position along the longitudinal direction L (e.g., along the longitudinal axis 112) such that translational movement of the roller tube in the longitudinal direction L is prevented. The channel 238 may have a T-shaped cross section. For example, the channel 238 may be configured to receive a wider cross section at the end portion 114 of the drive assembly 160. The channel 238 may define one or more flanges 247 to secure the end portion 114 within the channel 238. For example, the flanges 247 may engage the end portion 114 of the drive assembly 160 such that movement of the roller tube 110 in the longitudinal direction L is prevented.

The mounting bracket 230 may define a bore 233 that extends through the arm 235 and/or the base 232. The bore 233 may be configured to receive electrical wiring (e.g., the electrical wiring 180 shown in FIGS. 5 and 8A) for powering the drive assembly 160 of the motorized window treatment 100. The mounting bracket 230 may include a spring 270, which may be secured within the channel 238. The spring 270 may be configured to secure the end portion 114 of the drive assembly 160 within the channel 238. For example, the spring 270 may be configured to engage the end portion 114 of the drive assembly 160 such that the roller tube 110 is secured in a direction perpendicular to the structure. The spring 270 may be configured to flex as the end portion 114 of the drive assembly 160 is inserted into the channel 238.

FIGS. 11A-11E depict projection views of the example mounting bracket 230 shown in FIGS. 10A and 10B. The base 232 may define a front surface 252 and a rear surface 253. The base 232 may define depressions 254A, 254B on the front surface 252. The depressions 254A, 254B may have a reduced thickness when compared to a remainder of the base 232. For example, the depressions 254A, 254B may define a portion of the base 232 having a reduced thickness. The base 232 may include holes 256A, 256B, 256C, 256D therethrough. Each of the holes 256A-256D may be configured to receive a fastener (not shown) for securing the mounting bracket 230 to a structure. The holes 256A-256D may be located within the depressions 254A, 254B, such that the fasteners may be countersunk with respect to the front surface 252 of the base 232. Each of the holes 256A-256D may be oblong shaped. For example, the holes 256A-256D may be oblong shaped to allow for alignment of the mounting bracket 230 and/or alignment of the fasteners. Since the holes 256A-256D of the base 232 are arranged in a linear (e.g., two-by-two) orientation, the base 232 provides additional support for the mounting bracket 230 (e.g., as compared to a mounting bracket having a base with two holes arranged in a linear orientation for receiving fasteners). Although FIGS. 11A-11E depicts two depressions 254A, 254B for the holes 256A, 256B, 256C, 256D, it should be appreciated that the base may include a depression (e.g., such as the depressions 254A, 254B) for each of the holes 256A, 256B, 256C, 256D.

The depressions 254A, 254B may define (e.g., two) attachment areas. The attachment areas may be located on each side of the base 232 and may be separated by a central portion of the base 232. For example, the base 232 may define a first attachment area in an upper portion and a second attachment area in a lower portion. The base 232 may also define a wall box hiding area (e.g., the central portion) between the attachment areas where the electrical wall box 190 may be positioned on the structure to which the mounting bracket 230 is mounted in order to be hidden behind the base 232. FIG. 11E depicts a desired position of the electrical wall box 190 shown in dashed lines. The rear surface 253 of the base 232 may define a pathway 258 (e.g., a groove) configured to receive the electrical wiring 180. The pathway 258 may include a first portion 257. The first portion 257 may allow the electrical wiring 180 to extend from the bore 233 to the electrical wall box 190 (e.g., central portion, i.e., the wall box hiding area) when the electrical wall box is located behind the base 232. The pathway 258 may include a second portion 259. The second portion 259 may allow the electrical wiring 180 to extend from the bore 233 to an interior side 251 of the base 232. The electrical wiring 180 may extend through the second portion 259 when the electrical wall box 190 is not mounted behind the base 232 (e.g., the electrical wall box is mounted behind the roller tube 110). The base 232 may define flanges 288. The flanges 288 may be located at an upper edge of the base 232 and at a lower edge of the base 232. The flanges 288 may be configured to receive a base cover (e.g., such as base cover 290 shown in FIG. 12A).

Figure 11B:
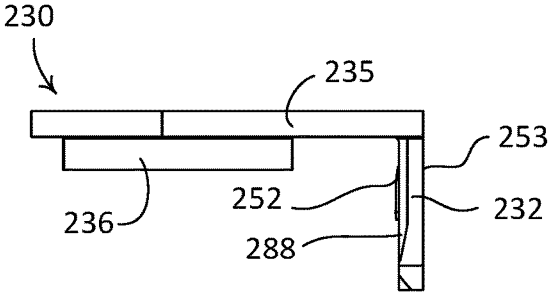
FIGS. 11A-11E depict projection views of the example mounting bracket shown in FIGS. 10A and 10B.
Figure 11D:
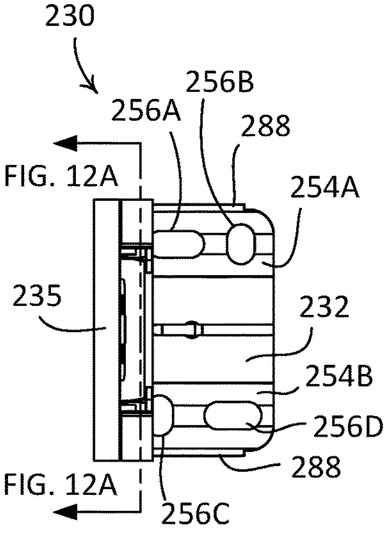
Figure 11A:
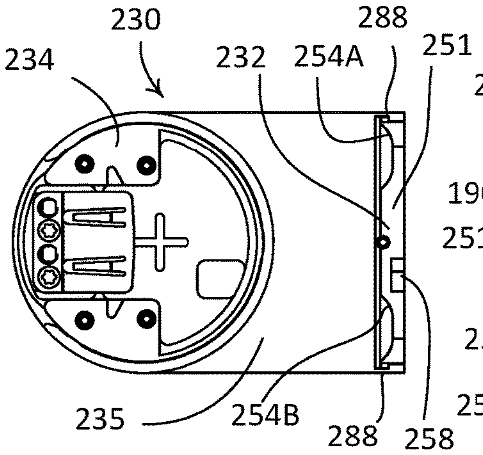
Figure 11E:
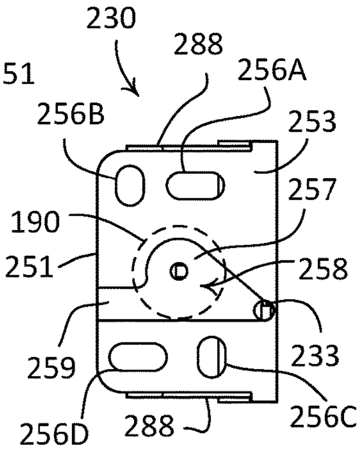
Figure 11C:
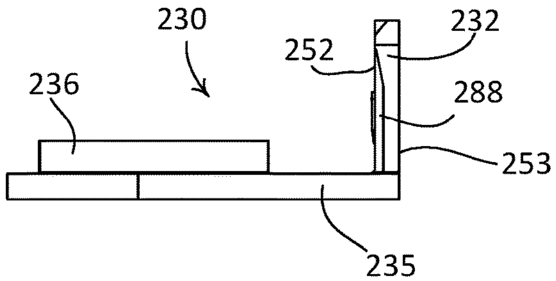
Figure 12A:
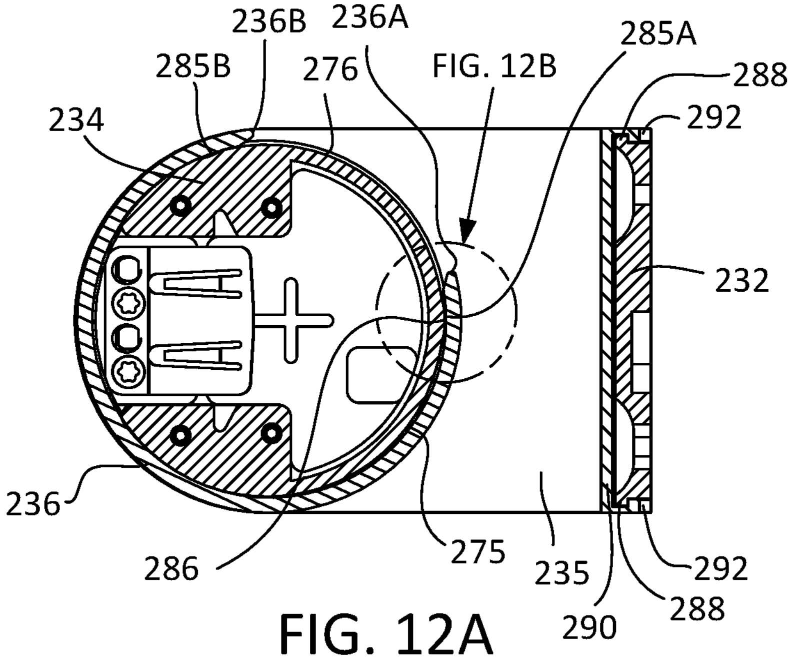
FIG. 12A is a cross-sectional view of the example mounting bracket shown in FIGS. 11A-11E taken through the line shown in FIG. 11D with the sliding cover closed and the base cover installed.
Figure 12B:
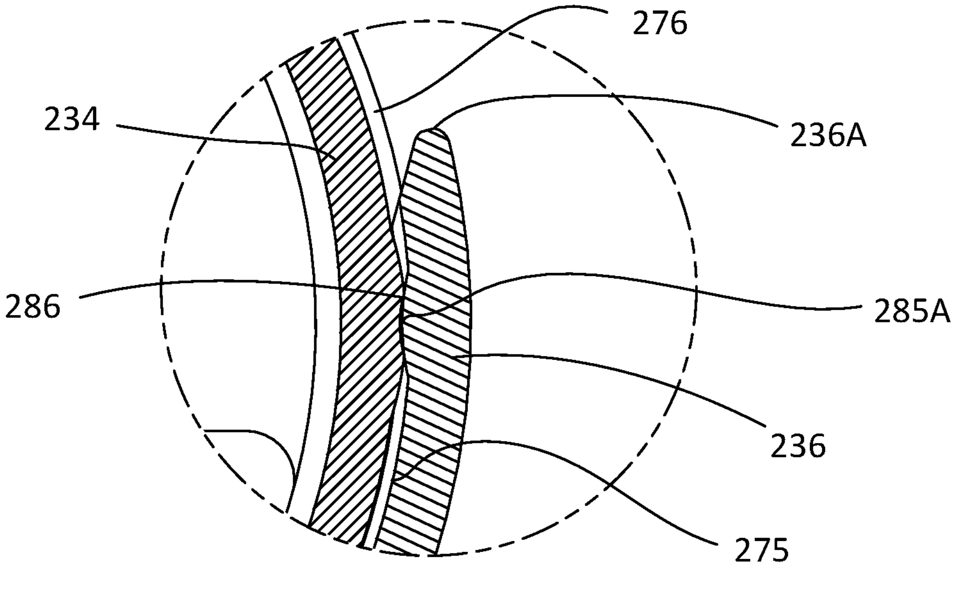
FIG. 12B is an enlarged cross-section view of the example mounting bracket shown in FIG. 12A.

FIG. 12A is a cross-sectional view of the mounting bracket 230 taken through the line shown in FIG. 11D with the sliding cover 236 shown closed (e.g., in the closed position) and the base cover 290 shown installed on the base 232. The sliding cover 236 may include a rib 275 that extends into a slot 276 in the attachment member 234. FIG. 12B is an enlarged cross-section view of the mounting bracket 230. As shown, the sliding cover 236 may define a first protrusion 285A that may be received in a detent 286 (e.g., an indentation) that may be defined by the slot 276 of the attachment member 234. The first protrusion 285A may be located near a first end 236A of the sliding cover 236. The sliding cover 236 may define a second protrusion 285B that may be located near a second end 236B of the sliding cover 236. When the first protrusion 285A is received in the detent 286, the sliding cover 236 may be held in a first closed position as shown in FIG. 12A. The sliding cover 236 may be rotated to cause the first protrusion 285A to exit the detent 286, such that the rib 275 of the sliding cover 236 may rotate through the slot 276. The sliding cover 236 may be rotated such that the second protrusion 285B is received within the detent 286. When the second protrusion 285B is received within the detent 286, the sliding cover 236 may be held in a second closed position (not shown). For example, the sliding cover 236 may be slidingly operated between the first closed position and the second closed position.

The base cover 290 may be installed on the base 232 as shown in FIG. 12A. The base cover 290 may include flanges 292 that may be received under respective corresponding flanges 288 defined by the base 232. The base cover 290 may be pushed towards the arm 235 of the mounting bracket 230, such that the flanges 292 slide by and are captured under the respective corresponding flanges 288 defined by the base 232.

Figure 13:
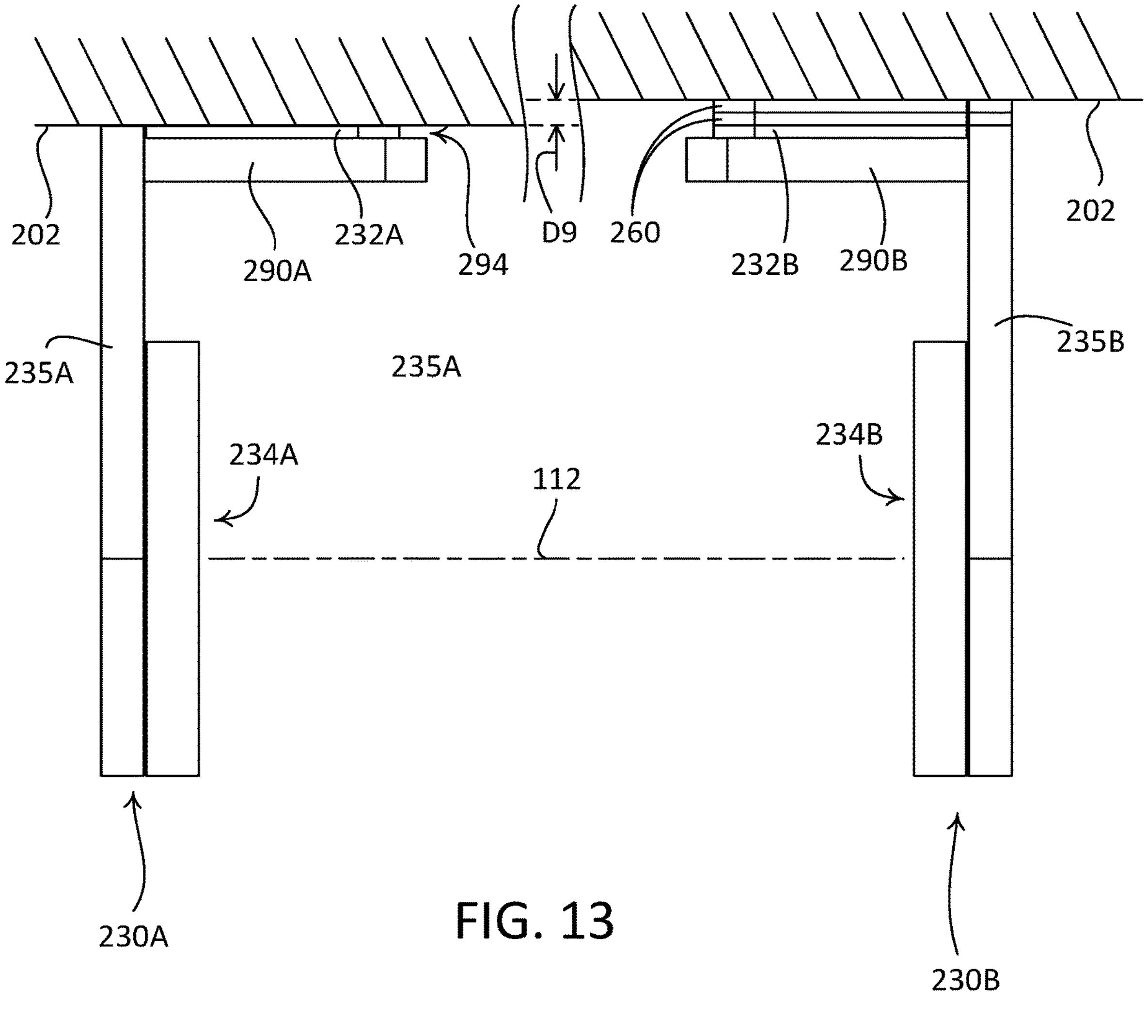
FIG. 13 depicts left and right brackets mounted on an uneven structure (e.g., an uneven ceiling) for mounting the motorized window treatment of FIG. 1.

FIG. 13 depicts left and right brackets 230A, 230B mounted on an uneven structure 202 (e.g., an uneven ceiling) for supporting the roller tube 110 of the motorized window treatment 100. The center of respective attachment members 234A, 234B of the mounting brackets 230A, 230B may be aligned (e.g., along the longitudinal axis 112), for example, to allow for proper mounting of the roller tube 110. The uneven structure 202 may be characterized by a vertical offset distance D9 between a surface of the uneven structure 202 located at a mounting location for the mounting bracket 230A and a surface of the uneven structure 202 located at a mounting location for the mounting bracket 230B, as shown in FIG. 13. The first mounting bracket 230A (e.g., a base 232A of the first mounting bracket) may be mounted directly to the surface of the uneven structure 202. An arm 235A of the first mounting bracket 230A may extend all the way to the surface of the uneven structure 202 as shown in FIG. 13. A base cover 290A may be installed on the base 232A such that a gap 294 (e.g., a reveal) is created between the base cover 290 and the surface of the uneven structure 202.

Figure 14B:
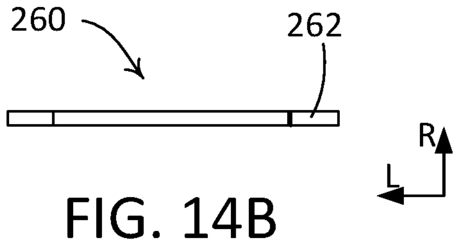
FIG. 14B is a front view of the shim of FIG. 14A.
Figure 14C:
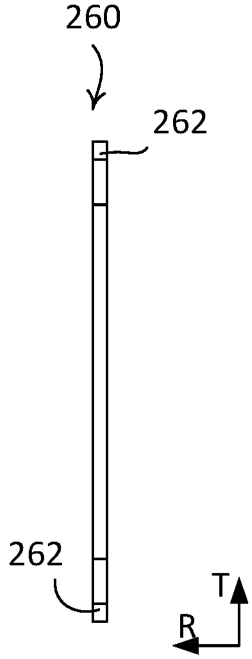
FIG. 14C is a left side view of the shim of FIG. 14A.
Figure 14A:
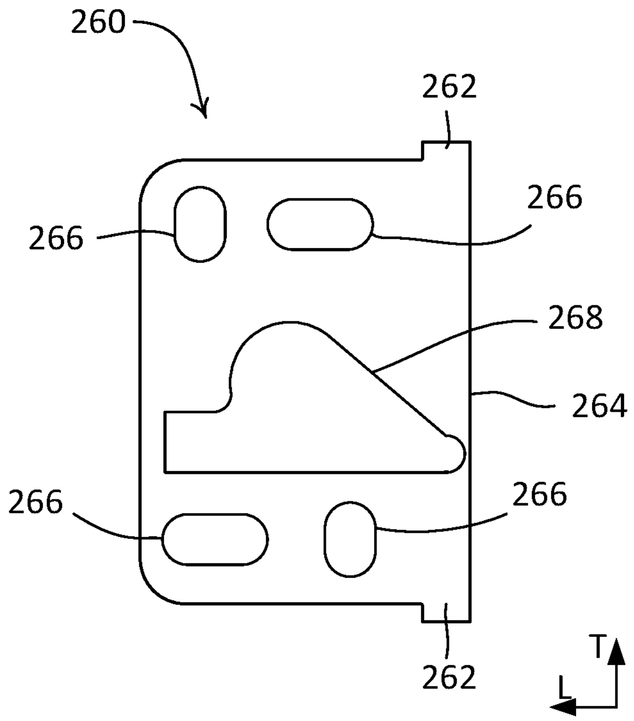
FIG. 14A is a bottom view of a shim used when the mounting brackets are mounted on an uneven surface as shown in FIG. 13.

A base 232B of the second mounting bracket 230B may be spaced from the structure 202 by one or more shims 260 (e.g., two shims 260), for example, to align the center of the attachment member 234B to the center of the attachment member 234A. The one or more shims 260 may be used to account for the distance D9. For example, the one or more shims 260 may have a thickness substantially equal to the distance D9. FIG. 14A is a bottom view, FIG. 14B is a front view, and FIG. 14C is a left side view of one of the shims 260. The shim 260 may have a periphery that matches a periphery of the base 232B of the mounting bracket 230B (e.g., as shown in FIG. 11E). An arm 235B of the second mounting bracket 230B may not extend all the way to the uneven structure 202, for example, because the shims 260 are between the base 232B and the uneven structure 202. The shim 260 may have tabs 262 that are located underneath upper and lower ends of the arm 235, such that an outer surface 264 of the shim 260 extends for the width of the arm 235B in the transverse direction T. The outer surface 264 and all other sides of the shim 260 may have the same color and/or finish as the second mounting bracket 230B. The shim 260 may include holes 266 to allow the fasteners to extend through the holes 256A-256D of the base 232B to attach the second mounting bracket 230B to the structure 202. For example, the holes 266 may align with holes 256A, 256B, 256C, 256D. The shim 260 may define a pocket 268. The pocket 268 may align with the pathway 258 of the base 232B.

Figure 15A:
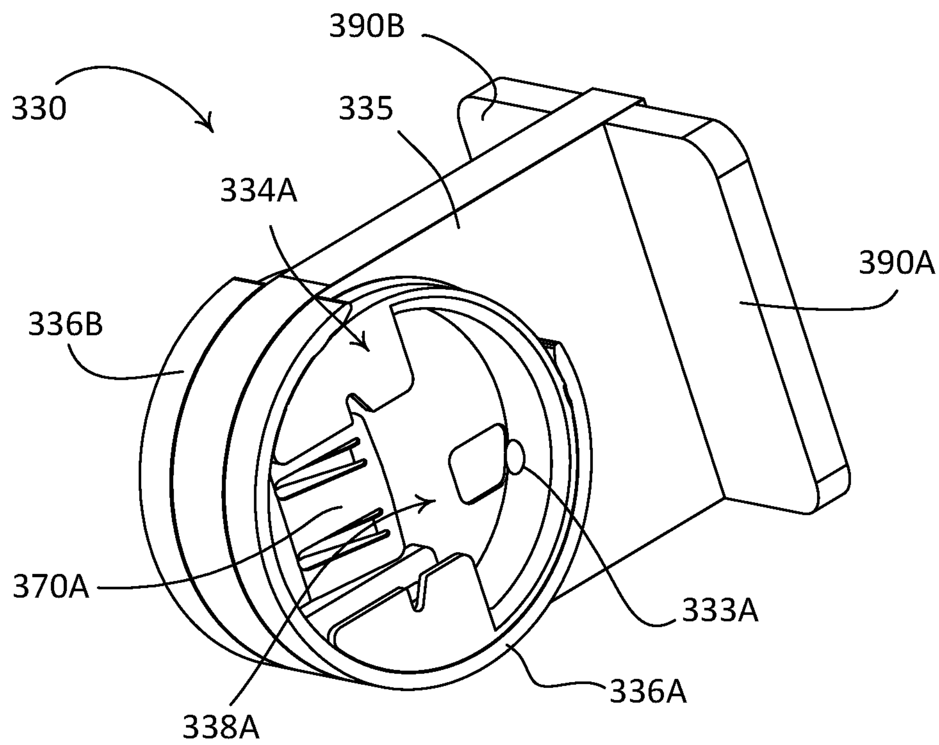
FIG. 15A is a right-side perspective view of an example center mounting bracket.
Figure 15B:
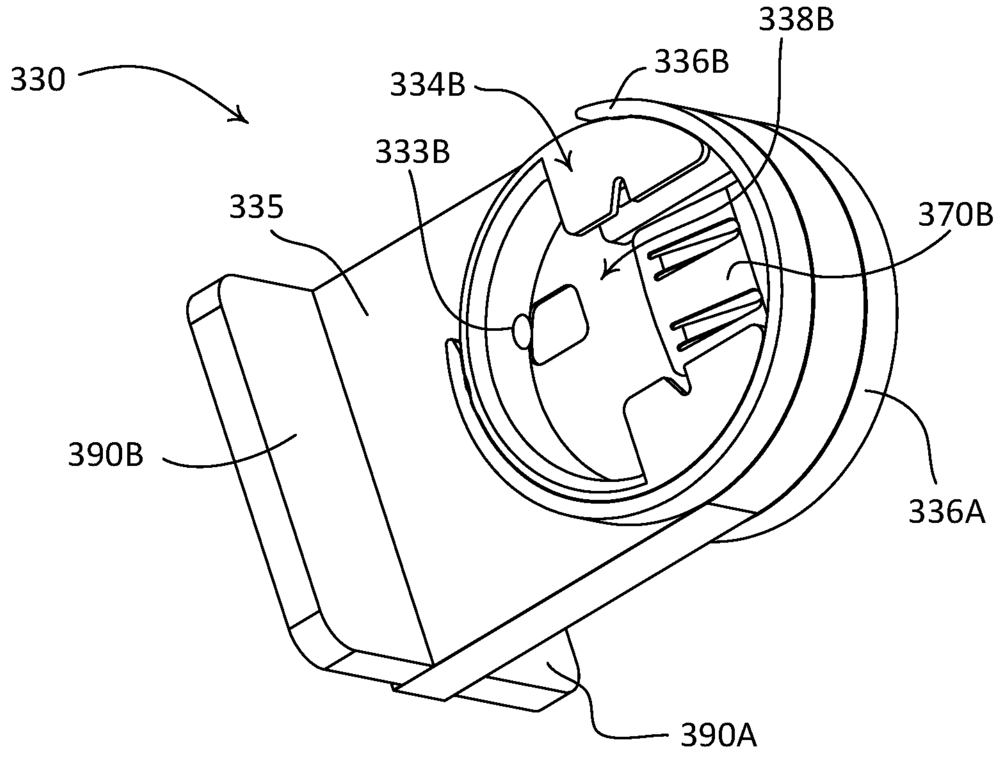
FIG. 15B is a left-side perspective view of the example center mounting bracket of FIG. 15A.

FIG. 15A is a right-side perspective view and FIG. 15B is a left-side perspective view of an example center mounting bracket 330, which may be located between two roller tubes (not shown) of adjacent motorized window treatments. The center mounting bracket 330 may include two attachment members 334A, 334B connected to a base (e.g., the base 332 shown in FIG. 16E) via a single arm 335. The base 332 may be configured to attach the center mounting bracket 330 to a structure (e.g., a window frame, a wall, a ceiling, or other structure). The center mounting bracket 330 may include two sliding covers 336A, 336B that are rotatably received by the respective attachment members 334A, 334B. The sliding covers 336A, 336B may each be rotated between a closed position (e.g., as shown in FIGS. 15A and 15B) and an open position in a similar manner as the sliding cover 236 of the mounting bracket 230. Each sliding cover 336A, 336B may have a circular shape, a substantially rectangular shape, or another shape. Each sliding cover 336A, 336B may be rotatably received by the respective attachment member 334A, 334B.

The attachment members 334A, 334B of the center mounting bracket 330 may be similar to the attachment member 234 of the mounting bracket 230 shown in FIGS. 10A-10B. Each attachment member 334A, 334B may define a respective channel 338A, 338B that may be configured to receive an end portion of a drive assembly of each of the adjacently-mounted motorized window treatments (e.g., configured for sliding receipt of the respective end portion). The sliding covers 336A, 336B may be configured to cover the respective channels 338A, 338B when the end portions are fully received within the channels. The sliding covers 336A, 336B may be configured to retain the end portions within the respective channels 338A, 338B. The channels 338A, 338B may be configured to lock the respective roller tubes in position along a longitudinal direction of the roller tubes such that translational movement of the roller tube in the longitudinal direction is prevented (e.g., in similar manner as the mounting brackets 230). The channels 338A, 338B may each have a T-shaped cross section.

The center mounting bracket 330 may define bores 333A, 333B that each may extend from the channels 338A, 338B of the respective attachment members 334A, 334B through the arm 335 and/or the base 232. The bores 333 may each be configured to receive electrical wiring (e.g., the electrical wiring 180 shown in FIGS. 5 and 8A) for powering the drive assemblies of the adjacently-mounted motorized window treatments. The center mounting bracket 330 may include springs 370A, 370B, which may be secured within the respective channels 338A, 338B. The springs 370A, 370B may be configured to secure the end portions of the drive assemblies within the respective channels 338A, 338B. Each spring 370A, 370B may be configured to flex as the end portion of the drive assembly is inserted into the respective channel 338A, 338B.

FIGS. 16A-16F depict projection views of the example center mounting bracket 330 shown in FIGS. 10A and 10B. The base 332 may extend from both sides of the arm 335 and may be covered by base covers 390A, 390B on each side of the arm 335. The base covers 390A, 390B may be removed to expose holes 356A, 356B, 356C, 356D in the base 332 that may be configured to receive fasteners (not shown) for securing the center mounting bracket 330 to the structure. The holes 356A, 356B, 356C, 356D may be located within depressions (not shown) defined on a front surface of the base 332, such that the fasteners may be countersunk with respect to the front surface of the base (e.g., in a similar manner as the depressions 254A, 254B and the holes 256A, 256B, 256C, 256D of the mounting bracket 230). Each of the holes 356A, 356B, 356C, 356D may be oblong shaped to allow for alignment of the mounting bracket 330 and/or alignment of the fasteners. The holes 356A, 356B, 356C, 356D may be arranged in a non-linear (e.g., two-by-two) orientation for providing support for the center mounting bracket 330.

Figures 16A, 16B, 16C, 16D, 16E, 16F:
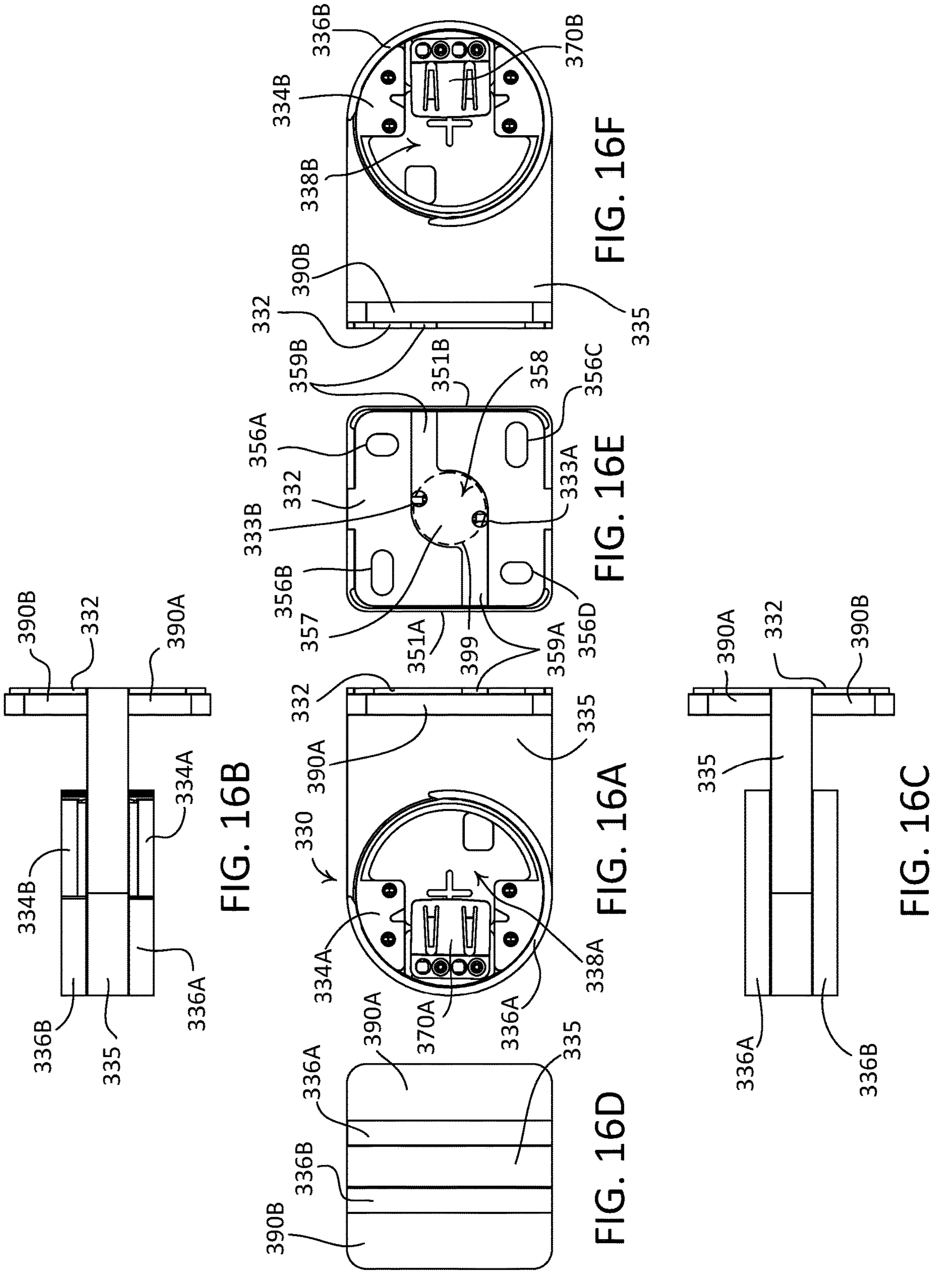
FIGS. 16A-16F depict projection views of the example center mounting bracket shown in FIGS. 15A and 15B with the sliding cover in the closed position.

The holes 356A, 356B may define a first attachment area of the base 332, and the holes 356C, 356D may define a second attachment area on the opposing side of the base 332. The base 332 may define a wall box hiding area between the first and second attachment areas. An electrical wall box (e.g., the electrical wall box 190) may be positioned on the structure to align with the wall box hiding area of the center mounting bracket 330. For example, the electrical wall box 190 may be such that it is hidden behind the base 332 of the center mounting bracket 330. FIG. 16E depicts a desired position 399 of the electrical wall box 190 shown in dashed lines. The base 332 may define a pathway 358 (e.g., a groove) configured to receive the electrical wiring. The pathway 358 may define a center portion 357. The center portion 357 may allow the electrical wiring to extend from the bores 333A, 333B into the electrical wall box 190, when the electrical wall box 190 is located behind the base 332. The pathway 358 may include portions 359A, 359B that may allow the electrical wiring to extend from the respective bores 333A, 333B to respective sides 351A, 351B of the base 332 when an electrical wall box 190 is not mounted behind the base 332.

Figure 17A:
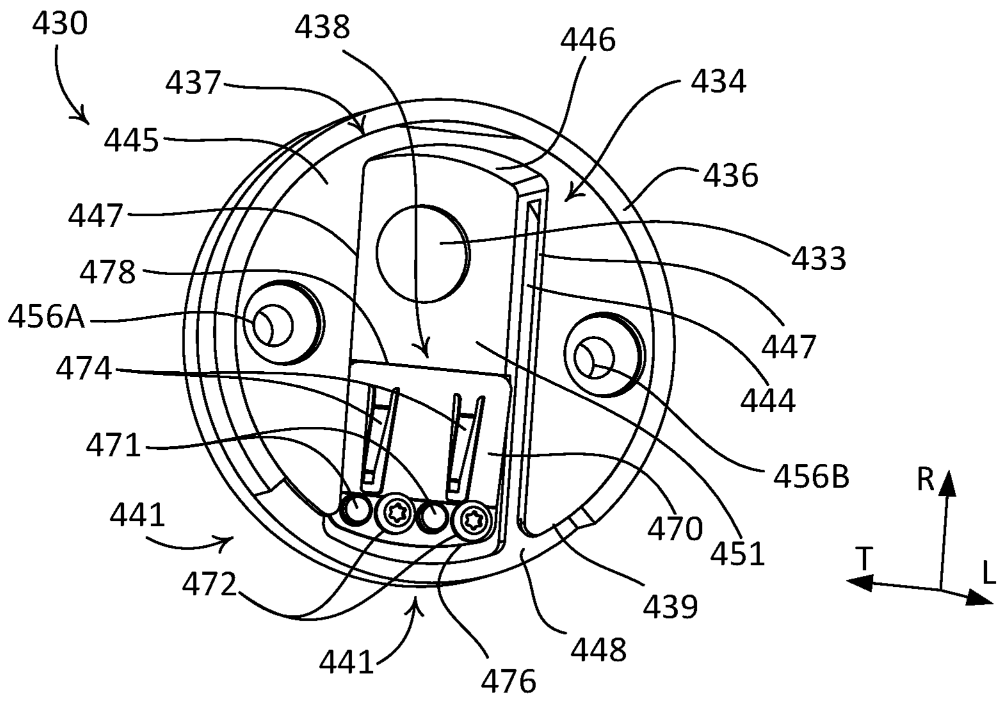
FIG. 17A is a perspective view of an example jamb mounting bracket with a sliding cover in an open position.
Figure 17B:
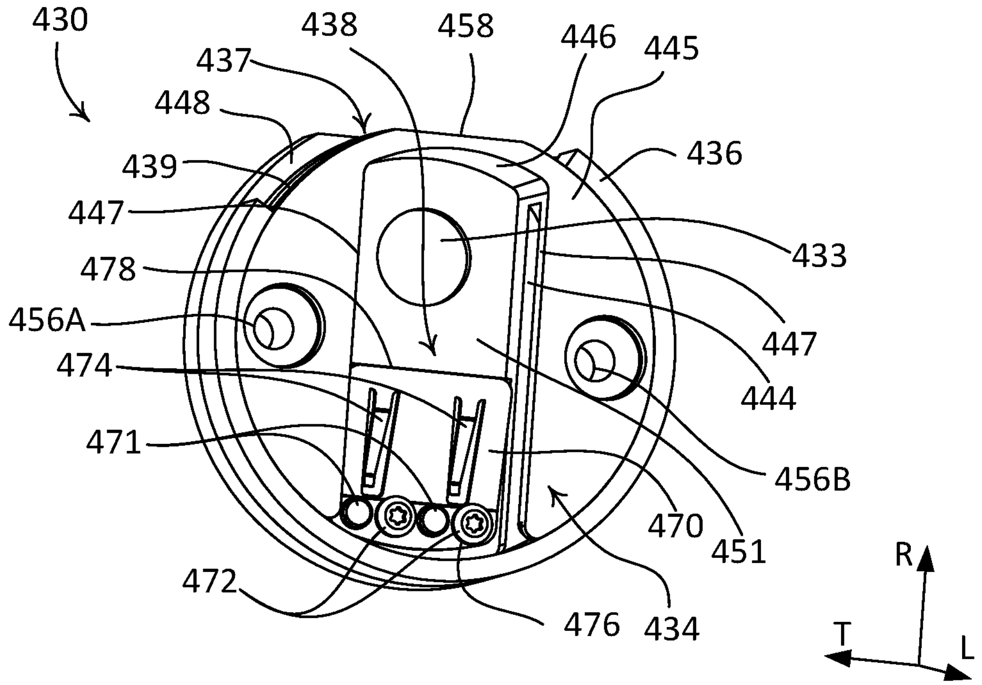
FIG. 17B is a perspective view the example jamb mounting bracket of FIG. 17A with the sliding cover in a closed position.
Figure 18B:
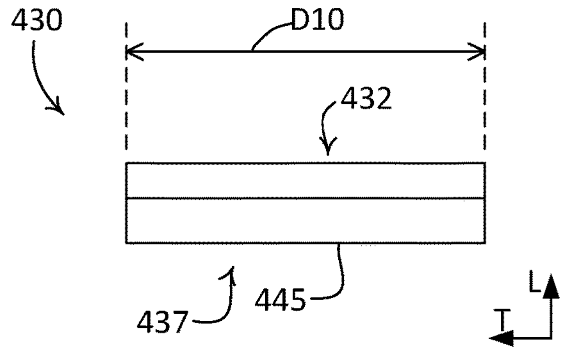
FIGS. 18A-18E depict projection views of the example jamb mounting bracket shown in FIGS. 17A and 17B with the sliding cover in the open position.
Figure 18D:
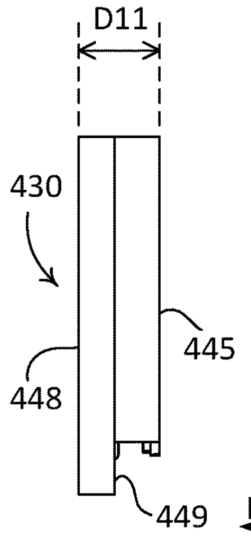
Figure 18A:
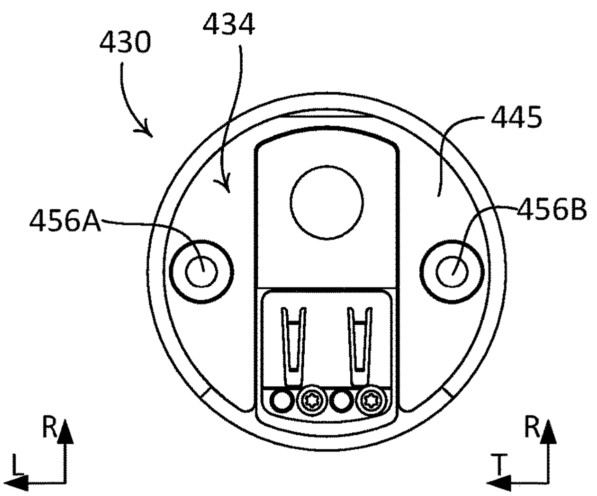
Figure 18E:
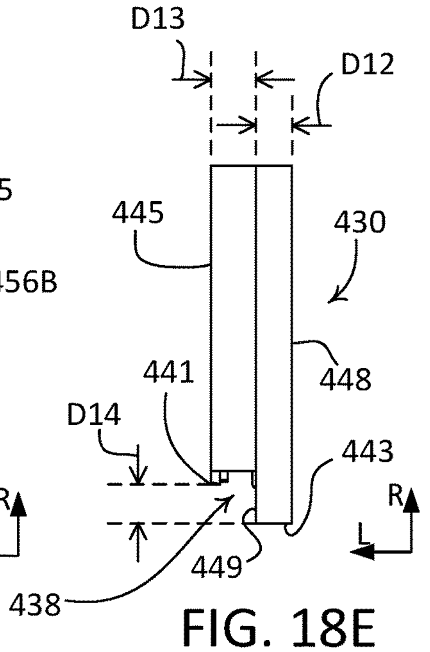
Figure 18C:
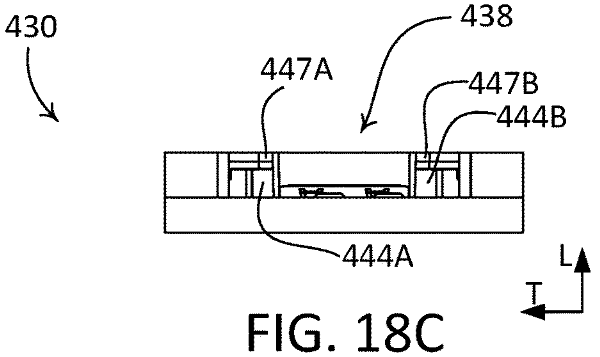
Figure 19B:
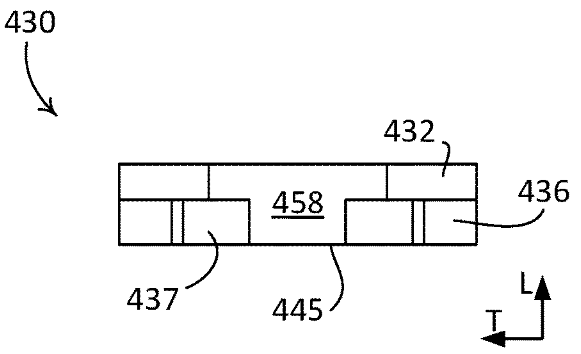
FIGS. 19A-19E depict projection views of the example jamb mounting bracket shown in FIGS. 17A and 17B with the sliding cover in the closed position.
Figure 19D:
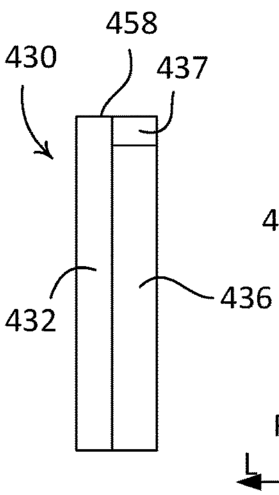
Figure 19A:
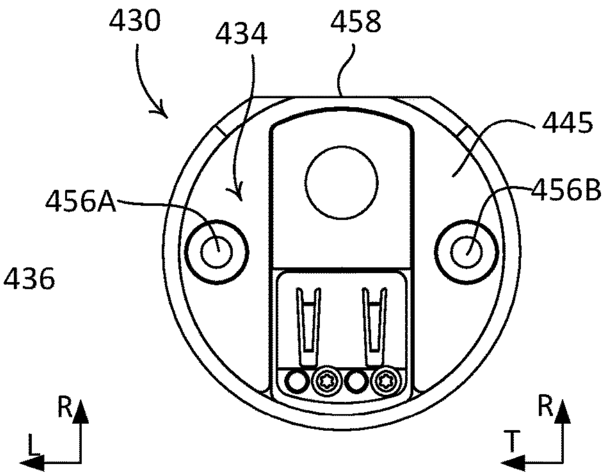
Figure 19E:
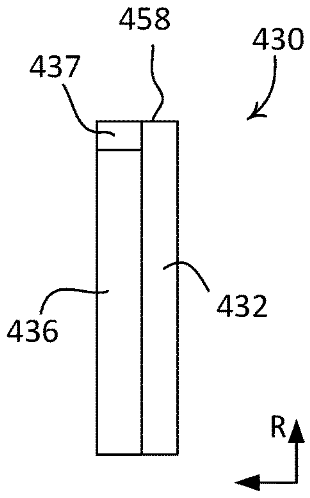
Figure 19C:
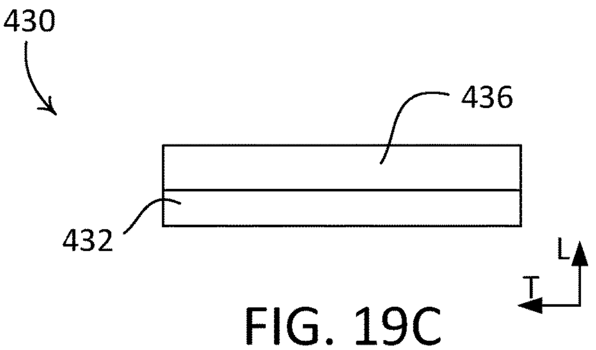

FIG. 17A depicts an example jamb mounting bracket 430 with a sliding cover 436 in an open position. FIG. 17B depicts the example jamb mounting bracket 430 with the sliding cover 436 in a closed position. The jamb mounting bracket 430 may be similar to the mounting brackets 130, 230 shown in FIGS. 8A-8B and 10A-10B. For example, unlike the mounting brackets 130, 230, the jamb mounting bracket 430 may not include an arm (e.g., the arm 135 of the mounting bracket 130 or the arm 235 of the mounting bracket 230). Instead, the jamb mounting bracket 430 may define a base 432 and an attachment member 434, which are both circular. The base 432 may be configured to be jamb-mounted (e.g., within a window jamb). The attachment member 434 of the jamb mounting bracket 430 may define a drum 437. The drum 437 may extend from the base 432 and the sliding cover 436 may surround the drum 437. The base 432 and the sliding cover 436 may have substantially the same outer diameter.

The jamb mounting bracket 430 may define holes 456A, 456B therethrough. The holes 456A, 456B may be configured to receive fasteners (not shown) for securing the jamb mounting bracket 430 to a structure (e.g., a wall or a window jamb). The holes 456A, 456B may be configured such that the fasteners are countersunk with respect to an inner surface 445 of the drum 437. The jamb mounting bracket 430 may define a flat surface 458 on one side that may aide in aligning the jamb mounting bracket during installation. For example, an installer may place a spacer that has parallel planar surfaces (e.g., a block of wood or a level) against the structure (e.g., so that a first planar surface of the spacer is against the structure), and place the flat surface 458 of the jamb mounting bracket 430 against the second parallel planar surface of the spacer. The installer may then drive the fasteners through the holes 456A, 456B while the flat surface 458 of the jamb mounting bracket 430 is against the second planar surface of the spacer.

The attachment member 434 of the jamb mounting bracket 430 (e.g., the drum 437) may define a channel 438. The channel 438 may define an opening 441. The opening 441 may be a slot on an outer surface 439 of the drum 437. The channel 438 may extend from the opening 441 to a rear wall 446. Although not shown in FIGS. 17A and 17B, electrical wiring (e.g., electrical wiring 180) may be received within the channel 438 via a bore 433. The channel 438 may be configured to retain the electrical wiring.

The channel 438 may define slots 444 on either side of the channel 438. The slots 444 may be configured such that the channel 438 is T-shaped (e.g., has a T-shaped cross section). The slots 444 may be defined by flanges 447 that are defined by the drum 437. The flanges 447 may be configured to retain an end portion of a drive assembly within the channel 438. The flanges 447 may be configured to secure the roller tube in the transverse direction T. The channel 438 may define a side wall 451. The side wall 451 may be a forward surface of the base 432.

The jamb mounting bracket 430 may include a spring 470. The spring 470 may be secured to the jamb mounting bracket 430, for example, within the channel 438. For example, the spring 470 may be secured to the side wall 451 of the channel 438. The spring 470 may be secured in the channel 438 using one or more fasteners 472 and/or one or more bosses 471. The spring 470 may be positioned at the opening 441 of the channel 438, for example, using the bosses 471. For example, a forward edge 476 of the spring 470 may be aligned with the opening 441 and/or an outer edge 443 of the jamb mounting bracket 430. The forward edge 476 may engage the side wall 451 such that the forward edge 476 is substantially flush with the side wall 451. The spring 470 may include compliant fingers 474 that are configured to engage the side wall 451 and bias a rear edge 478 of the spring 470 away from the side wall 451. For example, the rear edge 478 may be spaced away from the side wall 451. The compliant fingers 474 may be configured to flex as the end portion of the drive assembly is inserted into the channel 438. For example, the end portion of the drive assembly may apply a force on the spring 470 that pushes the rear edge 478 closer to the side wall 451. When the roller tube is fully inserted into the channel 438, the compliant fingers 474 may enable the rear edge 478 to exert a force on the end of the drive assembly such that the end is retained within the channel 438. The rear edge 478 may exert the force on the end of the drive assembly in the radial direction R.

The sliding cover 436 may define one or more barbs (not shown). The barbs may be configured to secure the sliding cover 436 in a closed position or an open position. The drum 437 may define one or more notches (not shown). The notches may be configured to receive a respective barb of the barbs. For example, the sliding cover 436 may define two barbs positioned at distal ends of the sliding cover 436.

FIGS. 18A-18E depict projection views of the example jamb mounting bracket 430 shown in FIGS. 16A and 16B with the sliding cover 436 in the open position. FIGS. 19A-19E depict projection views of the example jamb mounting bracket 430 with the sliding cover 436 in the closed position. The base 432 and the sliding cover 436 may be characterized by an outer diameter D10, which may be approximately equal to the diameter of the roller tube 110 (e.g., approximately two inches). The inner surface 445 may be a distance D11 from an outer surface 448 of the base 432 to the inner surface 445 of the drum 437. The base 432 may be characterized by a distance D12 (e.g., a width) between the outer surface 428 and an inner surface 449, which may be, for example, approximately 0.20 inches. The attachment member 434 may be characterized by a distance D13 (e.g., a width) between the inner surface 449 of the base 432 and the inner surface 445 of the drum 437, which may be, for example, approximately 0.25 inches. The distance D11 may be, for example, approximately 0.45 inches. The distance D11 may define a minimum light gap that may exist between an edge of the flexible material and the structure. For example, the distance D11 may be configured such that the minimum light gap is 0.5 inches or less.

The jamb mounting bracket 430 may define flanges 447A, 447B along the channel 438. The flanges 447A, 447B may correspond to slots 444A, 444B, respectively. The slots 444A, 444B may be configured such that the channel 438 is T-shaped. The slots 444A, 444B may be configured to receive an end portion of a drive assembly. The flanges 447A, 447B may be configured to secure a roller tube along the longitudinal direction L (e.g., along the longitudinal axis 112 shown in FIGS. 1-4). In addition, the flanges 447A, 447B may be configured to secure the roller tube in the transverse direction T. The opening 441 may be a distance D14 from the outer edge 443 of the jamb mounting bracket 430 (e.g., the base 432 of the jamb mounting bracket 430).

Figure 20A:
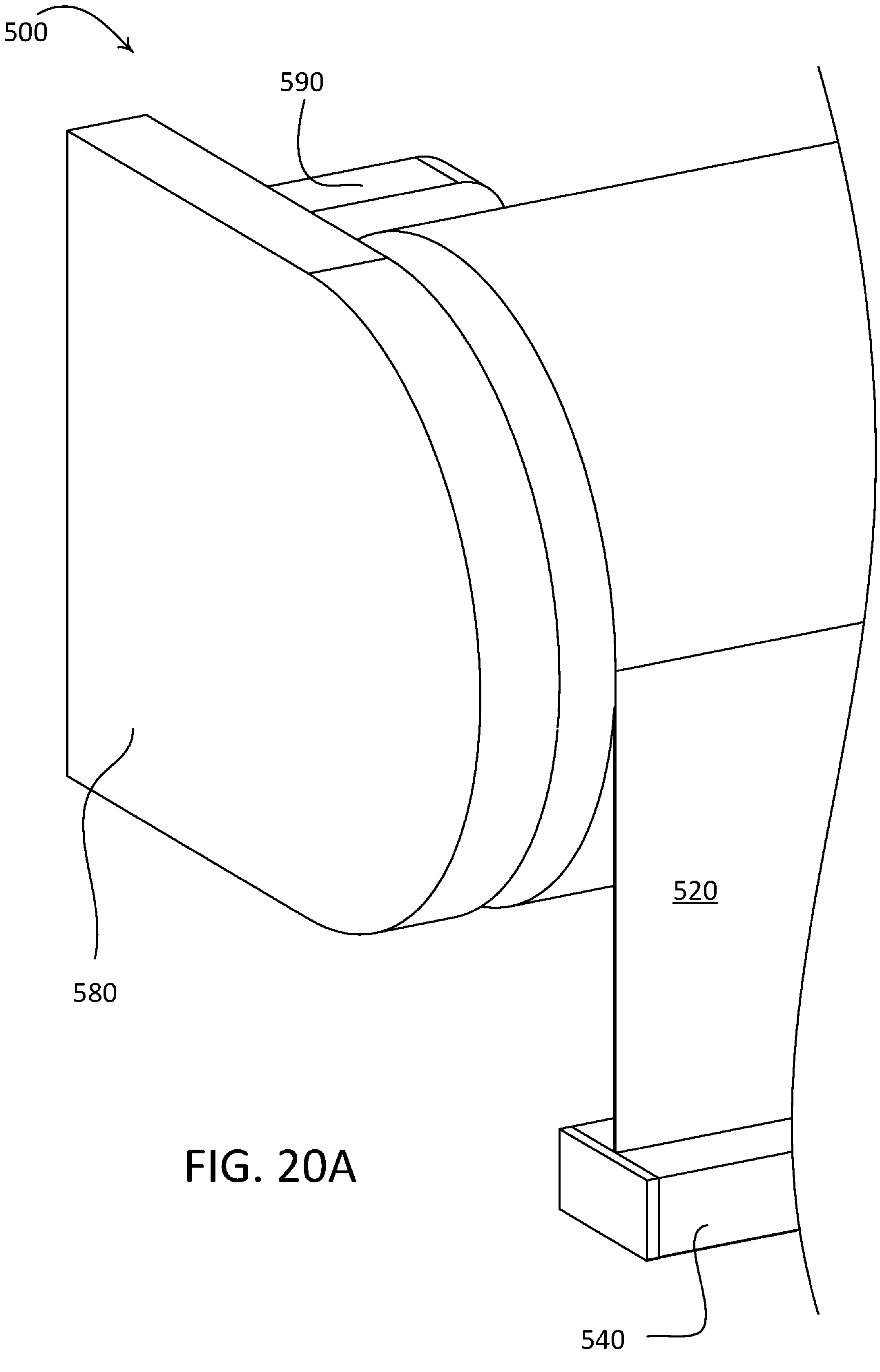
FIG. 20A is a perspective view of an end portion of another example motorized window treatment.
Figure 20B:
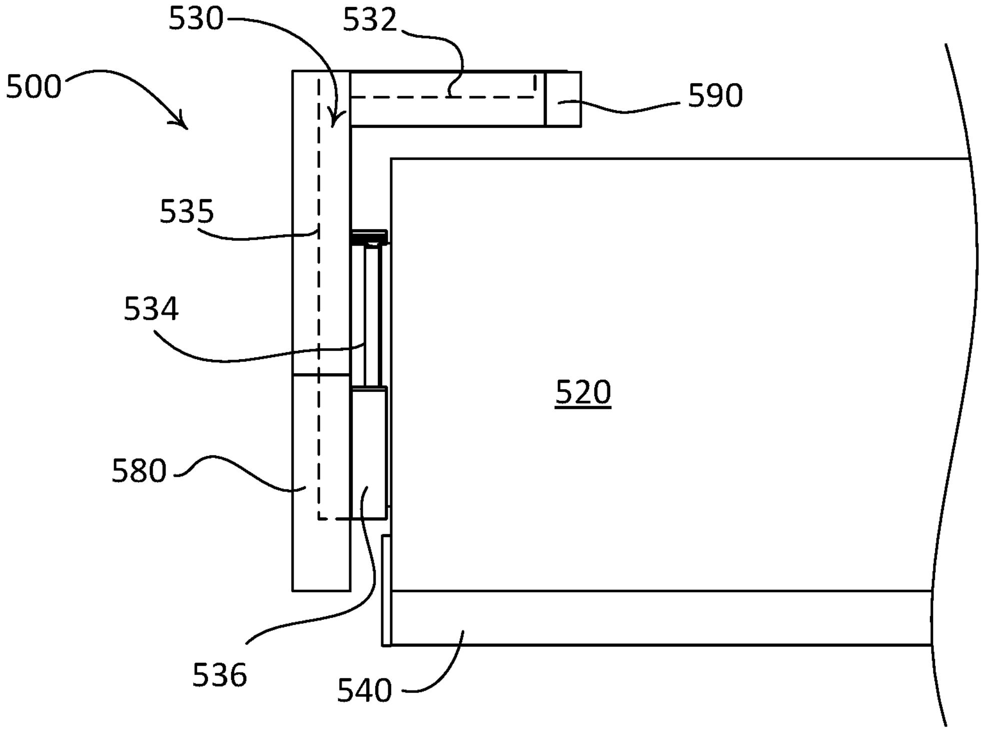
FIG. 20B is a top view of the end portion of the example motorized window treatment shown in FIG. 20A.
Figure 20C:
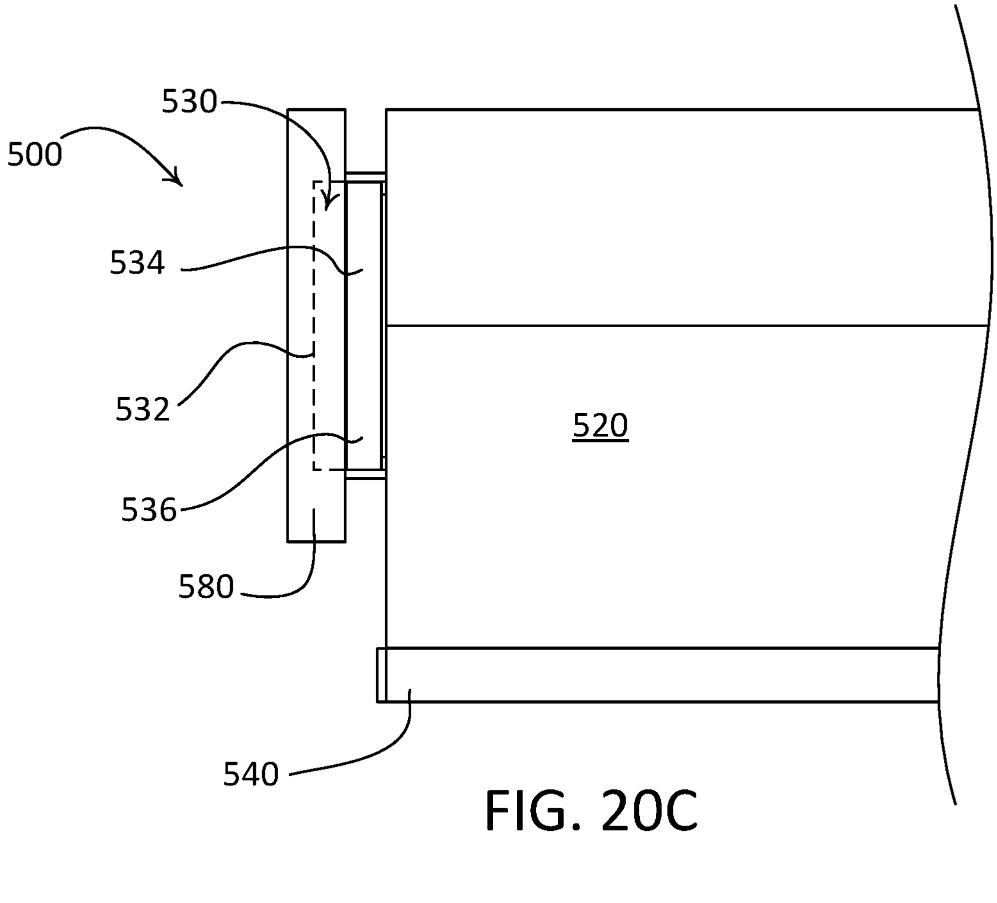
FIG. 20C is a front view of the end portion of the example motorized window treatment shown in FIG. 20A.

FIG. 20A is a perspective view, FIG. 20B is a top view, and FIG. 20C is a front view of an end portion of another example motorized window treatment 500. The motorized window treatment 500 has a roller tube (not shown) and a flexible material 520, which may be the same as the roller tube 110 and the flexible material 120 of the motorized window treatment 100 shown in FIG. 1. The flexible material 520 may be windingly attached to the roller tube for moving the flexible material between a raised position and a lowered position and may have a hembar 540 attached to a bottom edge of the flexible material 520. The roller tube may be rotatably supported by mounting brackets 530, which may be similar to the mounting brackets 130, 230 of the motorized window treatment 100 shown in FIG. 1. Each mounting bracket 530 may include a base 532 and an attachment member 534 connected to the base 532 via an arm 535. The base 532 may be configured to connect the mounting bracket to (e.g., attach the mounting bracket to) a window frame, a wall, or other structure. The attachment member 534 may be configured to be attached to an end portion of a drive assembly (not shown) mounted inside of the roller tube. The attachment member 534 may include a sliding cover 536, which may cover the end portion of the drive assembly in a similar manner as the sliding covers 136, 236 of the motorized window treatment 100 of FIG. 1.

The motorized window treatment 500 may include a bracket cover 580 mounted over the attachment member 534 of the mounting bracket 530. The motorized window treatment 500 may include a base cover 590 mounted over the base 532 of the mounting bracket 530. Since the bracket cover 580 and the base cover 590 conceal the mounting bracket 530 and the base 532, respectively, the mounting bracket 530 and the base 532 are shown in dashed lines in FIGS. 20B and 20C.

Figure 21A:
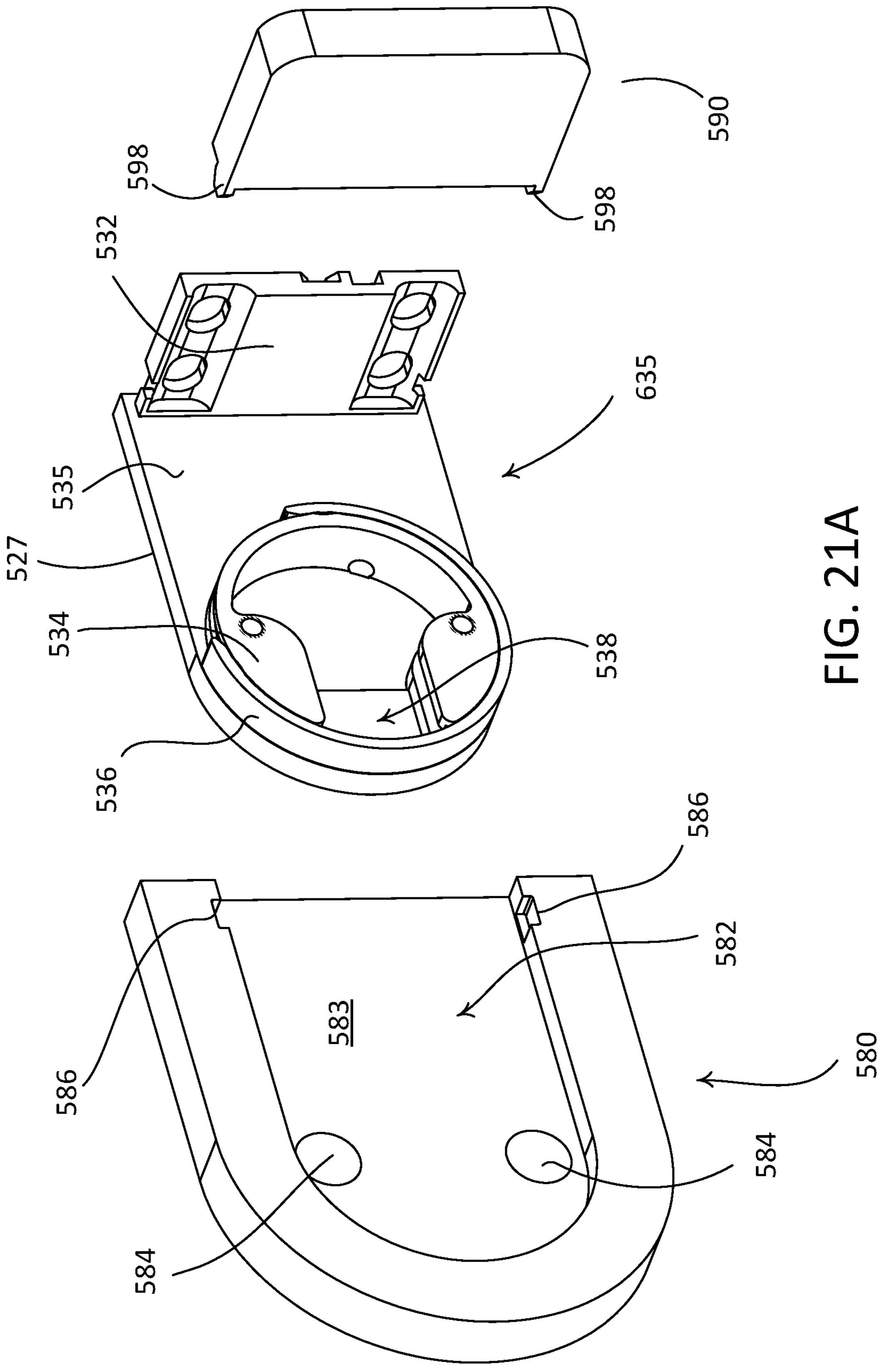
FIG. 21A is a front exploded view of a mounting bracket, a bracket cover, and a base cover of the example motorized window treatment shown in FIG. 20A.
Figure 21B:
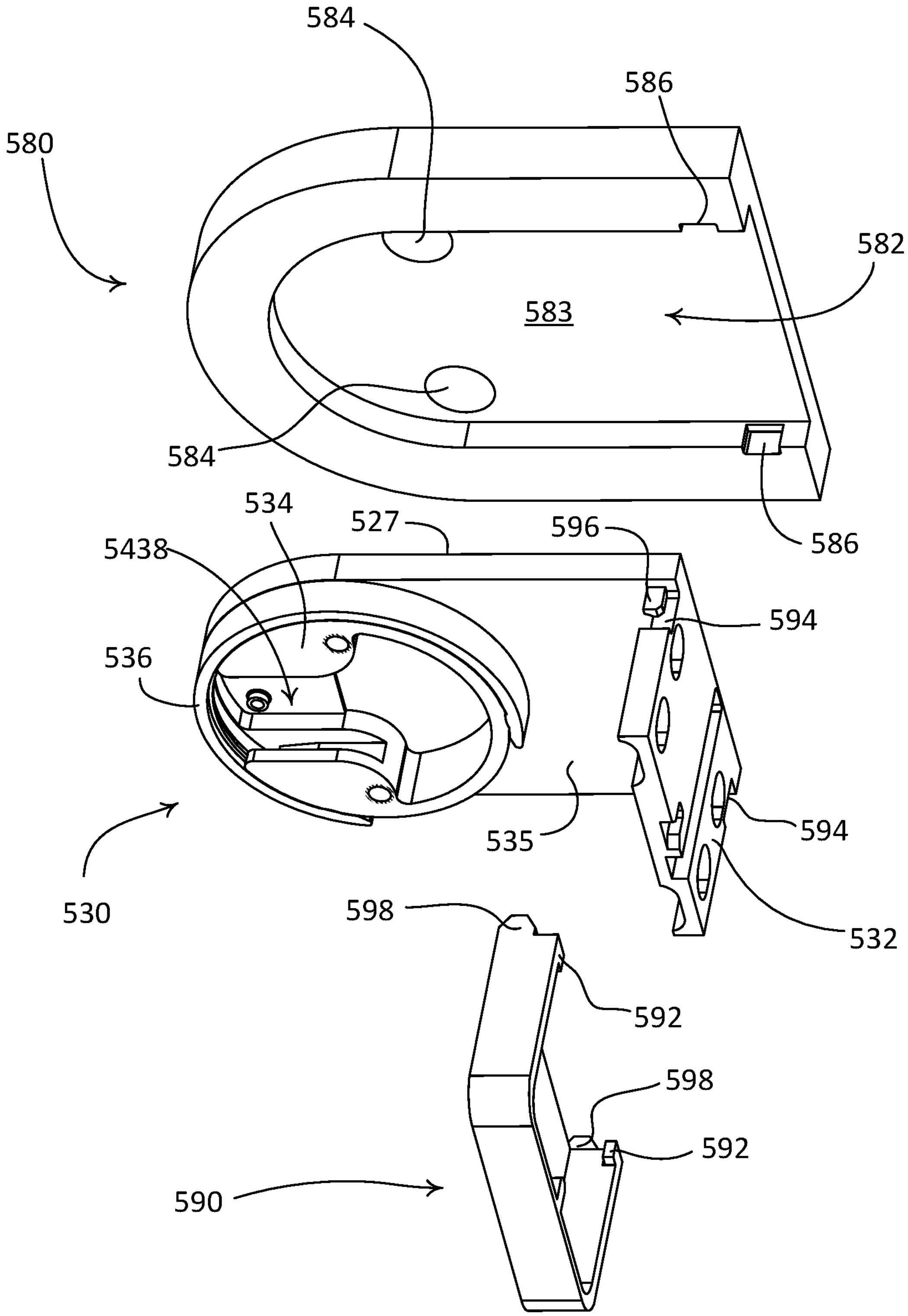
FIG. 21B is a rear exploded view of the mounting bracket, the bracket cover, and the base cover shown in FIG. 20A.
Figure 22A:
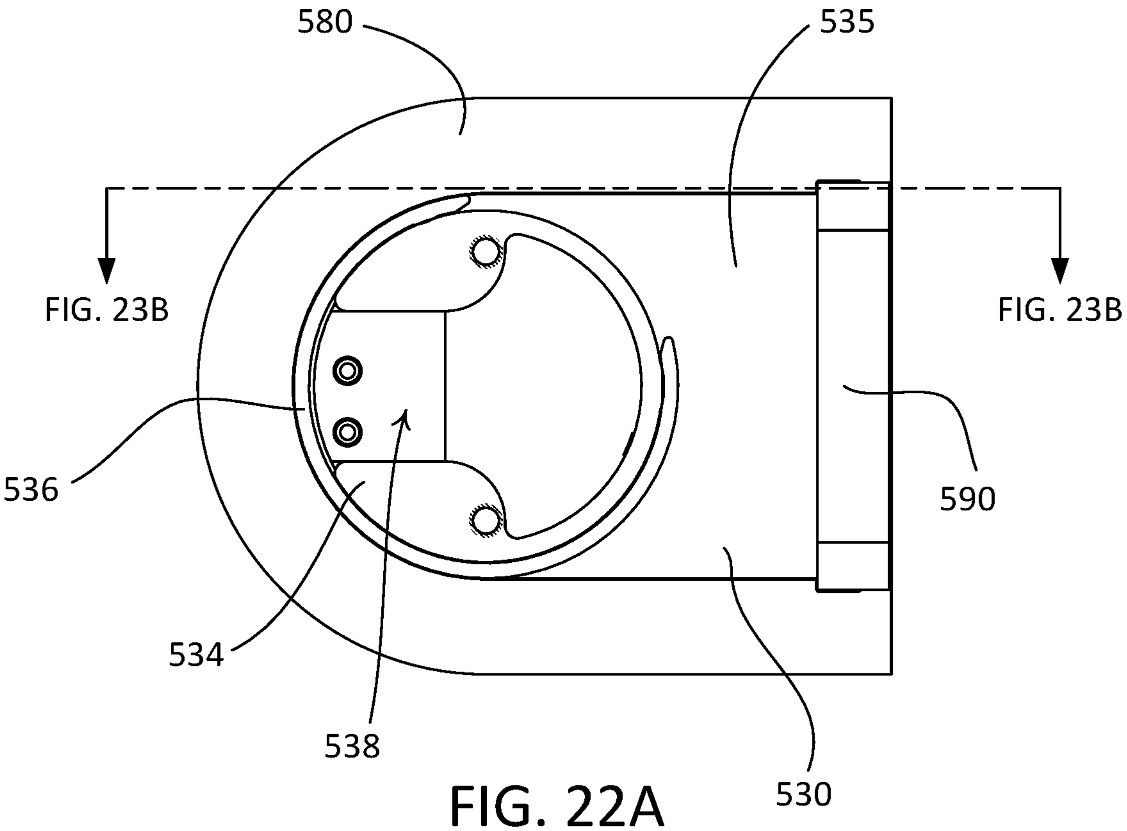
FIG. 22A is a side view of the mounting bracket shown in FIG. 21A with the bracket cover and the base cover installed.
Figure 22B:
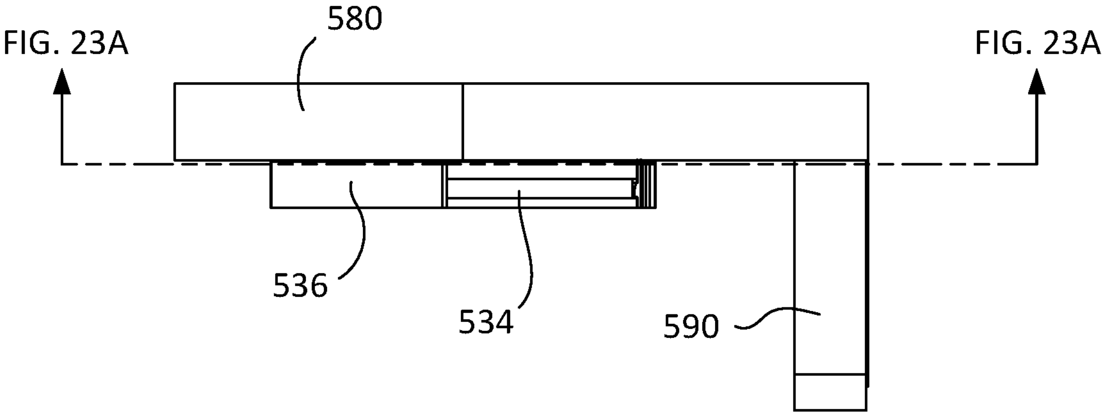
FIG. 22B is a top view of the mounting bracket shown in FIG. 21A with the bracket cover and the base cover installed.
Figure 23A:
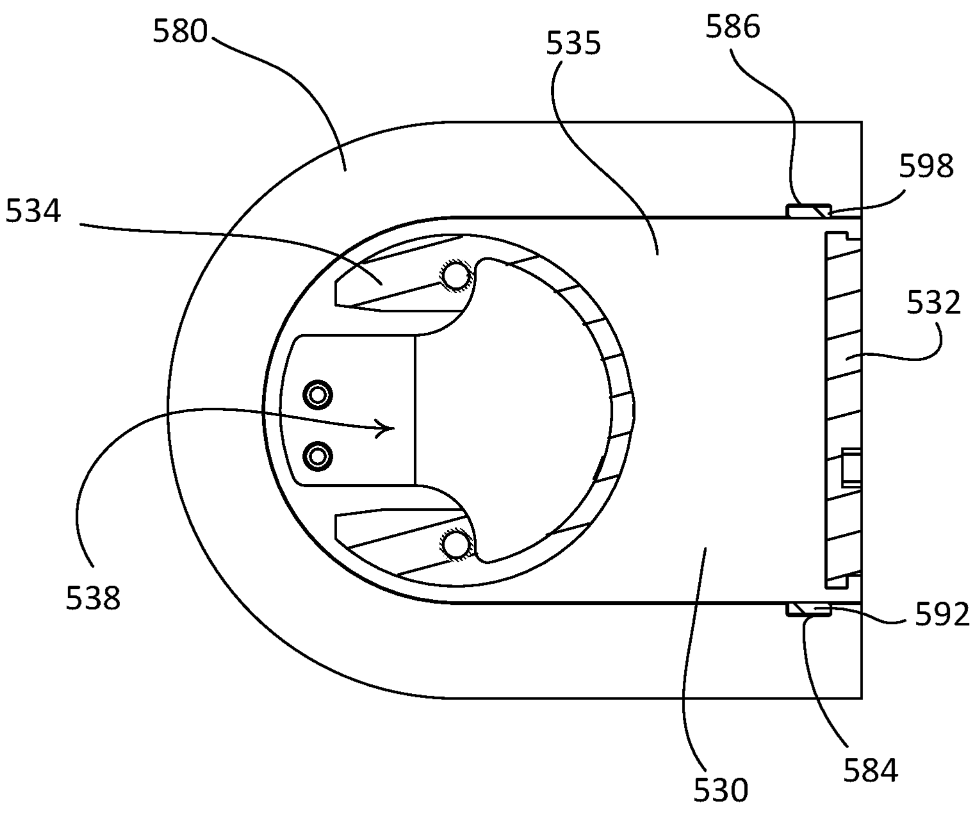
FIG. 23A is a side cross-section view of the mounting bracket shown in FIG. 22A through the line shown in FIG. 22B.
Figure 23B:
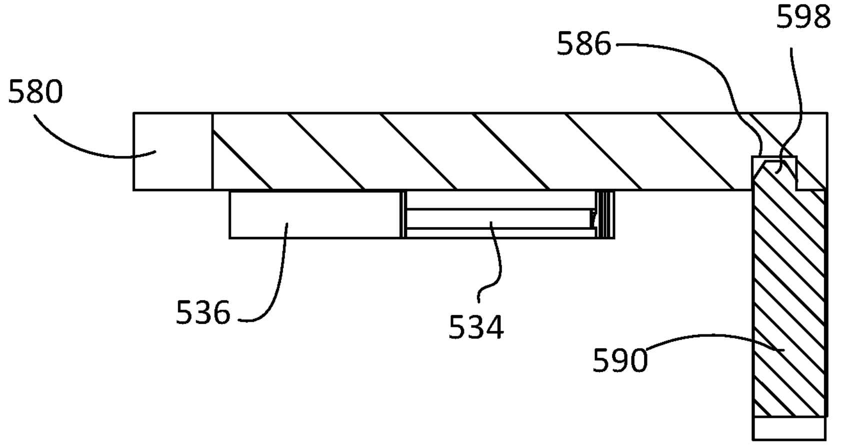
FIG. 23B is a top cross-section view of the mounting bracket shown in FIG. 22B taken through the line shown in FIG. 22A

FIG. 21A is a front exploded view and FIG. 21B is a rear exploded view showing the mounting bracket 530, the bracket cover 580, and the base cover 590. FIG. 22A is a side view and FIG. 22B is a top view of the mounting bracket 530 with the bracket cover 580 and the base cover 590 installed. FIG. 23A is a side cross-section view of the mounting bracket 530 shown in FIG. 22A through the line shown in FIG. 22B. FIG. 23B is a side cross-section view of the mounting bracket 530 shown in FIG. 22B through the line shown in FIG. 22A. The attachment member 534 of the mounting bracket 530 may have a channel 538 for receiving the end portion of the drive assembly in a similar manner as the channel 138 of the mounting bracket 130 of FIGS. 8A and 8B and/or the channel 238 of the mounting bracket 230 of FIGS. 10A and 10B.

The bracket cover 580 may define a recess 582 for receiving the arm 535 of the mounting bracket 530. When the arm 535 is received in the recess 582, an outer surface 527 of the arm 535 may be adjacent to and/or abut an inner surface 583 of the recess 582. For example, the outer surface 527 may substantially flat and may have no features to allow for attachment to the inner surface 583 of the recess 582 (e.g., as shown by the outer surface 127 of the arm 135 of the mounting bracket 130 in FIG. 2B).

The bracket cover 580 may be installed over the arm 535 of the mounting bracket 530 (e.g., slid onto the arm 535) and then the base cover 590 may be installed over the base 532. The base cover 590 may be attached to the bracket cover 580, such that the base cover captures the bracket cover against the mounting bracket 530. The base cover 590 may include tabs 592 that may be inserted in respective recesses 594 in the base 532 of the mounting bracket 530. After the tabs 592 are received in the recesses 594 and pushed up against the structure to which the mounting bracket 530 is attached, the base cover 590 may be pushed towards the arm 535, such that the tabs 592 are captured under respective extensions 596 of the base 532 for holding the base cover 590 in place. The base cover 590 may include projections 598 that may be received in notches 586 of the bracket cover 580 for holding the bracket cover 580 against the mounting bracket 530.

The bracket cover 580 may include one or more magnets 584. The magnets 584 may be positioned adjacent to one or more metal elements (not shown) inside of the arm 535 of the mounting bracket 530 when the bracket cover 580 is mounted over the arm 535 of the mounting bracket 530. The magnets 584 may be configured to hold the bracket cover 580 against the arm 535 of the mounting bracket 530. In addition, the arm 532 of the mounting bracket 530 may comprise magnets (not shown) positioned adjacent to one or more metal elements (not shown) inside of the bracket cover 580 when the bracket cover is mounted over the arm for holding the bracket cover against the arm.

The bracket cover 580 could also be attached to an elongated support member (not shown) that may be connected to the structure (e.g., to the wall) adjacent to the mounting bracket and may extend from the wall parallel to the mounting bracket. The bracket cover 580 may define an opening (not shown) for receiving the elongated support member and may be configured to snap onto the elongated support member. When the bracket cover 580 is attached to the elongated support member, the magnets 584 of the bracket cover 580 may not be needed to hold the bracket cover 580 against the mounting bracket 530.

Figure 24A:
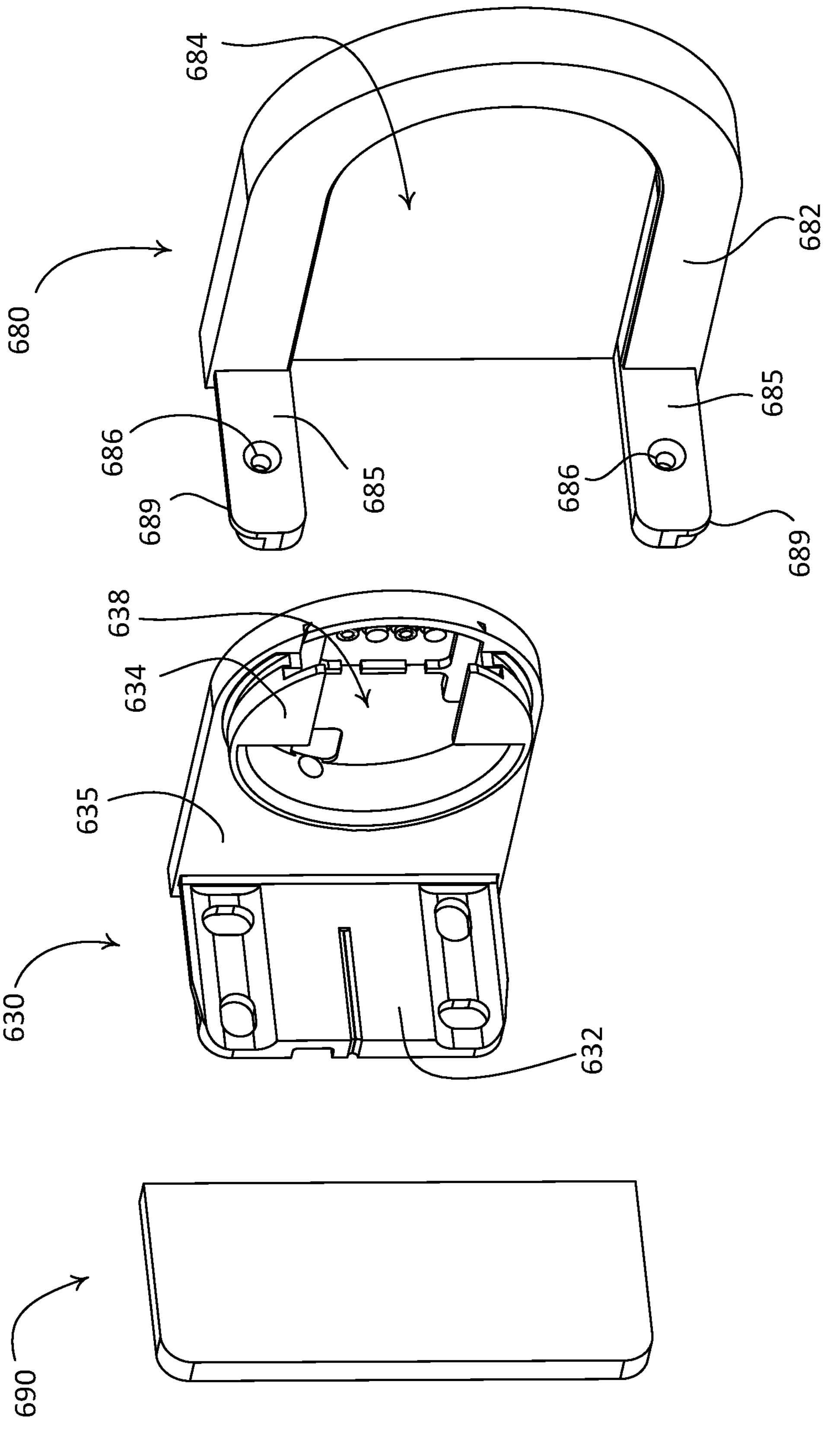
FIG. 24A is a front exploded view of a mounting bracket, a bracket cover, and a base cover.
Figure 24B:
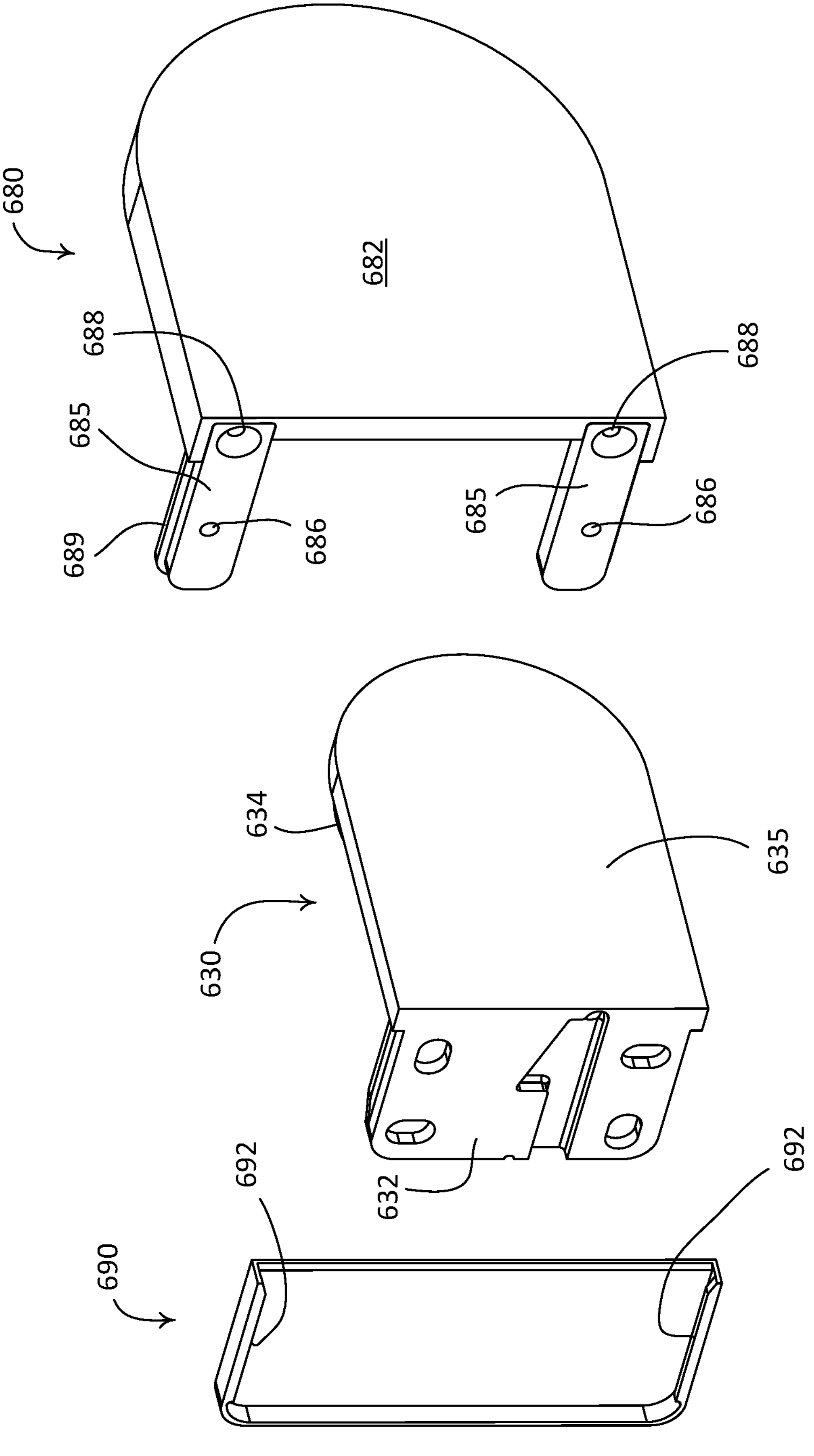
FIG. 24B is a rear exploded view the mounting bracket, the bracket cover, and the base cover of FIG. 24A.

FIG. 24A is a front exploded view and FIG. 24B is a rear exploded view of a mounting bracket 630, a bracket cover 680, and a base cover 690. The mounting bracket 630 may be configured to rotatably support a roller tube (not shown) of a motorized window treatment, and may be similar to each of the mounting brackets 130, 230 of the motorized window treatment 100 shown in FIG. 1. The mounting bracket 630 may include a base 632 and an attachment member 634 connected to the base 632 via an arm 635. The base 632 may be configured to connect the mounting bracket 630 to (e.g., attach the mounting bracket to) a window frame, a wall, or other structure. The attachment member 634 may be configured to be attached to an end portion of a drive assembly (not shown) mounted inside of the roller tube. The attachment member 634 of the mounting bracket 630 may have a channel 638 for receiving the end portion of the drive assembly in a similar manner as the channel 138 of the mounting bracket 130 of FIGS. 8A and 8B and/or the channel 238 of the mounting bracket 230 of FIGS. 10A and 10B. The attachment member 634 may include a sliding cover (not shown), which may cover the end portion of the drive assembly in a similar manner as the sliding covers 136, 236 of the motorized window treatment 100 of FIG. 1.

The bracket cover 680 may be configured to be mounted over the arm 635 of the bracket 630 (e.g., slid onto the attachment member). The bracket cover 680 may include a body 682 that defines a recess 684 for receiving the arm 635 of the mounting bracket 630. The bracket cover 680 may include feet 685 that extend from the body 682 (e.g., in the same direction as the base 632 extends from the arm 635 of the mounting bracket 630 when the bracket cover 680 is mounted over the arm). The feet 685 may be configured to mount the bracket cover 680 to (e.g., attaching the bracket cover 680 to) the window frame, wall, or other structure to which the mounting bracket 630 is mounted. The feet 685 of the bracket cover 680 may include respective openings 686 for receiving fasteners (not shown). The feet 685 may be attached to the body 682 via fasteners (not shown) received through openings 688 in the feet. The feet 685 may be detachable from the body 682 (e.g., by removing the fasteners in the openings 688) to enable the feet 685 to be attached to bracket covers of other shapes, sizes, and materials (e.g., to allow for ease of customization of the bracket covers).

After the bracket cover 680 is installed over the arm 635 of the mounting bracket 630, the base cover 690 may be installed over the base 632. The base cover 690 may include flanges 692 that may be received under respective flanges 689 on the feet 685 of the bracket cover 680. The base cover 690 may be pushed towards the arm 635 of the mounting bracket 630, such that the flanges 692 slide by and are captured under the respective flanges 689 of the feet 685 of the bracket cover 680.

Figures 25A, 25B, 25C:
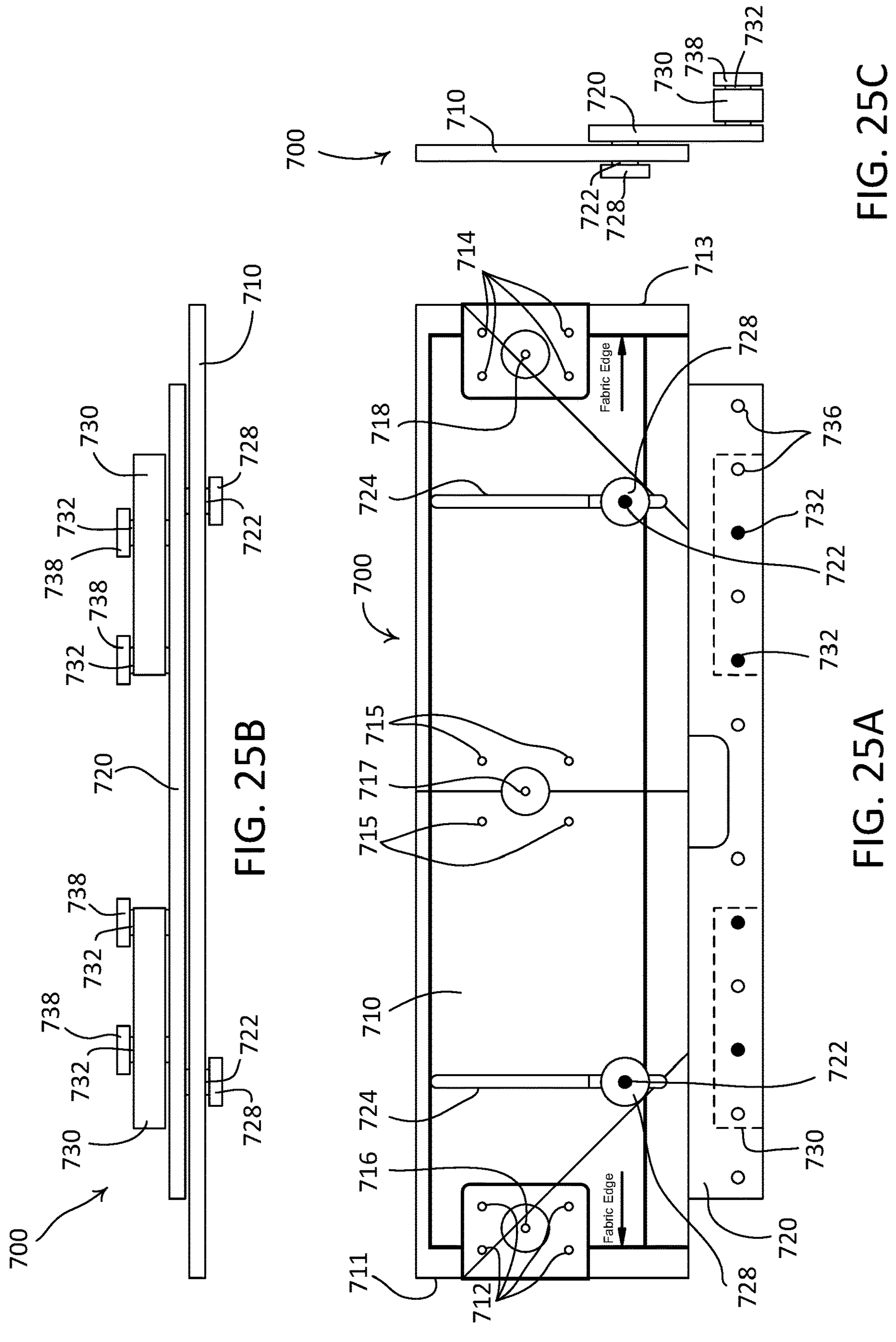
FIGS. 25A-25D depict an example bracket mounting jig for locating pilot holes for mounting one or more mounting brackets.
Figure 25D:
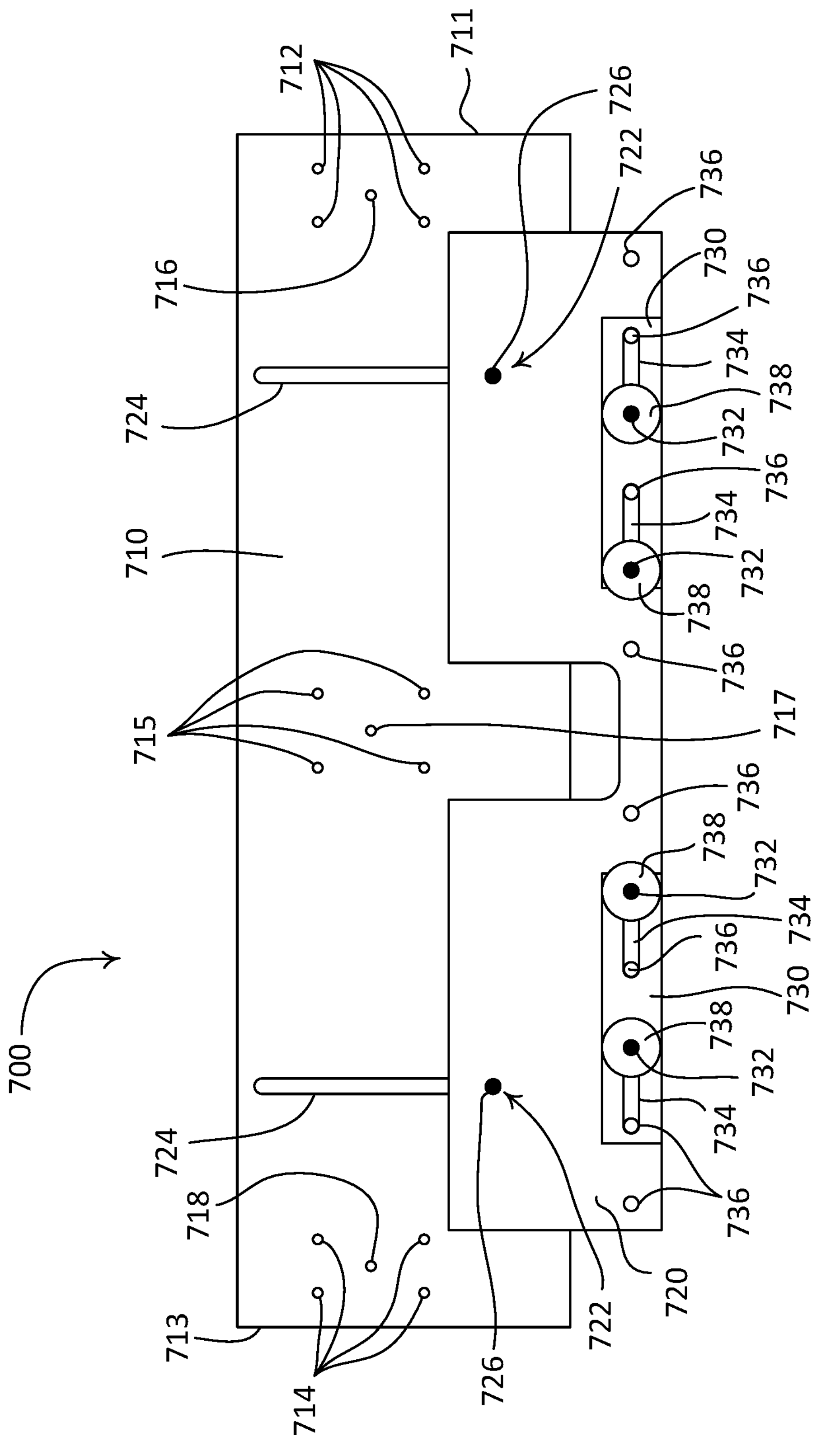

FIG. 25A is a front view, FIG. 25B is a top view, FIG. 25C is a right-side view, and FIG. 25D is a rear view of an example bracket mounting jig 700. For example, the bracket mounting jig 700 shown in FIGS. 25A-25D may be used for installing mounting brackets of a motorized window treatment (e.g., the mounting brackets 130, 230 of the motorized window treatment 100) to a vertical surface (e.g., a wall) outside of a window frame (e.g., above a window). The bracket mounting jig 700 may include a main body 710 that is rectangular in shape and has holes 712, 714 that allow for marking the locations of pilot holes and/or allow for drilling of the pilot holes for mounting the mounting brackets 130. For example, the main body 710 of the bracket mounting jig 700 may include four holes 712 near a left side 711 of the main body 710 for locating the pilot holes for the left mounting bracket, and four holes 714 near a right side 713 of the main body 710 for locating the pilot holes for the right mounting bracket. The main body 710 of the bracket mounting jig 700 may include four holes 715 for locating the pilot holes for a center mounting bracket (e.g., such as the center mounting bracket 330 shown in FIGS. 15A, 15B, and 16A-16F). Each set of four holes 712, 714, 715 (e.g., the mounting-screw holes) may be located in a rectangular orientation with respect to each other as shown in FIG. 25A with the respective holes 716, 717, 718 (e.g., the wall-box holes) located between the holes 712, 714, 715.

As previously mentioned, an electrical wall box (e.g., the electrical wall box 190) may be located behind one of the mounting brackets 130, 230 and may be concealed by the mounting bracket. The main body 710 may include holes 716, 717, 718 for locating pilot holes for drilling a hole for the electrical wall box 190 behind one of the left, center, and right mounting brackets, respectively. The pilot holes for the electrical wall box 190 may (e.g., only) need to be drilled for the mounting brackets that have electrical wiring to be connected to the drive assembly 160 of the motorized window treatment 100. Each of the holes 716, 717, 718 may be surrounded by a respective outline that may be printed on the main body 710 and may indicate the outline of the electrical wall box 190 to be located behind the respective mounting bracket.

The bracket mounting jig 700 may include a spacing member 720. The spacing member 720 may be connected to the main body 710 via screws 722 received through respective slots 724 in the main body 710 and respective openings 726 in the spacing member 720. The screws 722 may have respective knobs 728 that may be grasped by a user and twisted to allow for loosening and tightening the screws. The spacing member 720 may be moved vertically with respect to the main body 710 by loosening the screws 722 and sliding the screws through respective slots 724.

The bracket mounting jig 700 may further include two locating members 730. The locating members 730 may be connected to the spacing member 720 via screws 732 received through respective slots 734 in the locating members 730 and respective openings 736 in the spacing member 720. The screws 732 may also have respective knobs 738 for loosening and tightening the screws. The locating members 730 may each be moved horizontally with respect to the spacing member 720 by loosening the screws 732 and sliding the screws through respective slots 734. In addition, the screws 732 may be fully removed from the openings 736 and inserted in other openings 736 of the spacing member 720 to adjust the horizontal position of the locating members 730.

The locating members 730 may be configured to be located in the corner of a window over which the mounting brackets are to be located. For example, when locating the pilot holes for the right mounting bracket, the right locating member 730 may be located in the upper right corner of the window. For example, the position of the spacing member 720 may be adjusted vertically and the position of the right locating members 730 may be adjusted horizontally until the holes 714 for the right mounting bracket are in the correct location. The same steps may be completed for locating the holes 712 for the left mounting bracket. When the spacing member 720 and the locating members 730 are in the desired positions, the respective screws 722, 732 may be tightened to lock the spacing member 720 and the locating members 730 in place. Accordingly, the pilot holes for the mounting brackets of multiple window treatments may be easily located by using the bracket mounting jig 700 with the locked spacing member 720 and locating members 730 at each window.

A ceiling mounting jig (not shown) may be used for installing the mounting brackets 130, 230 of the motorized window treatment 100 to a horizontal surface (e.g., inside of a window frame to the top surface of the window frame). The ceiling mounting jig may have a similar structure as the bracket mounting jig 700 shown in FIGS. 25A-25D. The ceiling mount jig may include a main body (e.g., similar to the main body 710) and a spacing member (e.g., similar to the spacing member 720). The ceiling mounting jig may not include the locating members 730 and/or the screws 732. The position of the spacing member of the ceiling mounting jig with respect to the main body may be adjusted to set the location of the mounting brackets with respect to the wall and/or window inside of the window frame.

A jamb mounting jig (not shown) may be used for installing the jamb mounting bracket 430 to a vertical surface (e.g., a wall and/or a side surface of a window frame).

Figure 26A:
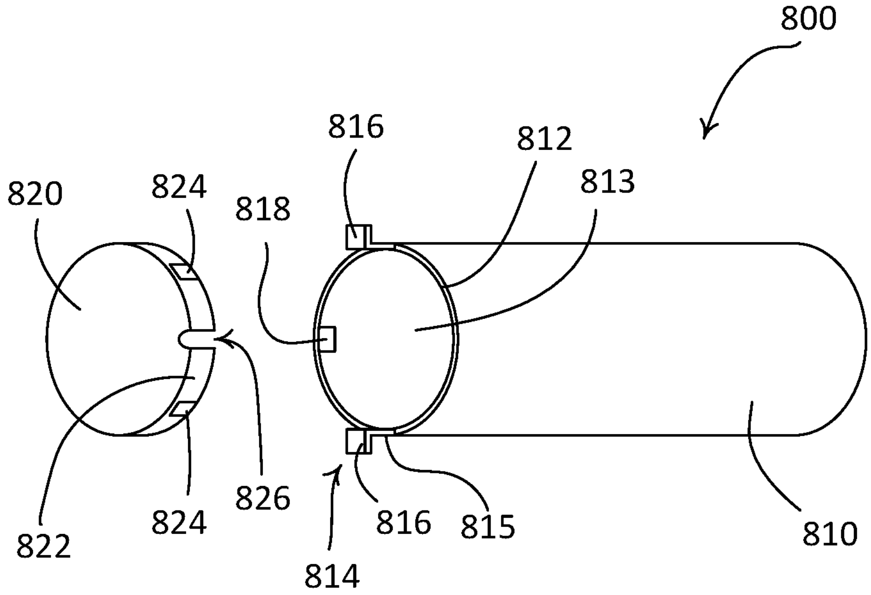
FIG. 26A is a perspective view of an example wall box for use with a motorized window treatment.
Figure 26B:
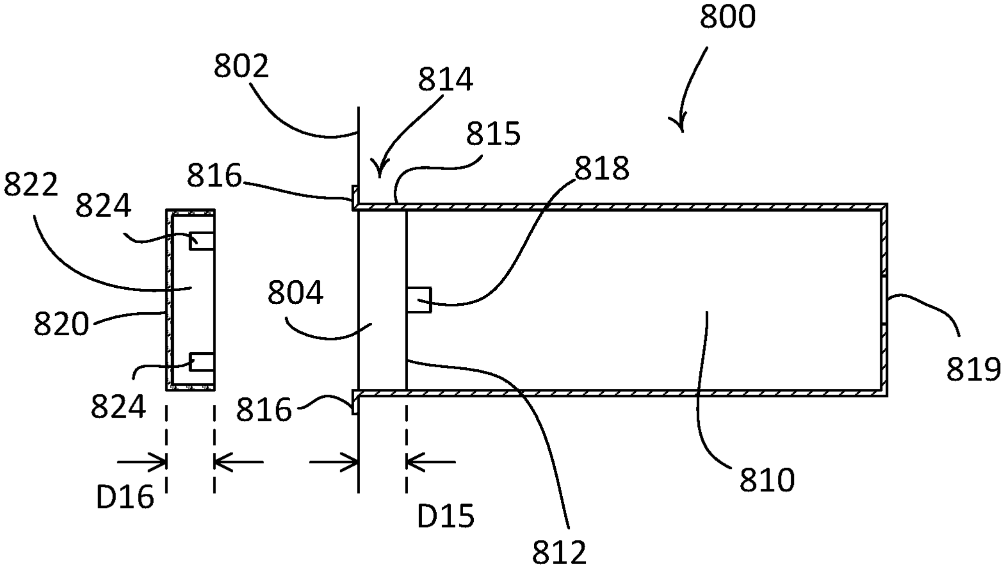
FIG. 26B is a side cross-section view of the wall box of FIG. 26A installed in a structure taken through the center of the wall box.

FIG. 26A is a perspective view of an example wall box 800, which may be an example of the electrical wall box 190 shown in FIG. 5. FIG. 26B is a side cross-section view of the wall box 800 installed in a structure 802 taken through the center of the wall box 800. The structure 802 may be a wall, a ceiling, or another similar structure. The wall box 800 may be an electrical wall box configured to receive electrical wiring for powering an electrical device (e.g., such as a motorized window treatment). The wall box 800 may include a body 810 (e.g., a cylindrical body) having a rim 812. The rim 812 may define a front opening 813 (e.g., a circular opening) of the wall box 800. The wall box 800 may include ears 814, e.g., at opposite sides of the opening 813. The ears 814 may be configured such that the wall box 800 remains at a predetermined depth D15 below the surface of the structure 802 (e.g., as shown in FIG. 26B) during installation of the wall box 800. Each of the ears 814 may include an elongated portion 815 extending from the body 810 adjacent to the front opening 813 (e.g., from the rim) and a flange portion 816 that extends at an angle (e.g., approximately 90°) from the elongated portion 815. The wall box 800 may include mounting openings 818 on opposing sides of the wall box 800 adjacent to the rim 812. The mounting openings 818 may be configured to receive mounting screws 830 to secure the wall box 800 to the structure 802 and/or a stud during installation of the wall box 800. The wall box 800 may include an electrical wiring opening 819 (e.g., as shown in FIG. 26B). The electrical wiring opening 819 may enable receipt of electrical wiring 832 through the rear of the wall box 800. The wall box 800 may include a cap 820 having a wall 822 (e.g., a cylindrical wall) with snaps 824. The cap 820 may define an opening 826 (e.g., a gap). The opening 826 may be configured to enable the electrical wiring 832 to exit the front of the wall box 800 through the cap 820. The cap 820 may be characterized by a depth D16 (e.g., as shown in FIG. 26B), which may be approximately equal to the length of the elongated portions 815 of the ears 814.

Figure 27A:
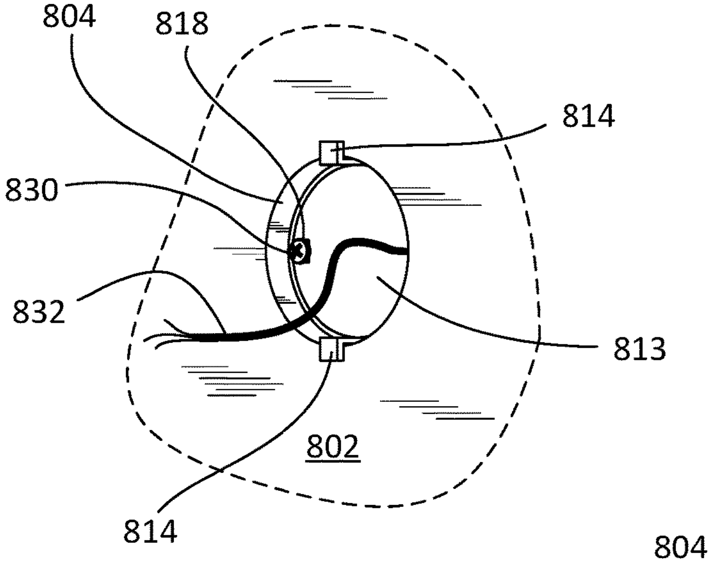
FIGS. 27A-27C are perspective views of the wall box of FIG. 26A for illustrating an installation procedure of the wall box into the structure.
Figure 27B:
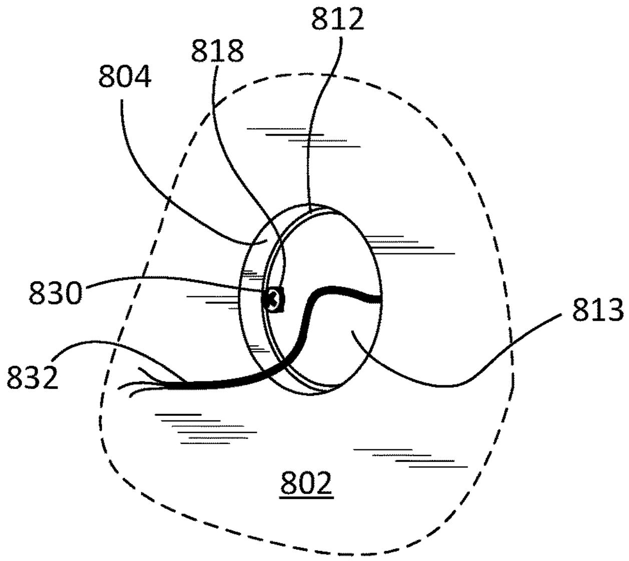
Figure 27C:
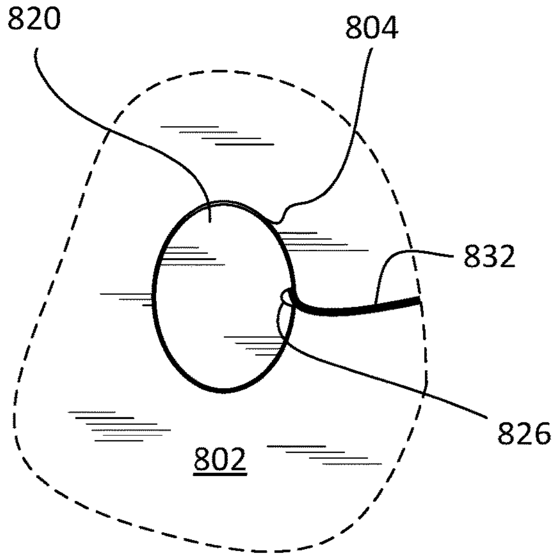

FIGS. 27A-27C are perspective views of the wall box 800 for illustrating an installation procedure of the wall box 800 into the structure 802. An opening 804 (e.g., a hole) may (e.g., first) be drilled into the structure 802 and the wall box 800 may be inserted into the opening 804 as shown in FIG. 27A. The flange portions 816 of the ears 814 may rest against (e.g., abut) the surface of the structure 802. The electrical wiring 832 may extend through the electrical wiring opening 819 at the rear of the wall box 800 and the front opening 813 of the wall box 800. The electrical wiring 832 may be connected to an electrical device. For example, the electrical wiring may be connected to a motorized window treatment via a connector (not shown) that may be connected to the electrical wiring of the motorized window treatment (e.g., the electrical wiring 180 shown in FIG. 5) and may be located inside of the wall box 800. The mounting screws 830 may be installed through the mounting openings 818 and may extend substantially perpendicular to the body 810 of the wall box 800. The flange portions 816 of the ears 814 may prevent the wall box 800 from being driven further back into the opening 804 while the mounting screws 830 are being installed. The ears 814 may hold the wall box 800 at the predetermined depth D15 below the surface of the structure 802.

After the mounting screws 830 are installed, the ears 814 may be removed (e.g., broken off, cut off, etc.) from the wall box 800 as shown in FIG. 27B. A base of a mounting bracket of the motorized window treatment (e.g., the mounting brackets 130, 230, 430, 530) may be installed over the wall box 800, for example, to hide the wall box 800 from view. If the mounting bracket is not able to be installed over the wall box 800, the cap 820 may be installed in the opening 804 as shown in FIG. 27C. The electrical wiring 832 may extend through the opening 826 in the cap 820 to the motorized window treatment. The snaps 824 shown in FIGS. 26A, 26B may be configured to removably secure the cap

820 within the opening 804. The depth D16 of the cap 820 may be approximately equal to the predetermined depth D15.

Figure 28:
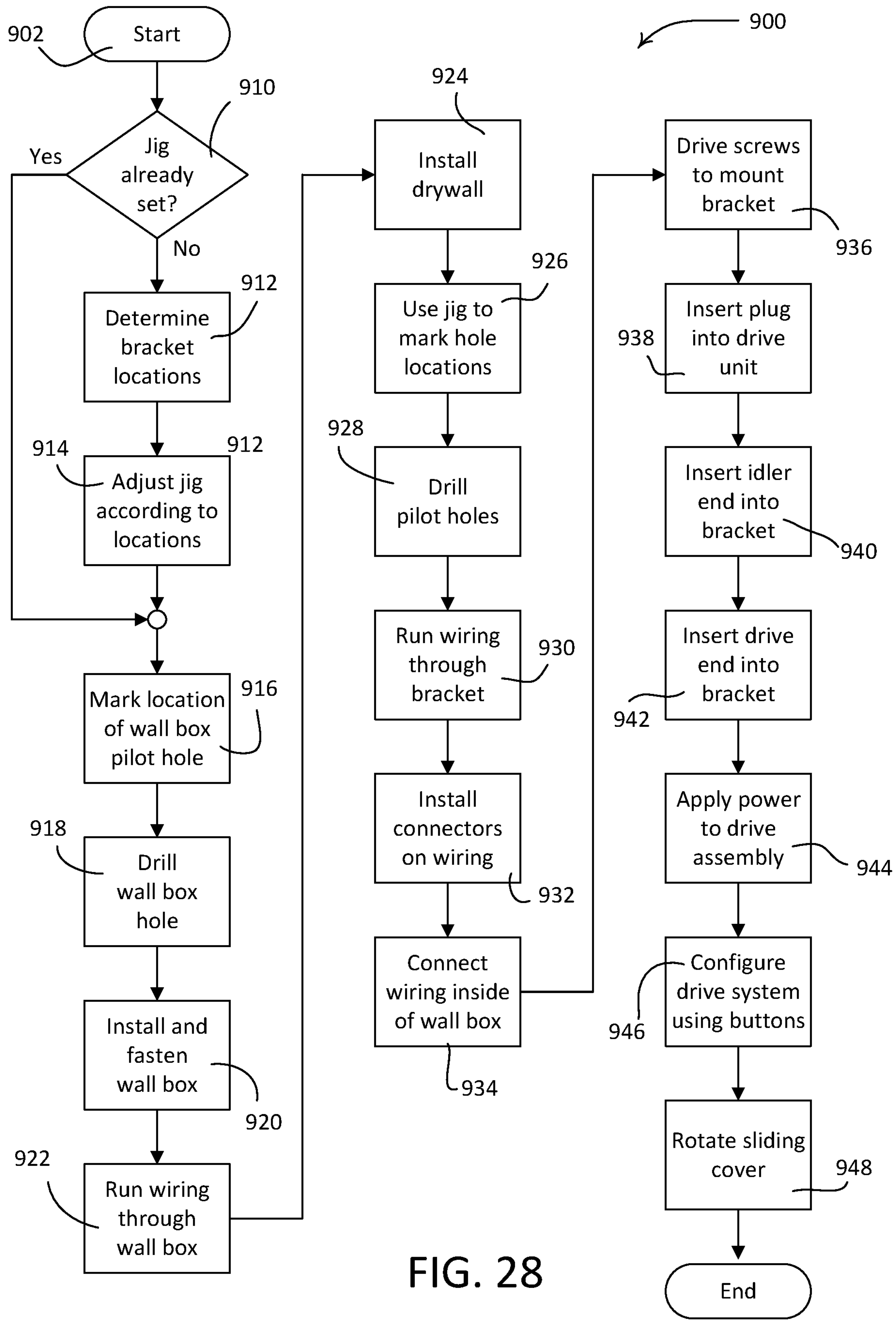
FIG. 28 is a flowchart of an example installation procedure for a motorized window treatment.

FIG. 28 is a flowchart of an example installation procedure 900 for a motorized window treatment (e.g., the motorized window treatment 100 shown in FIG. 1). The installation procedure 900 may begin at 902. If a jig for installing the determining the locations of pilot holes for mounting the motorized window treatment (e.g., the bracket mounting jig 700 shown in FIGS. 25A-25D) has not already been set up at 910, the location of the mounting brackets may be determined at 912 and the jig may be adjusted according to the determined location at 914. For example, the positions of the spacing member 720 and the locating members 730 of the bracket mounting jig 700 may be adjusted at 914. At 916, the jig may be used to mark the location of a pilot hole for an electrical wall box to be mounted behind one of the mounting brackets (e.g., the electrical wall box 190). At 918, a hole may be drilled into a support within the structure (e.g., into a stud, ceiling joist, etc.) for the electrical wall box. At 920, the electrical wall box may be installed in the drilled hole and may be fastened to the support. The electrical wall box may have a lip that extends from the support around which drywall may be installed.

At 922, electrical wiring may be run through the wall box and connected to electrical wiring within the structure (e.g., in the walls, ceiling, etc.). At 924, the drywall may be installed around the electrical wall box. At 926, the jig may be used to mark the location of pilot holes for the screws (e.g., fasteners) for the mounting bracket. For example, the jig may be aligned with the electrical wall box and/or the corner of the window at 926. At 928, the pilot holes for the screws may be drilled through the drywall and the support behind the drywall. At 930, electrical wiring (e.g., a window treatment harness with a plug) may be inserted through the bracket (e.g., through the bore 133, 233 with the plug on the side of the mounting bracket 130, 230 having the attachment member 134, 234). At 932, connectors may be connected to the electrical wiring extending through the bracket and the electrical wiring extending from the electrical wall box. At 934, the connectors may be plugged together and inserted into the electrical wall box. At 936, the screws may be driven into the pilot holes and the holes in the base of the mounting bracket to mount the mounting bracket.

At 938, the plug of the electrical wiring in the mounting bracket may be plugged into the connector on the drive assembly. The idler end of the roller tube may be inserted into the channel of one of the mounting brackets at 940 and the drive end of the roller tube may be inserted into the channel of the other mounting bracket at 942. At 944, power may be applied to the drive assembly 160 of the motorized window treatment. At 946, the drive assembly 160 may be configured using the buttons 117 of the user interface 118. At 948, the sliding cover of the mounting bracket may be closed and the installation procedure 900 may end. The installation procedure 900 may be repeated for mounting other motorized window treatments.

Figure 29:
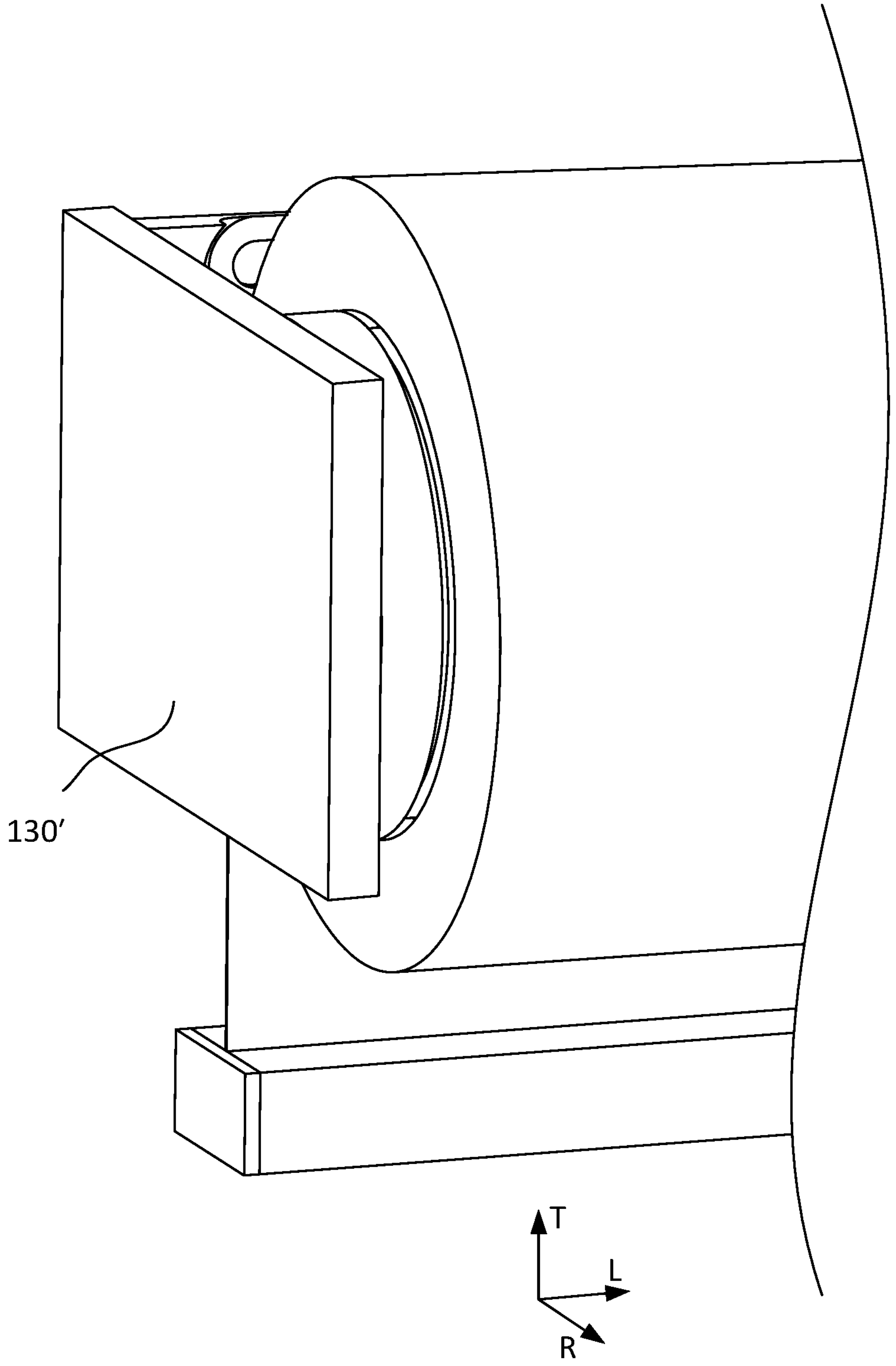
FIG. 29 is an enlarged perspective view of an example motorized window treatment showing another example mounting bracket.

While the mounting brackets 130, 230, 330, 430, 530, 630 shown and described herein have circular front surfaces, the mounting brackets 130, 230, 330, 430, 530, 630 may also have differently-shaped front surfaces. For example, mounting brackets 130, 230, 330, 430, 530, 630 may have front surfaces of another shape, such as, for example, a rectangular shape (e.g., as shown on a mounting bracket 130' in FIG. 29), a square shape, a triangular shape, an oval shape, or any suitable shape. In addition, the side surfaces of the mounting brackets 130, 130', 230, 330, 430, 530, 630 may have different shapes and may be planar or non-planar. Further, the surfaces of the mounting brackets 130, 130', 230, 330, 430, 530, 630 may be characterized by various colors, finishes, designs, patterns, etc.

Figure 30:
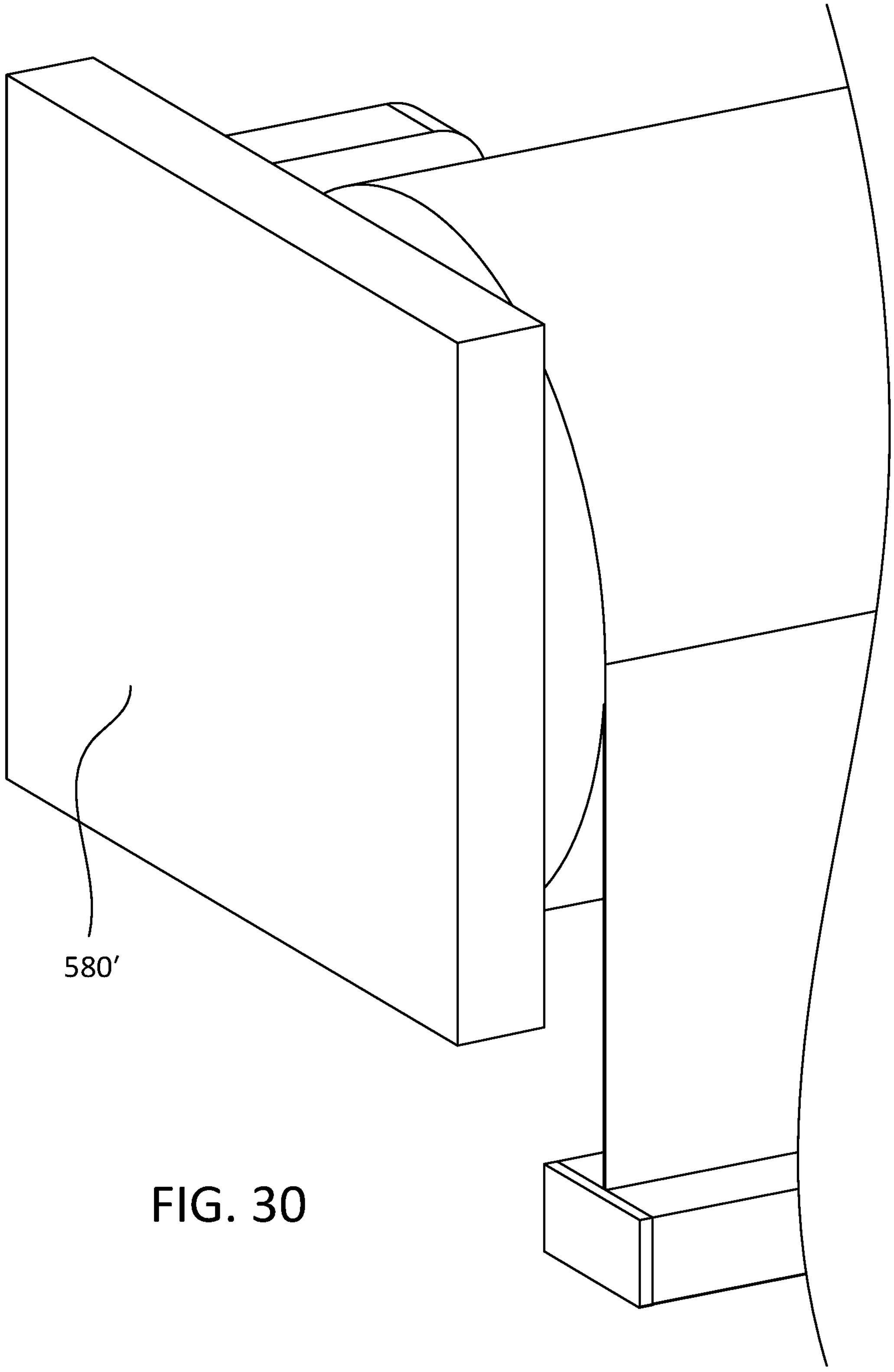
FIG. 30 is an enlarged perspective view of an example motorized window treatment showing another example bracket cover.

While the bracket covers 580, 680 shown and described herein each has a circular front surface, each bracket cover may also have a differently-shaped front surface. For example, the bracket covers 580, 680 may each have a front surface of another shape, such as, for example, a rectangular shape (e.g., as shown on a bracket cover 580' in FIG. 30), a square shape, a triangular shape, an oval shape, or any suitable shape. In addition, the side surfaces of the bracket covers 580, 580', 680 may have different shapes and may be planar or non-planar. Further, the surfaces of the bracket covers 580, 580', 680 may be characterized by various colors, finishes, designs, patterns, etc.

Figure 31:
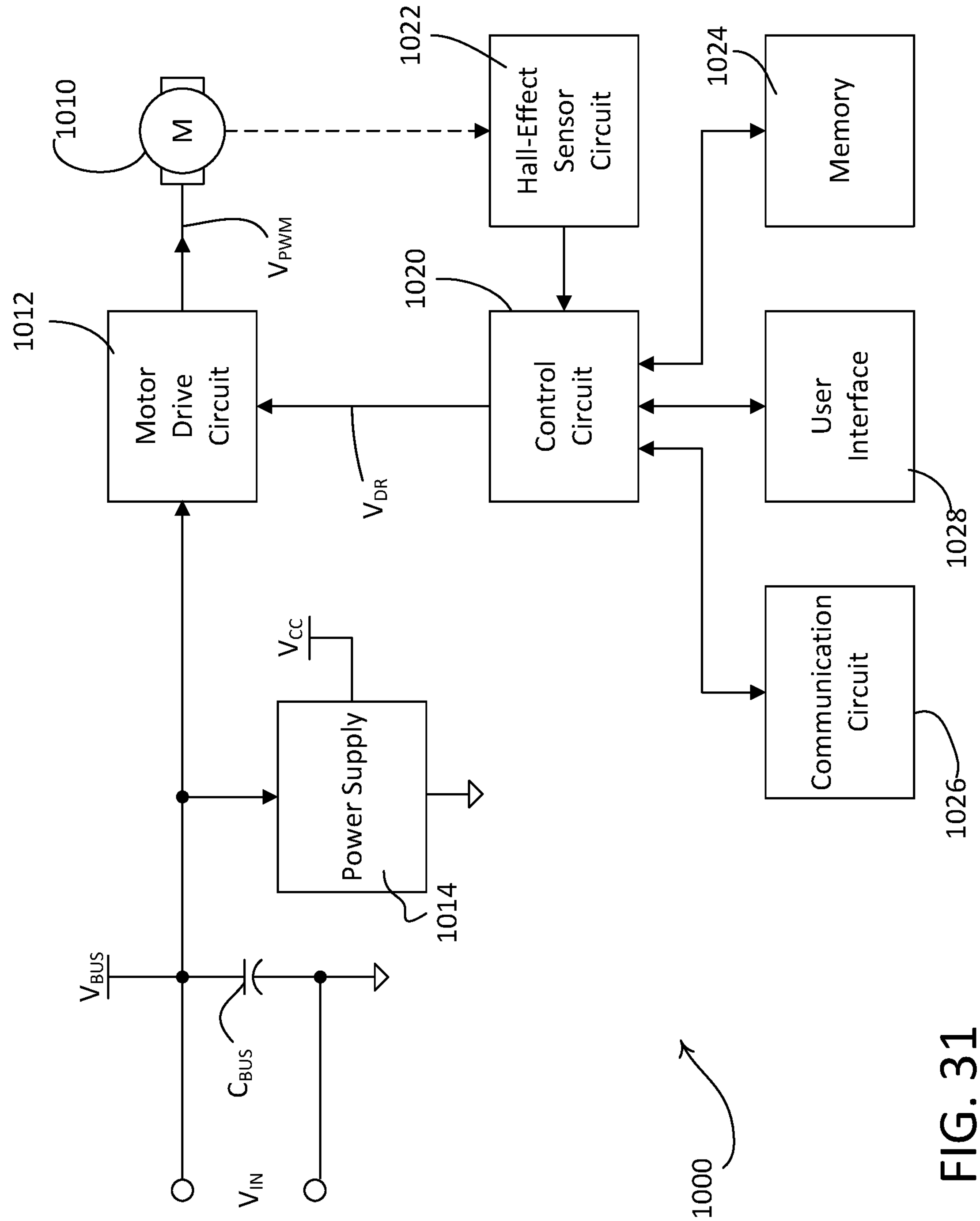
FIG. 31 is a simplified block diagram of a motor drive unit of a motorized window treatment.

FIG. 31 is a simplified block diagram of a motor drive unit 1000 of a motorized window treatment (e.g., the drive assembly 160 of the motorized window treatment 100). The motor drive unit 1000 may include a motor 1010 (e.g., a direct-current motor) that may be coupled to a roller tube of the motorized window treatment (e.g., the roller tube 110) for rotating the roller tube. Rotation of the roller tube may be configured to raise and lower a covering material (e.g., the flexible material 120). The motor drive unit 1000 may include a motor drive circuit 1012 (e.g., an H-bridge drive circuit) that receives a bus voltage $V_{BUS}$ and may generate a pulse-width modulated (PWM) voltage for driving the motor 1010. The bus voltage $V_{BUS}$ may be produced across a bus capacitor $C_{BUS}$. The motor drive unit 1000 may include a power supply 1014 that may receive the bus voltage $V_{BUS}$ and generates a supply voltage $V_{CC}$ for powering the low-voltage circuitry of the motor drive unit. The motor drive unit 1000 may be configured to receive an input voltage VIN from, for example, an external power supply, such as a direct-current (DC) supply and/or an alternating-current (AC) supply. Additionally or alternatively, the motor drive unit 1000 may be powered by one or more batteries and/or a photovoltaic power source, such as a solar cell.

The motor drive unit 1000 may include a control circuit 1020 for controlling the operation of the motor 1010. The control circuit 1020 may include, for example, a microprocessor, a programmable logic device (PLD), a microcontroller, an application specific integrated circuit (ASIC), a field-programmable gate array (FPGA), or any suitable processing device or control circuit. The control circuit 1020 may be configured to generate one or more drive signals VDR for controlling the motor drive circuit 1012. The one or more drive signals VDR may be configured to control the rotational speed and/or direction of rotation of the motor 1010.

The motor drive unit 1000 may include a rotational position sensor, such as, for example, a Hall effect sensor (HES) circuit 1022, which may be configured to generate one or more Hall effect sensor signals $V_{HES}$. The one or more Hall effect sensor signals $V_{HES}$ may indicate a rotational speed and/or a direction of the motor 1010 to the microcontroller. The rotational position sensor may include other suitable position sensors, such as, for example, magnetic, optical, and/or resistive sensors. The control circuit 1020 may be configured to determine a rotational position of the motor 1010 in response to the Hall effect sensor signals $V_{HES}$ generated by the HES circuit 1022. The control circuit 1020 may be configured to determine a present position of the covering material in response to the rotational position of the motor 1010. The control circuit 1020 may be coupled to a memory 1024 (e.g., a non-volatile memory). The present position of the covering material and/or limits for controlling the position of the covering material (e.g., a fully open position and/or a fully closed position) may be stored in the memory 1024. The operation of a motor drive circuit and a Hall effect sensor circuit of an example motor drive unit is described in greater detail in commonly-assigned U.S. Pat. No. 5,848,634, issued Dec. 15, 1998, entitled MOTORIZED WINDOW SHADE SYSTEM, and commonly-assigned U.S. Pat. No. 7,839,109, issued Nov. 23, 2010, entitled METHOD OF CONTROLLING A MOTORIZED WINDOW TREATMENT, the entire disclosures of which are hereby incorporated by reference.

The motor drive unit 1000 may include a communication circuit 1026 that may allow the control circuit 1020 to transmit and receive communication signals, e.g., wired communication signals and/or wireless communication signals, such as radio-frequency (RF) signals. The motor drive unit 1000 may include a user interface 1028 having one or more buttons that allow a user to provide inputs to the control circuit 1020 during setup and/or configuration of the motorized window treatment. The control circuit 1020 may be configured to control the motor 1010 to control the movement of the covering material in response to a shade movement command received from the communication signals received via the communication circuit 1026 or the user inputs via the buttons of the user interface 1028. The user interface 1028 may include one or more light-emitting diodes (LEDs) that may be illuminated by the control circuit 1020, for example, to provide feedback to the user of the motorized window treatment.

What is claimed is:

1. A motorized window treatment comprising:

a roller tube having first and second ends, the roller tube configured to rotate about a longitudinal axis that defines a longitudinal direction;

a flexible material that is attached to the roller tube;

a motor drive unit located within the roller tube adjacent the first end of the roller tube, the motor drive unit configured to rotate the roller tube to adjust the flexible material between a raised position and a lowered position;

a first mounting bracket and a second mounting bracket configured to mount the motorized window treatment to a structure, the first and second mounting brackets configured to rotatably support the roller tube at the respective first and second ends, the first and second mounting brackets each comprising an arm configured to extend from the structure, and an attachment member extending from the arm, the attachment member of each of the first and second mounting brackets defining a channel with an opening configured to slidingly receive the respective first or second end of the roller tube in a transverse direction that is perpendicular to the longitudinal axis to mount the roller tube to the first and second mounting brackets, and wherein the channel of each of the first and second mounting brackets is defined by a first flange, a second flange, and a side wall that is distal from the first and second flanges in the longitudinal direction, wherein a width of the channel in the longitudinal direction is defined by the first and second flanges and the side wall, the first and second flanges configured to secure the roller tube in position along the longitudinal axis, wherein the first mounting bracket is further configured to enclose at least a portion of an electrical wiring for powering the motor drive unit, and wherein each of the first and second mounting brackets further comprises a respective base configured to attach the respective mounting bracket to the structure, each base extending perpendicular from the respective arm at an end of the arm that is opposite the attachment member, and wherein the attachment member of each of the first and second mounting brackets comprises a drum;

first and second sliding covers each configured to surround a respective drum, wherein the first and second sliding covers are configured to be rotated about the respective drum between an open position in which the opening of the respective channel of the respective attachment member is configured to receive the respective first or second end of the roller tube, and a closed position in which the opening of the respective channel of the respective attachment member is covered;

a first base cover configured to mount over the base of the first mounting bracket; and a second base cover configured to mount over the base of the second mounting bracket, wherein the attachment member of each of the first and second mounting brackets extends a predetermined distance from the respective arm such that the flexible material is prevented from contacting the respective arm as the roller tube is rotated to adjust the flexible material between the raised position and the lowered position.

2. The motorized window treatment of claim 1, wherein the arm of each of the first and second mounting brackets comprises an outer surface and an inner surface, and the attachment member of each of the first and second mounting brackets extends from the inner surface of the respective arm.

3. The motorized window treatment of claim 2, further comprising:

a first bracket cover configured to be mounted over the arm of the first mounting bracket and a second bracket cover configured to be mounted over the arm of the second mounting bracket, each of the first and second bracket covers comprising a body that defines a recess configured to receive the arm of the respective mounting bracket.

4. The motorized window treatment of claim 3, wherein the first and second base covers are configured to slide onto and over the bases of the respective first and second mounting brackets.

5. The motorized window treatment of claim 3, wherein each of the first and second bracket covers comprises feet for attaching the respective bracket cover to the structure.

6. The motorized window treatment of claim 5, wherein the feet of each of the first and second bracket covers extend from the body of the respective bracket cover in the same direction as the base extends from the arm of the respective mounting bracket when the respective bracket cover is mounted over the arm of the respective mounting bracket, and wherein each of the first and second base covers is further configured to be mounted over the feet of the respective bracket cover.

7. The motorized window treatment of claim 5, wherein the feet are detachable from the body of the respective bracket cover to enable the feet to be attached to another bracket cover.

8. The motorized window treatment of claim 5, wherein the feet of the respective bracket cover include respective openings for receiving fasteners to attach the respective bracket cover to the structure.

9. The motorized window treatment of claim 3, wherein each of the first and second base covers is further configured to be connected to a respective bracket cover, such that each of the first and second base covers captures the respective bracket cover against the respective mounting bracket.

10. The motorized window treatment of claim 9, wherein each of the first and second base covers includes projections that are received in notches of the respective bracket cover for holding the respective bracket cover against the arm of the respective mounting bracket.

11. The motorized window treatment of claim 9, wherein each of the first and second bracket covers comprises one or more magnets positioned adjacent to one or more metal elements inside of the arm of the respective mounting bracket when the respective bracket cover is mounted over the arm for holding the respective bracket cover against the arm.

12. The motorized window treatment of claim 3, wherein when the arm of each of the first and second mounting brackets is received in the recess of the respective bracket cover, an outer surface of the arm is adjacent to an inner surface of the recess, and wherein the outer surface of the arm includes no features that enable attachment to the inner surface of the recess.

13. The motorized window treatment of claim 2, wherein the attachment member of each of the first and second mounting brackets comprises an inner surface located towards the roller tube, and a distance between the outer surface of the arm and the inner surface of the attachment member of each of the first and second mounting brackets defines a light gap of the motorized window treatment, wherein the light gap is 0.5 inches or less.

14. The motorized window treatment of claim 1, wherein the channel of each of the first and second mounting brackets comprises a T-shaped cross section.

15. The motorized window treatment of claim 2, wherein the drum of the attachment member of each of the first and second mounting brackets has a diameter that is approximately equal to or less than a diameter of the roller tube.

16. The motorized window treatment of claim 15, wherein the first and second sliding covers each has a diameter that is approximately equal to the diameter of the roller tube, and wherein the first and second sliding covers are configured to secure the roller tube within the channel of the attachment member of the respective mounting bracket in a horizontal direction when the mounting brackets are attached to a vertical structure, and wherein the first and second sliding covers are configured to secure the roller tube within the channel of the attachment member of the respective mounting bracket in a vertical direction when the mounting brackets are attached to a horizontal structure.

17. The motorized window treatment of claim 1, wherein the motor drive unit further comprises a body located within the roller tube, and a mandrel connected to the body, the mandrel connected to the first end of the roller tube.

18. The motorized window treatment of claim 17, further comprising a ring portion surrounding the mandrel, the ring portion having at least one of a same color or finish as the first mounting bracket.

19. The motorized window treatment of claim 18, wherein an outer surface of the ring portion is flush with an outer surface of the roller tube.

20. The motorized window treatment of claim 1, wherein the channel of the attachment member of the first mounting bracket is configured to retain a portion of the electrical wiring for powering the motor drive unit.

21. The motorized window treatment of claim 1, wherein the arm of the first mounting bracket includes a bore configured to enclose at least a portion of the electrical wiring for powering the motor drive unit.

22. The motorized window treatment of claim 21, wherein the base of the first mounting bracket defines a pathway extending from the bore in the arm to a central portion of the base located between two attachment areas of the base.

23. The motorized window treatment of claim 1, wherein the first flange of each of the first and second mounting brackets defines a first slot and the second flange of each of the first and second mounting brackets defines a second slot, the first and second slots extending in the transverse direction, and each of the first and second slots having a width in the longitudinal direction that is defined by the respective one of the first and second flanges.

24. The motorized window treatment of claim 1, wherein the attachment member of each of the first and second mounting brackets comprises a respective spring configured to secure the respective end of the roller tube within the channel of the respective attachment member.

25. A motorized window treatment comprising:

a roller tube having a longitudinal axis extending in a longitudinal direction;

a flexible material that is attached to the roller tube, the flexible material operable between a raised position and a lowered position via rotation of the roller tube; and mounting brackets configured to support respective ends of the roller tube, wherein the mounting brackets are configured to be attached to a structure, and wherein each of the mounting brackets comprises:

a channel with an access opening configured such that a respective end of the roller tube is slidingly received by the channel through the access opening in a transverse direction that is perpendicular to the longitudinal direction to mount the roller tube to the mounting brackets, and wherein the channel of each of the mounting brackets is defined by a first flange, a second flange, and a side wall that is distal from the first and second flanges in the longitudinal direction, and wherein a width of the channel in the longitudinal direction is defined by the first and second flanges and the side wall, and wherein the first and second flanges are configured to secure the roller tube in position along the longitudinal axis;

an arm configured to extend from the structure;

an attachment member extending from the arm, the attachment member comprising a drum; and a spring that is attached within the respective channel to the side wall, the spring configured to secure the respective end of the roller tube within the respective channel; and wherein the motorized window treatment further comprises first and second sliding covers each configured to surround the drum of the respective mounting bracket, and wherein the first and second sliding covers are configured to cover the access opening of the channel of the respective mounting bracket.

26. The motorized window treatment of claim 25, wherein each spring comprises a rear edge that is spaced away from the respective side wall, and wherein the rear edge is configured to be pushed toward the respective side wall by the respective end of the roller tube as the respective end of the roller tube is slidingly received by the respective channel.

27. The motorized window treatment of claim 26, wherein the rear edge of each spring is configured to abut the respective end of the roller tube to retain the roller tube within the respective channel of the respective mounting bracket.

28. The motorized window treatment of claim 25, wherein the first and second sliding covers are configured to secure the roller tube within the respective mounting bracket in a horizontal direction when the mounting brackets are attached to a vertical structure, and wherein the first and second sliding covers are configured to secure the roller tube in a vertical direction when the mounting brackets are attached to a horizontal structure.

29. The motorized window treatment of claim 25, wherein the channel of each of the mounting brackets comprises a T-shaped cross section.

30. The motorized window treatment of claim 25, wherein the mounting brackets are configured to secure the roller tube in a first direction that is perpendicular to the structure and in a second direction that is parallel to the structure and perpendicular to the longitudinal axis.

31. The motorized window treatment of claim 25, wherein the first flange of each of the mounting brackets defines a first slot and the second flange of each of the mounting brackets defines a second slot, the first and second slots of each of the mounting brackets extending in the transverse direction, and each of the first and second slots having a width in the longitudinal direction that is defined by the respective one of the first and second flanges.

32. The motorized window treatment of claim 25, wherein the first and second sliding covers are each configured to rotate about the respective drum between an open position in which the access opening of the respective channel of the respective mounting bracket is configured to receive the respective end of the roller tube, and a closed position in which the access opening of the respective channel of the respective mounting bracket is covered by the respective first or second sliding cover.

* * * * *